(12) United States Patent
Kurobe et al.

(10) Patent No.: US 6,233,251 B1
(45) Date of Patent: May 15, 2001

(54) MULTIPLEX TRANSMISSION METHOD AND SYSTEM, AND AUDIO JITTER ABSORBING METHOD USED THEREIN

(75) Inventors: Akio Kurobe, Tondabayashi; Mayumi Shinoda, Hirakata; Koji Ikeda, Neyagawa, all of (JP)

(73) Assignee: Matsuhita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 08/848,470

(22) Filed: May 8, 1997

(30) Foreign Application Priority Data

| May 8, 1996 | (JP) | 8-113446 |
| May 29, 1996 | (JP) | 8-134643 |
| Jul. 17, 1996 | (JP) | 8-187153 |
| Nov. 25, 1996 | (JP) | 8-313266 |
| Jan. 20, 1997 | (JP) | 9-007275 |

(51) Int. Cl.$^7$ ............................................. H04J 3/24
(52) U.S. Cl. ............................................. 370/471; 370/535
(58) Field of Search ........................... 370/471, 465, 370/466, 395, 389, 216, 442, 347, 349, 348, 535, 537; 714/786, 787, 788, 789, 758, 748, 746, 751, 754, 761, 762; 379/95.14, 95.15, 219

(56) References Cited

U.S. PATENT DOCUMENTS

| 5,511,073 | 4/1996 | Padovani et al. ...................... 375/206 |
| 5,638,371 | * 6/1997 | Raychaudhusi et al. ............ 370/347 |

FOREIGN PATENT DOCUMENTS

| 5-244186 | 9/1993 | (JP) . |
| 8-13057 | 2/1996 | (JP) . |

OTHER PUBLICATIONS

Onoe et al., "Partial Repeat ARQ for Mobile Packet Communication" Electronic Information Communication Society, National Meeting in Spring, 1990, B323, pp. 2–323.
PHS Internet Access Forum Standard (PIAFS) Specification (Tentative), Version 0.6: May 22, 1996; PHS Internet Access Forum Technology Department—pp. 1–63.
International Telecommunication Union—ITU–T, Draft G. 723, (Oct. 17, 1995) Telecommunication Standardization Sector of ITU, "Dual Rate Speech Coder for Multimedia Communications Transmitting At 5.3 & 6.3 KBIT/S".

(List continued on next page.)

*Primary Examiner*—Dang Ton
(74) *Attorney, Agent, or Firm*—Wenderoth, Lind & Ponack, L.L.P.

(57) ABSTRACT

A multiplex frame is of a fixed length and includes a header and a fixed-length field. The fixed-length field is divided into variable-length slots 1 and 2. The length of the variable-length slot 1 is a predetermined fixed length when data to be stored exists and is zero with no data to be stored. The length of the variable-length slot 2 is increased/decreased depending on the length of the variable-length slot 1. Fixed-length data not employing retransmission (e.g., an audio frame) is transmitted in the first variable-length slot and one complete variable-length data employing retransmission (e.g., a data link frame of video) is transmitted in the second variable-length slot. When the multiplex frame thus has a fixed length and the frame length of the data link frame of the variable-length data employing retransmission is changed depending on the length of the fixed-length data not employing retransmission, the transmitting timing of the data link frames can be fixed with respect to the transmission stream of the multiplex frames. Then the boundaries between the data link frames are not lost due to a transmission error, which improves the error robustness. That is to say, even if the slot synchronization is lost due to a transmission error, it is possible to see the next header at once, providing easy resynchronization.

38 Claims, 45 Drawing Sheets

OTHER PUBLICATIONS

International Telecommunication Union—ITU–T, Annex A to G.723.1, Telecommunication Standardization Sector of ITU, "Silence Compression Scheme For Dual Rate Speech Coder For Multimedia Communications Transmitting at 5.3 & 6.3 KBIT/S".

International Telecommunication Union—ITU–T, Draft H.223, Telecommunication Standardization Sector of ITU, "Multiplexing Protocol For Low Bitrate Multimedia Communication".

International Telecommunication Union—ITU–T, Draft H.245 (Jul. 6, 1995), Telecommunication Standardization Sector of ITU, "Control Protocol For Multimedia Communication".

International Telecommunication Union—ITU–T, Draft H.263 (May 2, 1996), Telecommunication Standardization Sector of ITU, Video Coding for Low Bitrate Communication.

International Telecommunication Union—ITU–T, Draft H.324 (Draft of Nov. 22, 1995), Telecommunication Standardization Sector of ITU, Terminal For Low Bitrate Multimedia Communication.

Multiplexing protocol for low bit rate multimedia communication, Mar. 1996, pp. A/B, I/II, 1–22, vol. H.223.

C.K. Jeong et al., Analysis of voice/data multiplexers with ARQ scheme, based on a Markov renewal process modelling, Sep. 1, 1992, pp. 438–446, vol. 15, No. 7.

Richard A. Schaphorst, Status of H.324—the videoconferencing standard for the Public Switched Telephone Network and mobile radio, Jan. 1, 1996, pp. 109–112, vol. 35, No. 1.

* cited by examiner

FIG. 14

| MULTIPLEX INFORMATION (MC) | MULTIPLEX STRUCTURE |
|---|---|
| 1 | AUDIO 25 BYTES, VIDEO 51 BYTES |
| 2 | VIDEO 76 BYTES |
| 3 | DATA 25 BYTES, VIDEO 51 BYTES |

FIG. 15

| MULTIPLEX INFORMATION (MC) | MULTIPLEX STRUCTURE |
|---|---|
| 1 | VIDEO 51 BYTES, AUDIO 25 BYTES |
| 2 | VIDEO 76 BYTES |
| 3 | VIDEO 51 BYTES, DATA 25 BYTES |

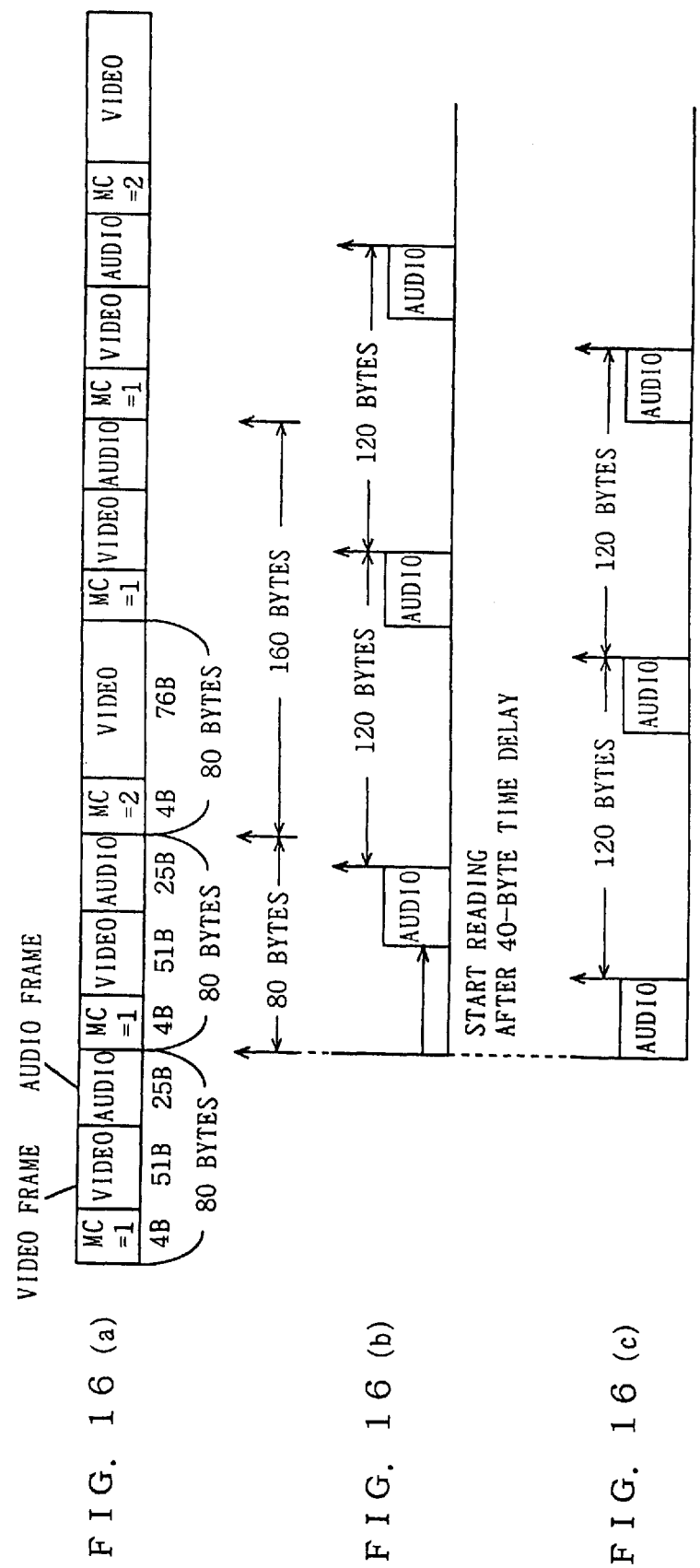

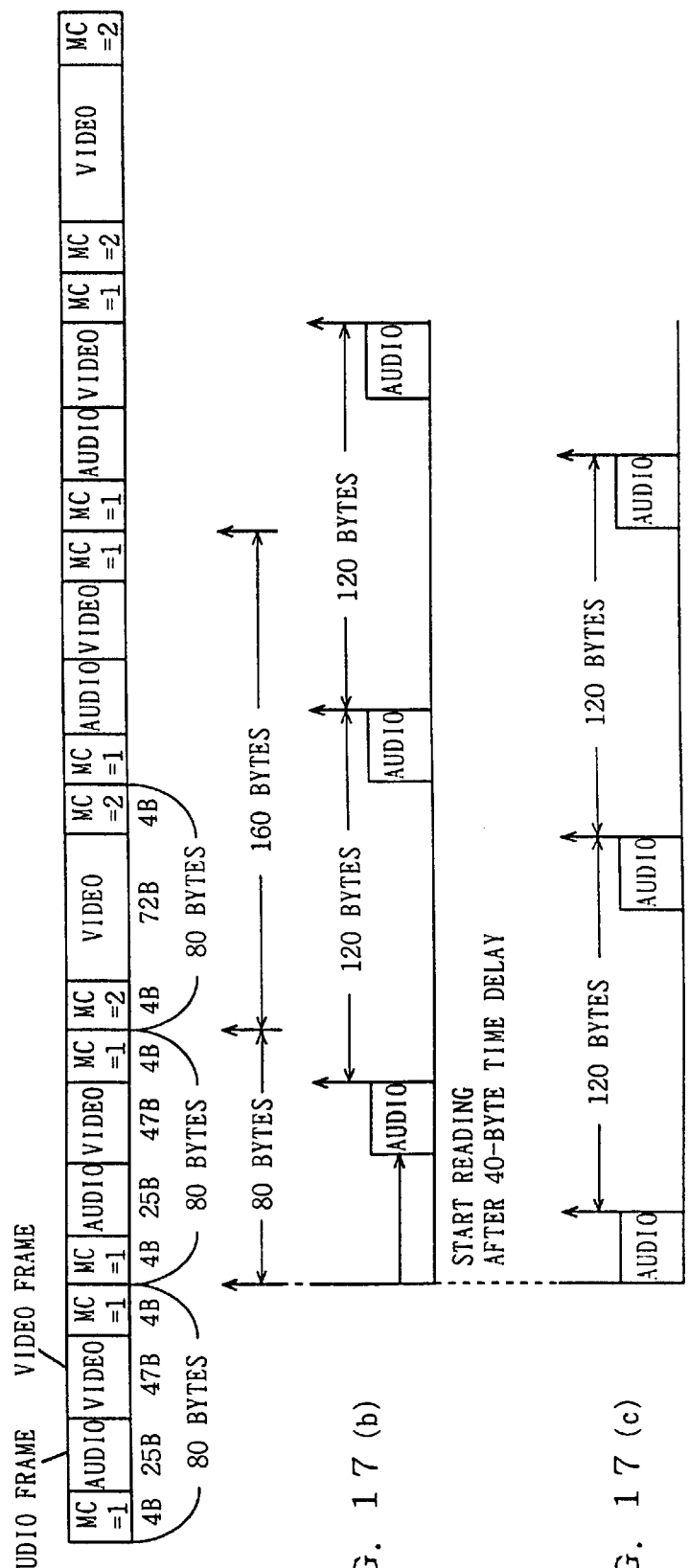

FIG. 19

| MULTIPLEX INFORMATION (MC) | MULTIPLEX STRUCTURE |
|---|---|
| 1 | AUDIO 25 BYTES, VIDEO 51 BYTES |
| 2 | AUDIO 25 BYTES, VIDEO 51 BYTES |
| 3 | VIDEO 76 BYTES |
| 4 | DATA 25 BYTES, VIDEO 51 BYTES |

FIG. 21

| MULTIPLEX INFORMATION (MC) | MULTIPLEX STRUCTURE |
|---|---|
| 1 | VIDEO 51 BYTES, AUDIO 25 BYTES |
| 2 | VIDEO 51 BYTES, AUDIO 25 BYTES |
| 3 | VIDEO 76 BYTES |
| 4 | VIDEO 51 BYTES, DATA 25 BYTES |

FIG. 27 (a)  FIG. 27 (b)
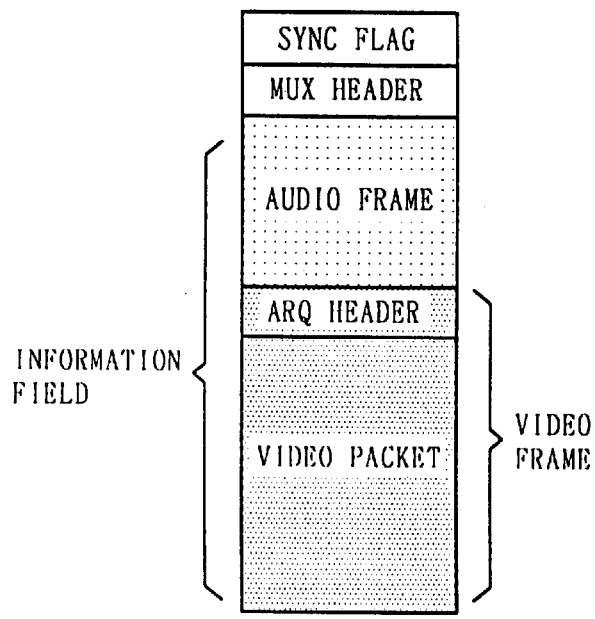 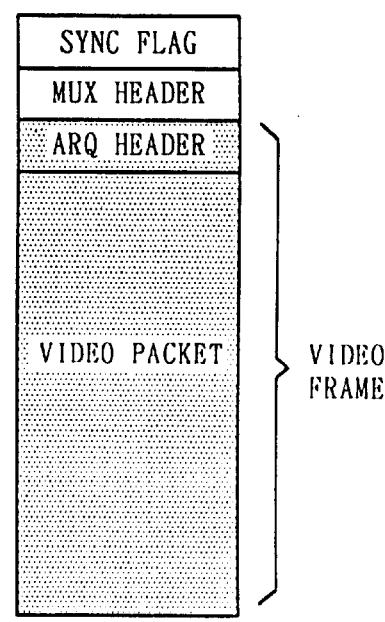
FIG. 28 (a)  FIG. 28 (b)
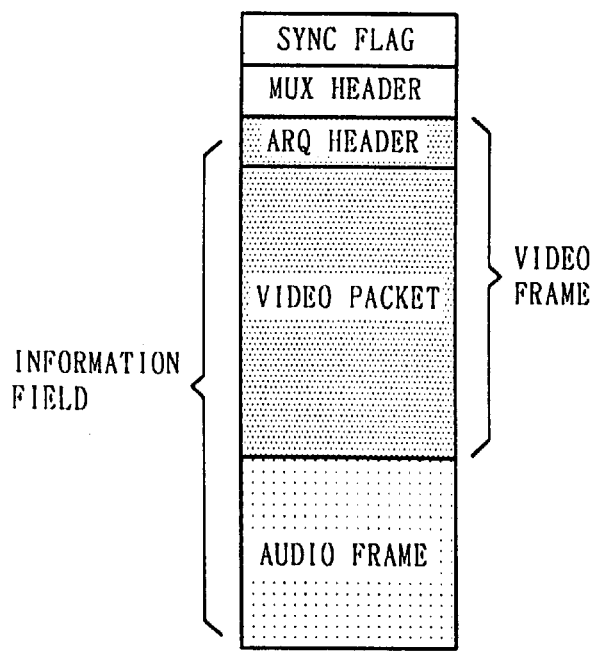 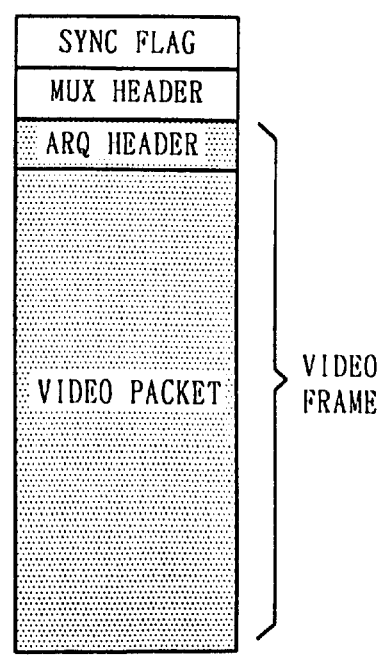

FIG. 31

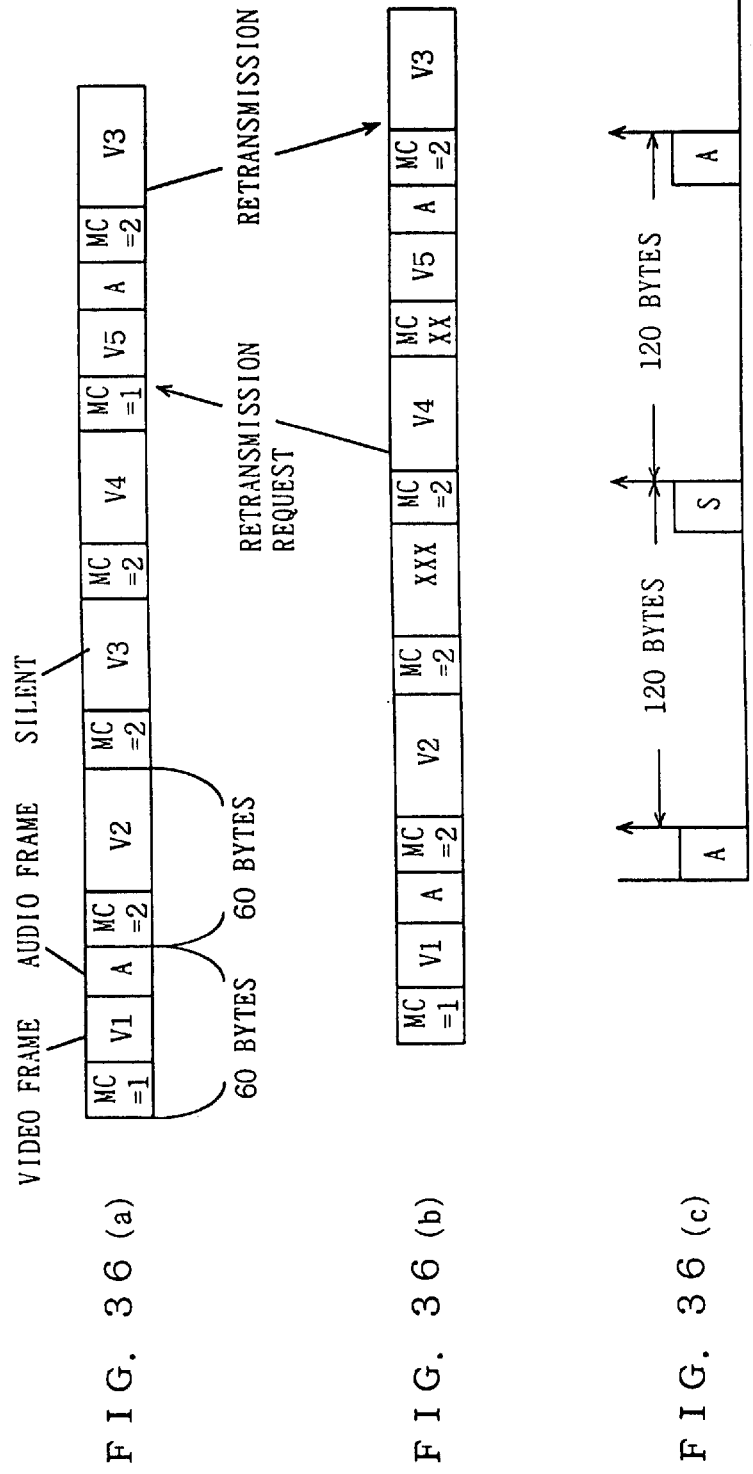

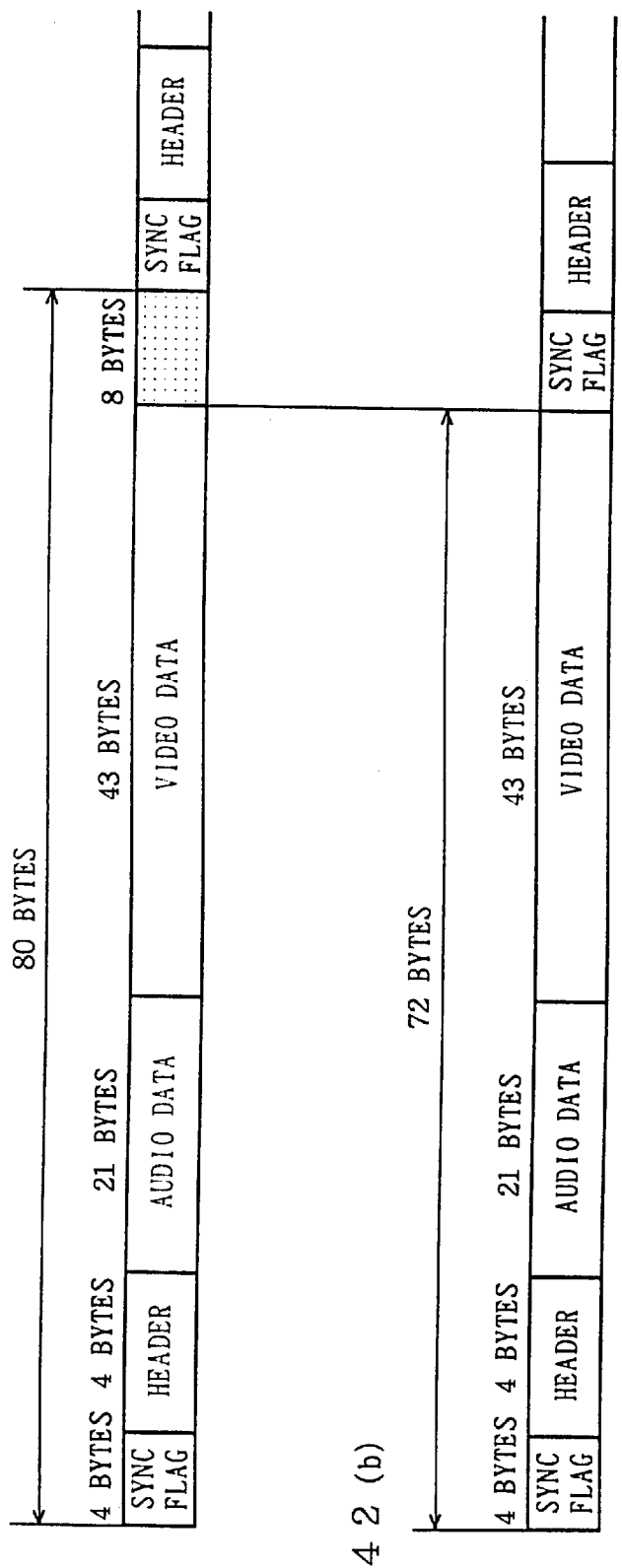

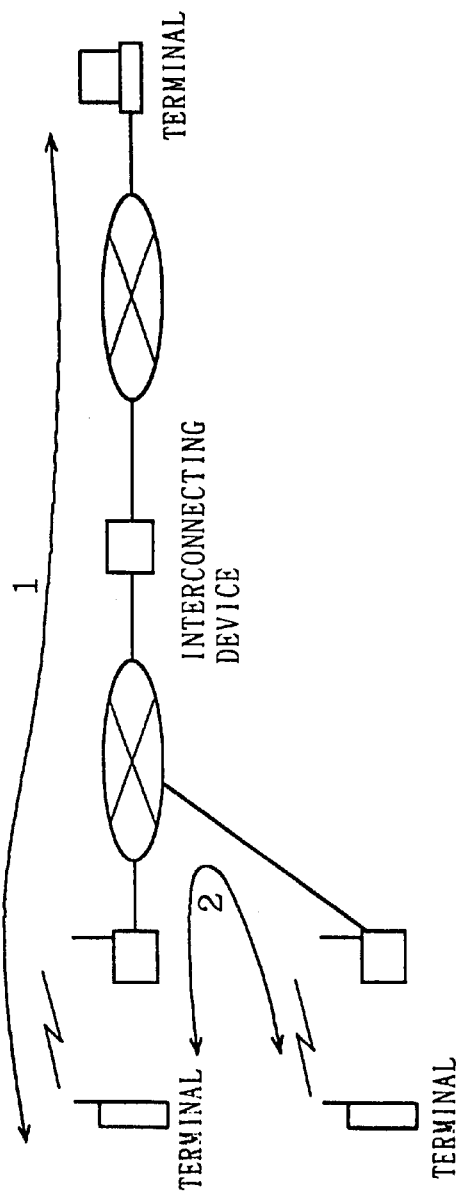
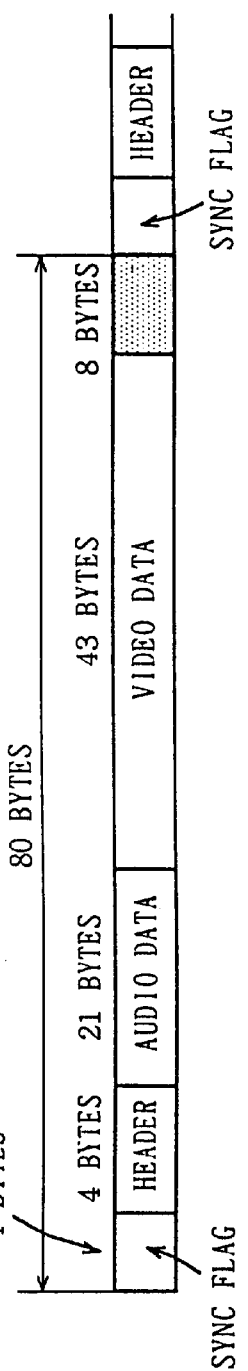
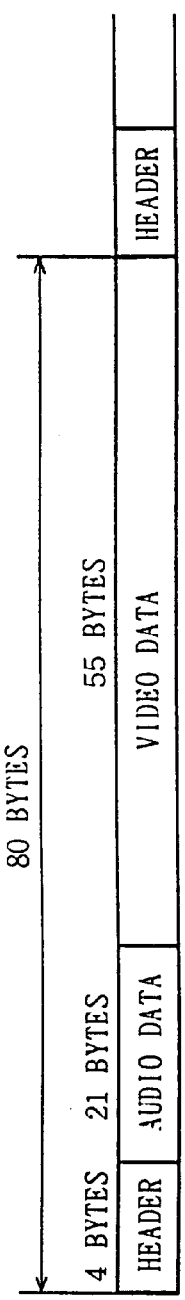
F I G. 4 3 (a)
F I G. 4 3 (b)
F I G. 4 3 (c)

200

MULTIPLEX TRANSMISSION METHOD AND SYSTEM, AND AUDIO JITTER ABSORBING METHOD USED THEREIN

BACKGROUND OF THE INVENTION

1. Field of the Invention

The present invention relates to multiplex transmission methods and systems, and to audio jitter absorbing methods used therein, and more particularly to a method of multiplexing and transmitting low-bitrate-compressed audio data and video data and/or computer data and a method of absorbing audio jitter caused in the transmission.

2. Description of the Background Art

In visual telephones and video conference systems, video signals having enormous amounts of information are generally low-bitrate-coded and then transmitted to the destination. H.263 in the draft stage of the international standardization by ITU-T (International Telecommunication Union-Telecommunication Standardization Sector) is known as an example of such low bit rate coding. These standardizations adopt the motion compensative interframe predictive coding and the variable-length coding as a compression coding method, which are very sensitive to transmission errors. That is to say, when an error, even of one bit, occurs, the influence of the error transfers in a large area of a picture and also transfers in the time axis direction, providing serious deterioration of the image quality. Hence, in the analogue telephone line which is prone to transmission errors, error correction by retransmission control is generally performed before image decoding.

On the other hand, as shown in the draft G.723 issued by ITU-T, audio data are generally compressed to a very low bit rate by low bitrate coding when transmitted. In the audio data, transmission errors are not so noticeable as in the video data. However, it is sensitive to the transmission delay. Hence, according to G.723, when an error is detected, muting is performed without error correction by retransmission, so as to prevent the transmission error from causing noise.

As a method for multiplexing and transmitting video data, or variable-length data employing retransmission, and audio data, or fixed-length data not employing retransmission, ITU-T has also issued draft H.223.

H.223 will now be explained referring to the drawings as an example of a conventional multiplex transmission method.

FIG. 44 shows a general layer structure of a multiplex transmission device adopting the multiplex transmission method determined by H.223. In FIG. 44, this multiplex transmission device includes a physical layer 801, a multiplex layer 802, an adaptation layer 803, a video coder 804, an audio coder 805, a data protocol 806, an LAPM 807, an H.245 control 808, a video I/O 809, an audio I/O 810, and an application layer 811.

H.223 supposes a modem for analogue telephone line at 28.8 Kbps as the physical layer 801. It defines, as the multiplex layer 802 and the adaptation layer 803, a frame structure and a procedure for video error correction by retransmission control and a frame structure for audio error detection. Supposed as the video coder 804 is H.263. As the audio coder 805, G.723 is supposed. ITU-T issues H.324 as a specification recommendation for the entire system. H.223 does not specifically define the data protocol 806. A communication procedure for control data is defined as the LAPM 807. As the H.245 control 808, commands and procedure for system control are specified.

Next, FIG. 45 shows the multiplex frame format in the multiplex layer 802 of H.223. In FIG. 45, for the opening flag and the closing flag, the same bit pattern "01111110" as that used in HDLC is used to establish flag synchronization. In order to keep the transparency of the opening flag and the closing flag, H.223 defines to insert 0 after five contiguous 1's in a part other than a flag and to remove it on the receiving end. The header shows, into which types of slots the following information field is divided and which types of data are multiplexed. FIG. 46 shows an example of a multiplex frame format in the multiplex layer 802 with audio data, computer data and video data multiplexed.

Defined in the adaptation layer 803 are a frame format and a procedure for error correction of video by retransmission control. FIG. 47 shows an ARQ (Automatic Repeat reQuest) frame format for error correction of video by retransmission control. In FIG. 47, the control field contains a transmission number for retransmission control and a flag indicating whether the following payload field is an information frame or a supervisory frame. The payload field contains video data in the case of an information frame and contains a retransmission request number and a retransmission request command in the case of a supervisory frame. The CRC field contains a check code for error detection. The procedure of retransmission control determined in the adaptation layer 803 is the selective repeat ARQ method of a window size of 128 frames, in which a retransmission is requested only once in a supervisory frame by using the transmission number of a frame with an error detected by the CRC check as the retransmission request number, together with the retransmission request command.

The H.223 gives variable lengths both to multiplex frames and video frames and uses flag synchronization. Accordingly, frame synchronization is lost if a flag has an error. When an error occurs in other data, that data may simulate itself as a flag to break the synchronization. The H.223 thus has the problem of being easily affected by error.

The radio channel of the PHS (Personal Handy-phone System) which is a simplified portable telephone (which has a bit rate of 32 Kbps) is still more prone to transmission errors than the analogue telephone line. Conventionally, as a, transmission control method used when transmitting computer data through the radio channel of PHS, PIAFS (PHS Internet Access Forum Standard) is suggested within the country of Japan, for example.

An ARQ frame in PIAFS has a fixed length (80 bytes). FIG. 48 shows a frame structure of PIAFS. In FIG. 48, the frame type identification field contains a frame type, the error control field contains a transmission frame number and an oldest unreceived frame number, the user data length indication field contains the data length of significant data in the user data field, the user data field contains user data, and the error detection code field contains an error detection code for detecting error of the entire ARQ frame.

In the PIAFS, frame synchronization is established prior to a communication by using a synchronizing frame including a synchronization flag and the frame synchronization is kept by using data frames having the same length as the synchronizing frame, which requires no synchronization flag in the data frames. The PIAFS, with fixed-length ARQ frames, is not susceptible to error because the frame synchronization is not lost even if an error occurs.

Hence, if fixed-length multiplex frames are used in H.223, the multiplex frames can be synchronized even if an error occurs, which will provide the multiplex frames with a high tolerance for errors. Japanese Patent Publication No.8-

13057 discloses, an example thereof, as "Mixing Transfer System for HDLC Variable Length Packet and Non-HDLC Fixed Length Packet." The transfer method disclosed in the reference will now be explained referring to FIG. 49.

In FIG. 49, each fixed-length frame is provided with a header showing whether the contents are HDLC data or not. When the header indicates non-HDLC data, the fixed-length frame contains a non-HDLC fixed-length packet (e.g., an audio data packet). When the header indicates HDLC data, the fixed-length frame contains part of a divided variable-length HDLC frame (e.g., a video frame). According to this method, the multiplex frames, as having a fixed length provide error robustness. However, the video data still adopt the HDLC flag synchronization and are stored over a plurality of multiplex frames. Accordingly, the video frames are still easily affected by error.

For the purpose of taking advantage of the function of increasing transmission band width for video data or the like by performing silence detection to produce no audio frame when silent, as in G.723, it is necessary to suppress jitter under several mili-seconds. This is due to the fact that if jitter is large, the receiving side can not tell whether audio data is not received due to jitter or audio data is not received because it is in a silent period. Then suitable processing can not be performed.

Conventionally, as a method for minimizing jitter of fixed-length cell packets, a method of comparing a predetermined threshold and the number of cells in a buffer having a capacity twice the maximum fluctuation time to control reading of the buffer is suggested. (Refer to Japanese Patent Laying-Open No.5-244186 "ATM/STM Converting Circuit.") FIG. 50 shows the structure thereof. In FIG. 49, the buffer 50 has a capacity of 2Δt, twice the jitter Δt. The reading control portion 60 compares the number of cells accumulated in the buffer 50 and a predetermined threshold. When the number of accumulated cells exceeds the threshold, it outputs a reading address to start reading the buffer 50. Thus, the jitter correcting circuit of FIG. 50 is so structured as to read contents of the buffer 50 after a maximum delay time in the ATM network has passed after arrival of the first cell. However, when the jitter correcting circuit of FIG. 50 is used, the average delay time increases as the cells are accumulated to the threshold, increasing delay of audio.

When the multiple header has an error, the frame number of the video frame multiplexed in the discarded information field can not be known and then a retransmission request can not be immediately transmitted to the transmitting side. Generally, the multiplex layer discards data in the information field when an error is found in the multiplex header. Accordingly, it is when the sequence error is detected from the frame number of the ARQ header of the video frame received next without error that a retransmission request for the video frame in the discarded information field is sent out from the error control processing layer. For example, if a transmission error occurs in the multiplex header of the multiplex frame of the frame number (1) transmitted from the transmitting terminal, the receiving terminal discards video data in the multiplex frame after receiving the multiplex header. Accordingly, the receiving terminal can not immediately send a reject for the video data of the frame number (1). That is to say, the receiving terminal finds the absence of the multiplex frame of the frame number (1) only after it receives the multiplex frame of the frame number (2), and then it transmits a reject for the frame number (1) to the transmitting side.

When the error detection for the frame numbers is performed independently of the error detection for the information fields as shown in the partial repeat ARQ for mobile packet communications presented in Electronic Information Communication Society, National Meeting in Spring, B-323, 1990, the receiving side can, even if the information part is discarded, immediately transmit a retransmission request for the frame as long as the frame number of that frame correctly arrives at the receiving side. This reduces the retransmission waiting time.

SUMMARY OF THE INVENTION

A first object of the present invention is to provide a multiplex transmission method having error robustness and good transmission efficiency.

A second object of the present invention is to provide a multiplex transmission method capable of correcting audio jitter without increasing delay time of audio.

The present invention has the following features to achieve the objects above.

A first aspect of the present invention is directed to a method for multiplexing and transmitting variable-length data employing retransmission to which error correction by retransmission control is applied and fixed-length data not employing retransmission to which error correction by retransmission control is not applied in multiplex frames, wherein the multiplex frames have a fixed length and a data link frame for storing the variable-length data employing retransmission has a frame length increased/decreased depending on the length of the fixed-length data not employing retransmission to be multiplexed so that the data link frame is transmitted at timing kept in synchronization for each multiplex frame with the transmission stream of the multiplex frames.

In accordance with the first aspect, the multiplex frames for storing the fixed-length data not employing retransmission and the variable-length data employing retransmission have a fixed length and a data link frame for storing the variable-length data employing retransmission has a frame length changed depending on the length of the fixed-length data not employing retransmission to be multiplexed so that the data link frames can be transmitted at timing synchronized with the transmission stream of the multiplex frames. Then the transmitting timing of the data link frames can be fixed and the boundaries between the data link frames are not lost in the event of a transmission error, providing error robustness. That is to say, unlike H.223 which acquires synchronization with flags, bits are not shifted due to "0" insertion, and even if the slot synchronization is lost due to a transmission error, it is possible to see the next header at once, providing eased resynchronization. Moreover, it is possible to effectively utilize silent periods of the fixed-length data not employing retransmission to increase the transmission efficiency of the video data, or the variable-length data employing retransmission.

According to a second aspect of the present invention, in the first aspect, the multiplex frame includes a fixed-length field, the fixed-length field being divided into first and second variable-length slot, the first variable-length slot having a predetermined fixed length when fixed-length data not employing retransmission to be multiplexed exists and having a length of zero when no fixed-length data not employing retransmission to be multiplexed exists, the second variable-length slot having a relatively short, first length when fixed-length data not employing retransmission to be multiplexed exists and having a relatively long, second length when no fixed-length data not employing retransmission to be multiplexed exists, wherein the fixed-length data not employing retransmission is transmitted in the first variable-length slot and the variable-length data employing retransmission is transmitted in the second variable-length slot.

According to a third aspect of the present invention, in the second aspect, the multiplex frame further includes a multiplex frame header, the multiplex frame header containing multiplex information indicating whether the fixed-length data not employing retransmission is multiplexed in the multiplex frame.

In accordance with the third aspect, it is possible to know the multiplex structure of the multiplex frames by seeing the multiplex information in the multiplex header.

According to a fourth aspect of the present invention, in the second aspect, the multiplex frame further includes a fixed-length slot for storing and transmitting the variable-length data employing retransmission.

According to a fifth aspect of the present invention, in the fourth aspect, variable-length data employing retransmission of the same kind as the variable-length data employing retransmission stored in the second variable-length slot is stored in the fixed-length slot.

According to a sixth aspect of the present invention, in the fifth aspect, the length of the fixed-length slot is selected equal to or larger than the length of the fixed-length field.

In accordance with the sixth aspect, when variable-length data employing retransmission transmitted in the second variable-length slot is errored, the variable-length data employing retransmission can be retransmitted in either of the second variable-length slot and the fixed-length slot.

According to a seventh aspect of the present invention, in the fourth aspect, variable-length data employing retransmission of a different kind from the variable-length data employing retransmission stored in the second variable-length slot is stored in the fixed-length slot.

In accordance with the seventh aspect, it is possible to multiplex a plurality of kinds of variable-length data employing retransmission.

According to an eighth aspect of the present invention, in the fourth aspects, the length of the data link frame for storing the variable-length data employing retransmission is set equal to that of the second variable-length slot when the variable-length data employing retransmission is transmitted in the second variable-length slot and equal to that of the fixed-length slot when it is transmitted in the fixed-length slot.

According to a ninth aspect of the present invention, in the first aspect, the multiplex frame includes, a frame type identification field for storing a code for identifying the frame type, a user data field for storing user data, a user data length indication field for storing the length of significant data in the user data field, a retransmission control field for storing a frame number used in retransmission control, and an error detecting code field for storing an error detecting code, wherein the user data field is divided into a field for the variable-length data employing retransmission and a field for the fixed-length data not employing retransmission, the variable-length data employing retransmission is stored in the field for variable-length data employing retransmission, the fixed-length data not employing retransmission is stored in the field for fixed-length data not employing retransmission, the length of the variable-length data employing retransmission stored in the field for variable-length data employing retransmission accomodated in the user data length indication field, and the error detecting code field contains an error detecting code for error detection in the part excluding the field for the fixed-length data not employing retransmission.

In accordance with the ninth aspect of the present invention, it is possible to multiplex fixed-length data not employing retransmission and variable-length data employing retransmission using the structure of the ARQ frame in PIAFS almost as it is.

According to a tenth aspect of the present invention, in the ninth aspect, when fixed-length data not employing retransmission to be multiplexed exists, the user data field is divided into the field for variable-length data employing retransmission and the field for fixed-length data not employing retransmission, the field for variable-length data employing retransmission storing the variable-length data employing retransmission and the field for fixed-length data not employing retransmission storing the fixed-length data not employing retransmission, and when no fixed-length data not employing retransmission to be multiplexed exists, the variable-length data employing retransmission is stored by using the entirety of the user data field as the field for variable-length data employing retransmission, wherein an identification code indicating whether the user data field includes the field for fixed-length data not employing retransmission is stored in the frame type identification field.

According to an eleventh aspect of the present invention, in the first aspect, a basic multiplex frame stream including at least one first multiplex frame in which the fixed-length data not employing retransmission is multiplexed and at least one second multiplex frame in which the fixed-length data not employing retransmission is not multiplexed is repeatedly transmitted.

In accordance with the eleventh aspect, it is possible to multiplex the fixed-length data not employing retransmission and the variable-length data employing retransmission in step with the cycle of generation of the fixed-length data not employing retransmission.

According to a twelfth aspect of the present invention, in the eleventh aspect, the first multiplex frame includes a fixed-length field divided into first and second variable-length slots, the first variable-length slot having a predetermined fixed length when fixed-length data not employing retransmission to be multiplexed exists and having a length of zero when no fixed-length data not employing retransmission to be multiplexed exists, the second variable-length slot having a relatively short, first length when fixed-length data not employing retransmission to be multiplexed exists and having a relatively long, second length when no fixed-length data not employing retransmission to be multiplexed exists, and the second multiplex frame includes a fixed-length slot, wherein the fixed-length data not employing retransmission is transmitted in the first variable-length slot and the variable-length data employing retransmission is transmitted in the second variable-length slot and the fixed-length slot.

According to a thirteenth aspect of the present invention, in the eleventh aspect, the first and second fixed-length multiplex frames each have a length of 60 bytes, and the basic multiplex frame stream is formed of one of the first multiplex frame and one of the second fixed-length multiplex frame, wherein one audio frame is stored as the fixed-length data not employing retransmission in the first multiplex frame.

According to a fourteenth aspect of the present invention, in the eleventh aspect, the first and second fixed-length multiplex frames each have a length of 80 bytes, and the basic multiplex frame stream is formed of two of the first multiplex frames and one of the second fixed-length multiplex frame, wherein the first multiplex frame contains one audio frame as the fixed-length data not employing retransmission.

In accordance with the fourteenth aspect, it is possible to multiplex audio data and other fixed-length data employing retransmission according to the structure of the ARQ frame of the PIAFS.

According to a fifteenth aspect of the present invention, in the eleventh aspect, the first and second fixed-length multiplex frames each have a length of 80 bytes, and the basic multiplex frame stream is formed of one of the first multiplex frame and two of the second fixed-length multiplex frames, wherein two audio frames are stored as the fixed-length data not employing retransmission in the first multiplex frame.

In accordance with the fifteenth aspect, it is possible to multiplex audio data and other fixed-length data employing retransmission according to the structure of the ARQ frame in the PIAFS.

A sixteenth aspect of the present invention is directed to a method of absorbing audio jitter on the side receiving multiplex frames when a low-bitrate-coded N-byte (N is a positive integer) audio frame generated at a rate of one frame per an F-byte (F is a positive integer and N<F) transmission time is stored and multiplexed in an M-byte (M is a positive integer and M<F) fixed-length multiplex frame and when at most J-byte (J is a positive integer) audio jitter is generated among the audio fields of the multiplex frames because F/M is not an integer, wherein a reference audio frame separated from the next audio frame at a minimum interval is identified from among the audio frames on the transmitted multiplex frame stream, and using the timing at which the reference audio frame is outputted as a reference, the following audio frames are outputted at the rate of one frame per the F-byte transmission time.

In accordance with the sixteenth aspect, it is possible, on the side receiving the multiplex frames, to easily absorb audio jitter caused because the frame length of the multiplex frames and the transmission cycle of the audio frames do not match.

According to a seventeenth aspect of the present invention, in the sixteenth aspect, different multiplex information are defined for n multiplex frames containing multiplexed audio frames in a basic multiplex frame stream formed of m multiplex frames, where n and m are integers and n·F=m·M, so that the reference audio frame can be identified on the basis of the multiplex information.

In accordance with the seventeenth aspect, different multiplex information are defined for n multiplex frames containing audio frames multiplexed therein, which facilitates identification of the reference audio frame serving as a reference in the audio jitter absorption.

According to an eighteenth aspect of the present invention, in the sixteenth aspect, M=80 bytes and F=120 bytes.

According to a nineteenth aspect of the present invention, in the seventeenth aspect, M=80 bytes, F=120 bytes, n=2 and m=3.

A twentieth aspect of the present invention is directed to a method of absorbing audio jitter on the side receiving multiplex frames when a low-bitrate-coded N-byte (N is a positive integer) audio frame generated at a rate of one frame per an F-byte (F is a positive integer and N<F) transmission time is stored and multiplexed in an M-byte (M is a positive integer and M<F) fixed-length multiplex frame and when at most J-byte (J is a positive integer) audio jitter is generated among the audio fields of the multiplex frames because F/M is not an integer, wherein when the time from the start of a coding operation of an audio coder for coding audio data to the start of output of the first audio frame from the audio coder is taken as T, and the time required from the start of output of the first audio frame from the audio coder to the start of output of the multiplex frame containing the first audio frame is taken as $\alpha$, using as a reference the timing of the start of output of the multiplex frame containing a reference audio frame separated from the next audio frame at a minimum interval in the audio frames on the transmitted multiplex frame stream, the coding operation of the audio coder is started preceding the reference timing at least for the total time of $(T+J+\alpha)$.

In accordance with the twentieth aspect, it is possible, on the side receiving the multiplex frames, to easily absorb the audio jitter caused because the frame length of the multiplex frames and the cycle of transmission of the audio frames do not match.

According to a twenty-first aspect of the present invention, in the twentieth aspect, the time $\alpha$ is set equal to or larger than a larger one of first and second times, wherein the first time is a time required from the start of output of the first audio frame from the audio coder to the start of output of the multiplex frame containing the first audio frame when the coding operation of the audio coder is started from an active speech period, and the second time is a time required from the detection of the indication of silence outputted from the audio coder to the start of output of the multiplex frame containing another data frame in the field to be stored in an audio frame when the coding operation of the audio coder is started from a silent period.

According to a twenty-second aspect of the present invention, in the twentieth aspect, different multiplex information are defined for n multiplex frames containing multiplexed audio frames in a basic multiplex frame stream formed of m multiplex frames, where n and m are integers and n·F=m·M, so that the reference audio frame can be identified on the basis of the multiplex information.

In accordance with the twenty-second aspect, different multiplex information are individually defined for n multiplex frames in which an audio frame is multiplexed, which allows a reference audio frame for audio jitter absorption to be easily identified.

According to a twenty-third aspect of the present invention, in the twentieth aspect, M=80 bytes and F=120 bytes.

According to a twenty-fourth aspect of the present invention, in the twenty-second aspect, M=80 bytes, F=120 bytes, n=2 and m=3.

A twenty-fifth aspect of the present invention is directed to a method for multiplexing a first data frame provided with a frame number and an error detecting code and second to kth data frame(s) (k is an integer of 2 or larger) in multiplex frames from a transmitting side to a receiving side, wherein the multiplex frame is further provided with multiplex information indicating the structure of the multiplexing of the first data frame and the second to kth data frame(s), the transmitting side locates the frame number of the first data frame always in a fixed position in the multiplex frame, and when detecting presence of an error in the multiplex information in the multiplex frame received, the receiving side reads the frame number of the first data frame from the fixed position in the multiplex frame and transmits a retransmission request for the read frame number to the transmitting side.

In accordance with the twenty-fifth aspect, the frame number of the first data frame is always located in a fixed position in the multiplex frame so that the receiving side can read the frame number of the first data frame from the fixed position in the multiplex frame even if an error exists in the multiplex information in the received multiplex frame and can immediately transmit a retransmission request for the read frame number to the transmitting side.

According to a twenty-sixth aspect of the present invention, in the twenty-fifth aspect, a fixed-length multiplex header including at least the multiplex information and an error detecting code for detecting an error in the multiplex information is located at the head of the multiplex frame, and the first data frame is always located in the first one of one or more data frames stored following the multiplex header.

According to a twenty-seventh aspect of the present invention, in the twenty-sixth aspect, a header including at least the frame number and an error detecting code for detecting an error of the frame number is located at least at the head of the first data frame.

According to a twenty-eighth aspect of the present invention, in the twenty-seventh aspect, when detecting presence of an error in the multiplex header of the multiplex frame received, the receiving side extracts certain bytes of data following/preceding the multiplex header as the first data frame, and when detecting absence of error in the header of the extracted first data frame and detecting presence of an error in the remaining data, the receiving side immediately transmits a retransmission request for the first data frame to the transmitting side.

According to a twenty-ninth aspect of the present invention, in the twenty-sixth aspect, the multiplex frame has a fixed length, the second data frame is always located in the last one of one or more data frames stored following the multiplex header, and when detecting presence of an error in the multiplex header of the multiplex frame received, the receiving side extracts data in a range of certain bytes from the end of the multiplex frame as the second data frame, wherein when detecting absence of an error in the extracted second data frame, the receiving side handles the second data frame as correctly received data, and when detecting presence of an error in the extracted second data frame, the receiving side discards the second data frame.

A thirtieth aspect of the present invention is directed to a method for multiplexing a first data frame provided with a frame number and an error detecting code and second to kth data frame(s) (k is an integer of 2 or larger) in multiplex frames from a transmitting side to a receiving side, wherein the multiplex frame is further provided with multiplex information indicating in what structure the first data frame and the second to kth data frame(s) are multiplexed, wherein the transmitting side includes as transmission modes, a first transmission mode in which the frame number of the first data frame is always located in a fixed position in the multiplex frame, and a second transmission mode in which the frame number of the first data frame is located in an arbitrary position in the multiplex frame, wherein the receiving side, when detecting presence of an error in the multiplex information in the multiplex frame received in the first transmission mode, reads the frame number of the first data frame from the fixed position in the multiplex frame and transmits a retransmission request for the read frame number to the transmitting side.

In accordance with the thirtieth aspect, the receiving side can read the frame number of the first data frame from the fixed position in the multiplex frame even if there is an error in the multiplex information in the multiplex frame transmitted in the first transmission mode and can immediately transmit a retransmission request for the read frame number to the transmitting side.

According to a thirty-first aspect of the present invention, in the thirtieth aspect, the transmitting side transmits to the receiving side, in advance, correspondence data indicating the correspondence between the multiplex information and the multiplex structure of the multiplex frames, and the receiving side determines in which of the first and second transmission modes the transmitting side transmits the multiplex frames on the basis of the correspondence data received in advance.

In accordance with the thirty-first aspect, the receiving side can easily determine in which of the first and second transmission modes the transmitting side transmits the multiplex frames on the basis of the correspondence data sent from the transmitting side in advance.

A thirty-second aspect of the present invention is directed to a multiplex transmission method in which an audio frame having a frame length of 30 ms and being of 120 bytes when transmitted at 32 Kbps is low-bitrate-coded, and then stored and multiplexed in a multiplex frame having a frame length of 20 ms and being of 80 bytes when transmitted at 32 Kbps, wherein a basic multiplex frame stream formed of two first multiplex frames containing the audio frame and one second muliplex frame containing none of the audio frame is repeatedly transmitted.

In accordance with the thirty-second aspect, it is possible to efficiently multiplex audio data by almost intactly using the structure of the ARQ frame in PIAFS.

According to a thirty-third aspect of the present invention, in the thirty-second aspect, when an audio frame to be multiplexed exists, the audio frame is always stored in the same position in an information field in the first multiplex frame, and a receiving side demultiplexes the audio frame from a multiplex frame received, absorbs jitter of the demultiplexed audio frame, and outputs the audio frame.

In accordance with the thirty-third aspect, it is possible to absorb audio jitter caused in multiplex transmission.

According to a thirty-fourth aspect of the present invention, in the thirty-third aspect, different multiplex information are defined for the two first multiplex frames included in the basic multiplex frame stream so that a reference audio frame separated from the next audio frame at a minimum interval can be identified, and the receiving side outputs the audio frame demultiplexed from the received multiplex frame for each 30 ms using the timing of output of the reference audio frame as a reference.

In accordance with the thirty-fourth aspect, different multiplex information are defined for the two first multiplex frames included in the basic multiplex frame stream so that the audio frame used as a reference in absorbing the audio jitter can easily be identified.

According to a thirty-fifth aspect of the present invention, in the thirty-second aspect, the first multiplex frame contains a first video frame which is one complete video ARQ frame, together with the audio frame, and the second multiplex frame contains a second video frame which is one complete video ARQ frame having a frame length equal to or larger than the sum of the frame length of the audio frame and that of the first video frame in the first multiplex frame.

According to a thirty-sixth aspect of the present invention, in the thirty-fifth aspect, when the audio frame is not transmitted in a silent period, the first multiplex frame is used as a third multiplex frame which forms a third video frame which is one complete video ARQ frame having a frame length equal to the sum of the frame lengths of the audio frame and the first video frame, and when the third video frame could not be normally received, a retransmission thereof is performed in the second or third multiplex frame.

In accordance with the thirty-sixth aspect, when video data transmitted in the third video frame is errored, the video data can be retransmitted in either of the second and third multiplex frames.

According to a thirty-seventh aspect of the present invention, in the thirty-fifth aspect, a fixed-length multiplex header at least including multiplex information indicating the internal multiplex structure and an error detecting code for detecting error of the multiplex information is located at the head of each of the first and second multiplex frames, and in each of the first and second multiplex frames, an ARQ header for each of the first and second video frames is stored immediately after the multiplex header or at the end of each of the first and second multiplex frames, wherein when an error is detected in the multiplex header and the internal multiplex structure is not known, the video frame including the ARQ header is read and retransmission control thereof is performed.

In accordance with the thirty-seventh aspect, the ARQ headers for the first and second video frames are stored in a fixed position in the multiplex headers. This allows the receiving side to read the ARQ headers for the first and second video frames from the fixed position in the multiplex frames even if there is an error in the multiplex information in the received multiplex frame and to perform the retransmission control at once.

According to a thirty-eighth aspect of the present invention, in the thirty-fifth aspect, a fixed-length multiplex header at least including multiplex information indicating the internal multiplex structure and an error detecting code for detecting error of the multiplex information is located at the head and at the end of each of the first and second multiplex frames, and in each of the first and second multiplex frames, an ARQ header for each of the first and second video frames is stored immediately after the multiplex header located at the head of each of the first and second multiplex frames or immediately before the multiplex header located at the end of each of the first and second multiplex frames, wherein when an error is detected in the multiplex header and the internal multiplex structure is not known, the video frame including the ARQ header is read and retransmission control thereof is performed.

In accordance with the thirty-eighth aspect, the ARQ headers for the first and second video frames are each stored in a fixed position in the multiplex headers. This allows the receiving side to read the ARQ headers for the first and second video frames from the fixed position in the multiplex frames even if there is an error in the multiplex information in a received multiplex frame and can perform the retransmission control at once.

A thirty-ninth aspect of the present invention is directed to a multiplex transmission method in which an audio frame having a frame length of 30 ms and being of 120 bytes when transmitted at 32 Kbps is low-bitrate-coded, and then stored and multiplexed in a multiplex frame having a frame length of 15 ms and being of 60 bytes when transmitted at 32 Kbps, wherein a first multiplex frame containing the audio frame and a second multiplex frame containing none of the audio frame are alternately and repeatedly transmitted.

According to a fortieth aspect of the present invention, in the thirty-ninth aspect, the first multiplex frame contains a first video frame which is one complete video ARQ frame, together with the audio frame, and the second multiplex frame contains a second video frame which is one complete video ARQ frame having a frame length equal to or larger than the sum of the frame length of the audio frame and that of the first video frame in the first multiplex frame.

According to a forty-first aspect of the present invention, in the fortieth aspect, when the audio frame is not transmitted in a silent period, the first multiplex frame is used as a third multiplex frame which forms a third video frame which is one complete video ARQ frame having a frame length equal to the sum of the frame length of the audio frame and that of the first video frame, and when the third video frame can not be normally received, a retransmission thereof is performed in the second or third multiplex frame.

In accordance with the forty-first aspect, when video data transmitted in the third video frame is errored, the video data can be retransmitted in any of the second and third multiplex frames.

According to a forty-second aspect of the present invention, in the fortieth aspect, a fixed-length multiplex header at least including multiplex information indicating the internal multiplex structure and an error detecting code for detecting error of the multiplex information is located at the head of each of the first and second multiplex frames, and in each of the first and second multiplex frames, an ARQ header for each of the first and second video frames is stored immediately after the multiplex header or at the end of each of the first and second multiplex frames, wherein when an error is detected in the multiplex header and the internal multiplex structure is not known, the video frame including the ARQ header is read and retransmission control thereof is performed.

In accordance with the forty-second aspect, the ARQ headers for the first and second video frames are stored in a fixed position in the multiplex headers. This allows the receiving side to read the ARQ headers for the first and second video frames from the fixed position in the multiplex frames even if there is an error in the multiplex information in the received multiplex frame and to perform the retransmission control at once.

According to a forty-third aspect of the present invention, in the fortieth aspect, a fixed-length multiplex header at least including multiplex information indicating the internal multiplex structure and an error detecting code for detecting error of the multiplex information is located at the head and at the end of each of the first and second multiplex frames, in each of the first and second multiplex frames, an ARQ header for each of the first and second video frames is stored immediately after the multiplex header located at the head of each of the first and second multiplex frames or immediately before the multiplex header located at the end of each of the first and second multiplex frames, wherein when an error is detected in the multiplex header and the internal multiplex structure is not known, the video frame including the ARQ header is read and retransmission control thereof is performed.

In accordance with the forty-third aspect, the ARQ headers for the first and second video frames are stored in a fixed position in the multiplex headers. This allows the receiving side to read the ARQ headers for the first and second video frames from the fixed position in the multiplex frames even if there is an error in the multiplex information in the received multiplex frame and to perform the retransmission control at once.

A forty-fourth aspect of the present invention is directed to a system for multiplexing variable-length data employing retransmission to which error correction by retransmission control is applied and fixed-length data not employing retransmission to which error correction by retransmission control is not applied in multiplex frames from a transmitting device to a receiving device, wherein the transmitting device provides the multiplex frame with a fixed length and increases/decreases the frame length of a data link frame for storing the variable-length data employing retransmission depending on the length of the multiplexed fixed-length data not employing retransmission to transmit the data link frame at a timing always in synchronization with the transmission stream of the multiplex frames.

In accordance with the forty-fourth aspect, multiplex frames for storing the fixed-length data not employing retransmission and the variable-length data employing retransmission have a fixed length and data link frames for storing the variable-length data employing retransmission have a frame length changed depending on the length of the fixed-length data not employing retransmission to be multiplexed so that the data link frames can be transmitted always in synchronization with the transmission stream of the multiplex frames. Then the transmission timing of the data link frames can be fixed and the boundaries between the data link frames are not lost in the event of a transmission error, providing error robustness. That is to say, unlike H.223 which acquires synchronization with flags, bits are not shifted due to "0" insertion, and even if the slot synchronization is lost due to a transmission error, it is possible to see the next header at once, providing easy resynchronization. Moreover, it is possible to effectively utilize silent periods of the fixed-length data not employing retransmission to increase the transmission efficiency of the video data, or the variable-length data employing retransmission.

According to a forty-fifth aspect of the present invention, in the forty-fourth aspect, the multiplex frame includes a fixed-length field, the fixed-length field being divided into first and second variable-length slots, the first variable-length slot having a predetermined fixed length when fixed-length data not employing retransmission to be multiplexed exists and having a length of zero when no fixed-length data not employing retransmission to be multiplexed exists, the second variable-length slot having a relatively short, first length when fixed-length data not employing retransmission to be multiplexed exists and having a relatively long, second length when no fixed-length data not employing retransmission to be multiplexed exists, wherein the transmitting device transmits the fixed-length data not employing retransmission in the first variable-length slot and transmits the variable-length data employing retransmission in the second variable-length slot.

According to a forty-sixth aspect of the present invention, in the forty-fifth aspect, the transmitting device has a first data link processing block performing transmission control of the variable-length data employing retransmission only in the form of a fixed-length ARQ frame, the first data link processing block generates a fixed-length ARQ frame in which the data length of significant data in the variable-length data employing retransmission is increased/decreased depending on whether the fixed-length data not employing retransmission to be multiplexed exists and dummy bits are inserted in the remaining part, and the transmitting device removes the dummy bits from the ARQ frame to convert the ARQ frame into a data link frame of variable-length data employing retransmission having a frame length equal to the length of the second variable-length slot, and multiplexes the data link frame of the variable-length data employing retransmission and the data frame of the fixed-length data not employing retransmission to generate the multiplex frame to be transmitted to the receiving device.

In accordance with the forty-sixth aspect, the frame timing of the data link frames of the variable-length data employing retransmission can have the same cycle and the same rate as the frame timing of PIAFS for the PHS data communication.

According to a forty-seventh aspect of the present invention, in the forty-sixth aspect, the receiving device has a second data link processing block performing transmission control of the variable-length data employing retransmission only in the form of a fixed-length ARQ frame, the receiving device demultiplexes a received multiplex frame into the data link frame of the variable-length data employing retransmission and the data frame of the fixed-length data not employing retransmission, inserts dummy bits into the demultiplexed data link frame of the variable-length data employing retransmission depending on whether the received multiplex frame includes the fixed-length data not employing retransmission to convert the data link frame of the variable-length data employing retransmission into the fixed-length ARQ frame, and gives the ARQ frame obtained by the conversion to the second data link processing block.

In accordance with the forty-seventh aspect, it is possible to easily convert received data into an ARQ frame of PIAFS for the PHS data communication, which allows a processing block for performing usual PHS data communication to process the data.

According to a forty-eighth aspect of the present invention, in the forty-seventh aspect, the frame length of the multiplex frame is equal to that of the ARQ frame.

A forty-ninth aspect of the present invention is directed to a method for performing multiplex transmission between a transmitting side and a receiving side by using multiplex frames on a composite data transmission network in which a first network performing synchronous communication and a second network performing asynchronous communication are connected to each other, wherein multiplex frames containing synchronization flags at the heads are always transmitted from the transmitting side to the receiving side while the communication is continuing, and when a communication is made within the first network, frame synchronization established prior to the data communication is kept by using the multiplex frames having a fixed frame length, without using the synchronization flags.

In accordance with the forty-ninth aspect, it is possible to realize the synchronous communication determined by PIAFS for PHS data communication while following the multiplex transmission method determined in H.223.

A fiftieth aspect of the present invention is directed to a method for performing multiplex transmission between a transmitting side and a receiving side by using multiplex frames in a composite data transmission network in which a first network performing synchronous communication and a second network performing asynchronous communication are connected to each other, wherein when the second network is interposed between the transmitting side and the receiving side, frame synchronization is acquired between the transmitting side and the receiving side by transmitting multiplex frames containing synchronization flags at the heads, and when making a communication within the first network, multiplex frames containing no synchronization flags are transmitted and frame synchronization established prior to the data communication is kept by using the multiplex frames having a fixed frame length.

In accordance with the fiftieth aspect, it is possible to realize the synchronous communication determined by PIAFS for PHS data communication while following the multiplex transmission method determined in H.223. Furthermore, when a communication is made within the first network, multiplex frames containing no synchronization flags are transmitted, improving the transmission efficiency.

A fifty-first aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data not employing retransmission in which a transmission error has occurred on the first transmission path is discarded at the connection from the first transmission path to the second transmission path.

In accordance with the fifty-first aspect, data not employing retransmission in which a transmission error has occurred on the first transmission path is discarded at the connection from the first transmission path to the second transmission path. This prevents unwanted data from being outputted onto the second transmission path, which prevents reduction of the bit rate on the second transmission path.

A fifty-second aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data employing retransmission is provided with a block-coded error correcting code and transmitted on the first transmission path, at the connection from the first transmission path to the second transmission path, the data employing retransmission is subjected to error correction with the error correcting code and then outputted onto the second transmission path with the error correcting code removed therefrom, and retransmission control thereof is performed between a transmitting terminal and a receiving terminal.

In accordance with the fifty-second aspect, at the connection from the first transmission path to the second transmission path, error correction only is applied to the data employing retransmission and retransmission control is not applied to the data employing retransmission. Then the error correcting code is removed and the data employing retransmission is outputted onto the second transmission path. This lessens the amount of data outputted onto the second transmission path, which prevents reduction of the bit rate on the second transmission path.

A fifty-third aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data employing retransmission is provided with a block-coded error correcting code and transmitted on the first transmission path, at the connection from the first transmission path to the second transmission path, the error correcting code is just removed, without error correction with the error correcting code, and then the data employing retransmission is outputted onto the second transmission path, and retransmission control thereof is performed between a transmitting terminal and a receiving terminal.

In accordance with the fifty-third aspect, at the connection from the first transmission path to the second transmission path, retransmission control to the data employing retransmission is not performed and the error correcting code is just removed, and the data employing retransmission is then outputted onto the second transmission path. This lessens the amount of data outputted onto the second transmission path, which prevents reduction of the bit rate on the second transmission path.

A fifty-fourth aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data employing retransmission is convolutional-coded with a certain code rate Rc and transmitted on the first transmission path, at the connection from the first transmission path to the second transmission path, the convolutional coding is decoded and then the data employing retransmission is outputted onto the second transmission path, and its retransmission control is performed between a transmitting terminal and a receiving terminal.

In accordance with the fifty-fourth aspect, at the connection from the first transmission path to the second transmission path, the convolutional-coded data employing retransmission is just decoded without retransmission control, which is outputted onto the second transmission path without being re-coded. This lessens the amount of data outputted onto the second transmission path, which prevents reduction of the bit rate of the second transmission path.

According to a fifty-fifth aspect of the present invention, in the fifty-fourth aspect, when Rv expresses a value obtained from the bit rate Vf of the first transmission path and the bit rate Vs of the second transmission path, $\{Rv=(Vf-Vs)Nf\}$, Lm expresses the frame length of the multiplex frame, Ld expresses the data length of the data employing retransmission subjected to the convolutional coding, and Lo expresses the length of overhead newly added at the time of transmission on the second transmission path, then the certain code rate Rc is calculated as $$Rc=Ld/(Lm \cdot Rv-Lo+Ld).$$

A fifty-sixth aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data not employing retransmission is convolutional-coded with a certain code rate Rc and transmitted on the first transmission path, and at the connection from the first transmission path to the second transmission path, the convolutional coding is decoded and then the data not employing retransmission is outputted onto the second transmission path.

In accordance with the fifty-sixth aspect, at the connection from the first transmission path to the second transmission path, the convolutional-coded data not employing retransmission is just decoded and is outputted onto the second transmission path without being re-coded. This lessens the amount of data outputted onto the second transmission path, which prevents reduction of the bit rate of the second transmission path.

According to a fifty-seventh aspect of the present invention, in the fifty-sixth aspect, when Rv expresses a value obtained from the bit rate Vf of the first transmission path and the bit rate Vs of the second transmission path, $\{Rv=(Vf-Vs)/Vf\}$, Lm expresses the frame length of the multiplex frame, Ld expresses the data length of the data not employing retransmission subjected to the convolutional coding, and Lo expresses the length of overhead newly added at the time of transmission on the second transmission path, then the certain code rate Rc is calculated as $$Rc=Ld/(Lm \cdot Rv-Lo+Ld).$$

A fifty-eighth aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data not employing retransmission is provided with a block-coded error correcting code and transmitted on the first transmission path, and at the connection from the first transmission path to the second transmission path, the data not employing retransmission is subjected to error correction with the error correcting code and then outputted onto the second transmission path with the error correcting code removed therefrom.

In accordance with the fifty-eighth aspect, at the connection from the first transmission path to the second transmission path, the data not employing retransmission is just subjected to error correction and the error correcting code is removed, and then the data not employing retransmission is outputted onto the second transmission path. This lessens the amount of data outputted onto the second transmission path, which prevents reduction of the bit rate of the second transmission path.

A fifty-ninth aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data not employing retransmission is provided with a block-coded error correcting code and transmitted on the first transmission path, and at the connection from the first transmission path to the second transmission path, the error correcting code is just removed, without error correction with the error correcting code, and then the data not employing retransmission is outputted onto the second transmission path.

In accordance with the fifty-ninth aspect, at the connection from the first transmission path to the second transmission path, the error correcting code is just removed and then the data not employing retransmission is outputted onto the second transmission path. This lessens the amount of data outputted onto the second transmission path, which prevents reduction of the bit rate on the second transmission path.

A sixtieth aspect of the present invention is directed to a method for multiplexing data employing retransmission to which error correction by retransmission control is applied and data not employing retransmission to which error correction by retransmission control is not applied by using multiplex frames on a composite data transmission path in which a first transmission path with a relatively high bit rate and a second transmission path with a relatively low bit rate are connected to each other, wherein when the multiplex frame is transmitted from the first transmission path to the second transmission path, the data employing retransmission is convolutional-coded with a certain code rate Rc and transmitted on the first transmission path, and at the connection from the first transmission path to the second transmission path, the convolutional coding is decoded and then the data employing retransmission is outputted onto the second transmission path, and its retransmission control is performed between a transmitting terminal and a receiving terminal, and the data not employing retransmission is convolutional-coded with a certain code rate Rc and transmitted on the first transmission path, and at the connection from the first transmission path to the second transmission path, the convolutional coding is decoded and then the data not employing retransmission is outputted onto the second transmission path.

In accordance with the sixtieth aspect, at the connection from the first transmission path to the second transmission path, the convolutional-coded data employing retransmission is decoded without being subjected to retransmission control, and then the data employing retransmission is outputted onto the second transmission path without being re-coded. This lessens the amount of the data employing retransmission outputted onto the second transmission path. Also, at the connection from the first transmission path to the second transmission path, the convolutional-coded data not employing retransmission is decoded and outputted onto the second transmission path without being coded again. This lessens the amount of the data not employing retransmission outputted onto the second transmission path.

According to a sixty-first aspect of the present invention, in the sixtieth aspect, when Rv expresses a value obtained from the bit rate Vf of the first transmission path and the bit rate Vs of the second transmission path, $\{Rv=(Vf-Vs)/Vf\}$, Lm expresses the frame length of the multiplex frame, Ld expresses the total of the data lengths of the data employing retransmission and the data not employing retransmission subjected to the convolutional coding, and Lo expresses the length of overhead newly added at the time of transmission on the second transmission path, then the certain code rate Rc is calculated as $$Rc=Ld/(Lm \cdot Rv-Lo+Ld).$$

A sixty-second aspect of the present invention is directed to a method for multiplexing and transmitting variable-length data employing retransmission to which error correction by retransmission control is applied and fixed-length data not employing retransmission to which error correction by retransmission control is not applied in multiplex frames, wherein the multiplex frames have a fixed length and a data link frame for storing the variable-length data employing retransmission has a frame length increased/decreased depending on the length of the fixed-length data not employing retransmission to be multiplexed so that the data link frame is transmitted at timing kept in synchronization with the transmission stream of the multiplex frames.

In accordance with the sixty-second aspect, the multiplex frames for storing the fixed-length data not employing retransmission and the variable-length data employing retransmission have a fixed length and a data link frame for storing the variable-length data employing retransmission has a frame length changed depending on the length of the fixed-length data not employing retransmission to be multiplexed so that the data link frames can be transmitted at timing synchronized with the transmission stream of the multiplex frames. Then the transmitting timing of the data link frames can be fixed and the boundaries between the data link frames are not lost in the event of a transmission error, providing error robustness. That is to say, unlike H.223 which acquires synchronization with flags, bits are not shifted due to "0" insertion, and even if the slot synchronization is lost due to a transmission error, it is possible to see the next header at once, providing easy resynchronization. Moreover, it is possible to effectively utilize silent periods of the fixed-length data not employing retransmission to increase the transmission efficiency of the video data, or the variable-length data employing retransmission.

A sixty-third aspect of the present invention is directed to a storage medium for storing software program to be executed in order to multiplex and transmit variable-length data employing retransmission to which error correction by retransmission control is applied and fixed-length data not employing retransmission to which error correction by retransmission control is not applied in multiplex frames, wherein said software program fix a length of said multiplex frame length and increase/decrease the length of data link frame length for storing said variable-length data employing retransmission depending on the length of said fixed-length data not employing retransmission to be multiplexed so that the data link frame is transmitted at timing kept in synchronization, for each the multiplex frame, with the transmission stream of said multiplex frames.

According to a sixty-forth aspect of the present invention, in the sixty-third aspect, when fixed-length data not employing retransmission to be multiplexed exists, a basic multiplex frame stream including at least one first multiplex frame in which the fixed-length data not employing retransmission is multiplexed and at least one second multiplex frame in which said fixed-length data not employing retransmission is not multiplexed is repeatedly transmitted.

A sixty-fifth aspect of the present invention is directed to a storage medium for storing a software program to be excuted in order to absorb the audio jitter on the side receiving multiplex frames when a low-bitrate-coded N-byte (N is a positive integer) audio frame generated at a rate of one frame per an F-byte (F is a positive integer and N<F) transmission time is stored and multiplexed in an M-byte (M is a positive integer and M<F) fixed-length multiplex frame and when at most J-byte (J is a positive integer) audio jitter is generated among the audio fields of the multiplex frames because F/M is not an integer, wherein said software program comprises
a first program step for identifing a reference audio frame separated from the next audio frame at a minimum interval among the audio frames on a stream of the transmitted multiplex frame, and
a second program step for outputting the following audio frames at the rate of one frame per the F-byte transmission time using the timing at which the reference audio frame is outputted as a reference,
wherein different multiplex information are defined for n multiplex frames containing multiplexed audio frames in a basic multiplex frame stream formed of m multiplex frames, where n and m are integers and n·F=m·M, and
the reference audio frame is identified on the basis of the multiplex information at said first program step.

A sixty-sixth aspect of the present invention is derected to a storage a medium for storing software program to be excuted in order to absorb the audio jitter on the side transmitting multiplex frames when a low-bitrate-coded N-byte (N is a positive integer) audio frame generated at a rate of one frame per an F-byte (F is a positive integer and N<F) transmission time is stored and multiplexed in an M-byte (M is a positive integer and M<F) fixed-length multiplex frame and when at most J-byte (J is a positive integer) audio jitter is generated among the audio fields of the multiplex frames because F/M is not an integer, wherein when the time from the start of a coding operation of an audio coder for coding audio data to the start of output of the first audio frame from the audio coder is taken as T, and the time required from the start of output of the first audio frame from the audio coder to the start of output of the multiplex frame containing the first audio frame is taken as $\alpha$,
using as a reference the timing of the start of output of the multiplex frame storing a reference audio frame separated from the next audio frame at a minimum interval in the audio frames on the transmitted multiplex frame stream, the coding operation of the audio coder is started preceding the reference timing at least for the total time of $(T+J+\alpha)$, and
wherein different multiplex information are defined for n multiplex frames containing multiplexed audio frames in a basic multiplex frame stream formed of m multiplex frames, where n and m are integers and n·F=m·M, and
the reference audio frame is identified on the basis of the multiplex information by the software program.

A sixty-seventh aspect of the present invention is directed to a storage medium for storing a software program to be executed in order to store in multiplex frames, multiplex and transmit a first data frame provided with a frame number and an error detecting code and second to kth data frame(s) (k is an integer of 2 or larger), wherein the multiplex frame is further provided with multiplex information indicating the structure of the multiplexing of the first data frame and the second to kth data frame(s), and
wherein the software program has
the transmitting side locate the frame number of the first data frame always in a fixed position in the multiplex frame and
when detecting presence of an error in said multiplex information in the multiplex frame received, the receiving side read the frame number of the first data frame from the fixed position in the multiplex frame and transmit a retransmission request for the read frame number to the transmitting side.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing a first example of a multiplex code table describing the relation between the multiplex structure and the multiplex information of the fixed-length multiplex frames.

FIG. 15 is a diagram showing a second example of a multiplex code table describing the relation between the multiplex structure and the multiplex information of the fixed-length multiplex frames.

FIG. 16 is a diagram showing a second structure and the data reading timing of a fixed-length multiplex frame used in the seventh embodiment of the present invention.

FIG. 17 is a diagram showing a third structure and the data reading timing of a fixed-length multiplex frame used in the seventh embodiment of the present invention.

FIG. 19 is a diagram showing a third example of a multiplex code table describing the relation between the multiplex structure and the multiplex information of the fixed-length multiplex frames.

FIG. 21 is a diagram showing a fourth example of a multiplex code table describing the relation between the multiplex structure and the multiplex information of the fixed-length multiplex frames.

FIG. 27 is a diagram showing a multiplex structure of multiplex frames used in an eleventh embodiment of the present invention.

FIG. 28 is a diagram showing a multiplex structure of multiplex frames used in the eleventh embodiment of the present invention.

FIG. 31 is a timing chart showing operation with retransmission control performed in the eleventh embodiment of the present invention.

FIG. 36 is a diagram illustrating a multiplex transmission method with each multiplex frame having a length of 60 bytes in the thirteenth embodiment of the present invention.

FIG. 42 is a diagram showing the structure of a multiplex frame inputted to the interconnecting device and the structure of the multiplex frame outputted from the interconnecting device in the sixteenth embodiment of the present invention.

FIG. 43 is a diagram showing the structure of a multiplex frame transmitted by a terminal connected to the PHS network in the seventeenth embodiment of the present invention.

DESCRIPTION OF THE PREFERRED EMBODIMENTS (First Preferred Embodiment)

An object of a first embodiment is to allow both multiplex frames and video frames to easily acquire frame synchronization to provide a high tolerance for errors, when multiplexing fixed-length data not employing retransmission (audio data coded according to G.723 herein) and variable-length data employing retransmission (video data coded by H.263 herein).

G.723 is a method for coding audio data to a rate of 5.3 Kbps, whose basic unit is formed of a 20-byte fixed-length frame. The fixed-length frames continue in a speech period in which audio is generated. Hence, when multiplexed on a transmission path with a higher rate, e.g., on a transmission path of 32 Kbps of the simplified portable telephone, PHS, the 20-byte fixed-length frames must necessarily be transmitted at a rate of one frame per 30 msec. On the other hand, it is not necessary to transmit the fixed-length frames during a silent period in which no audio is generated. In this case, on the receiving side, an audio decoder performs processing regarding the Period as silent, or outputs previously transmitted background sound. For transmission error, audio data provided with a 1-byte error detecting code is transmitted. Usually, the receiving side adopts the so-called muting method in which the audio data is discarded when an error is detected, that is, the audio decoder performs processing regarding audio data as silence.

On the other hand, H.263 is an image coding method for generating variable-length data, whose generated bit rate varies depending on the nature of the input image and definition, visibility, and the number of image frames of the transmitted image, and so on. In H.263, variations in the bit rate due to retransmission control are adjusted by the coding control, too.

When a 20-byte audio frame is included once in one fixed-length multiplex frame, the length of one fixed-length multiplex frame is 120 bytes. The length of an audio frame per one fixed-length multiplex frame may be set to 40 bytes or longer. In this case, however, it is necessary to store audio frames for storage in a multiplex frame, causing delay in audio.

Figure 1:
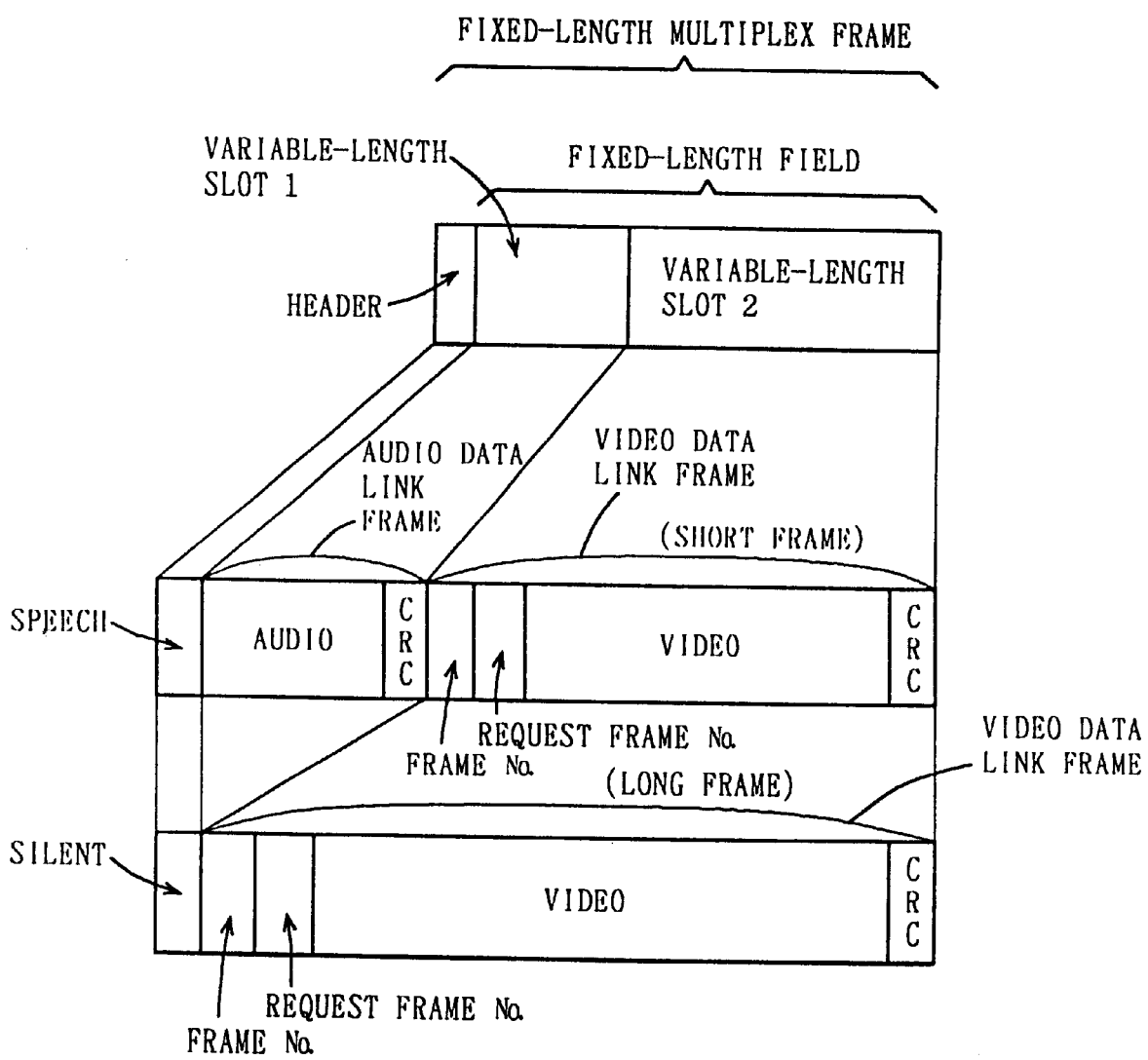
FIG. 1 is a diagram showing the structure of a fixed-length multiplex frame used in a first embodiment of the present invention.

FIG. 1 is a diagram showing the structure of a fixed-length multiplex frame used in a multiplex transmission method according to a first embodiment of the present invention. In FIG. 1, a header is provided at the head of the fixed-length multiplex frame. This header at least requires the function of distinguishing between multiplexing with active speech and multiplexing with inactive speech. In this embodiment, the header itself has the error detecting code or the error correcting code. The length of the header, including these codes, is selected to 1 byte. However, the length of the header can be decreased/increased depending on the number of patterns to be identified with the header and the error detecting or error correcting capability, which is not limited to the structure of this embodiment.

The 120-byte fixed-length multiplex frame minus the 1-byte header, or the 119-byte fixed-length field, is divided into two, a variable-length slot 1 and a variable-length slot 2.

The variable-length slot 1 is for transmitting an audio data link frame, whose size is equal to that of the audio data link frame, 21 bytes. The audio data link frame is formed of a 20-byte audio frame and a 1-byte CRC code (an error detecting code). The size of the variable-length slot 1 is 0 byte when there is no audio data link frame to be transmitted because speech is inactive.

The variable-length slot 2 contains the entirety of a data link frame storing video data, the frame number, the retransmission request code, and the error detecting code. The data link frame is one complete frame structure as one mass of data in error control. That is to say, a multiplex transmission system to which the embodiment is applied performs retransmission control of video data in data link frame units. In this embodiment, the size of the variable-length slot 2 changes depending on whether it is a speech period or a silent period. That is to say, in the case of active speech, the variable-length slot 2 has a size (98 bytes) corresponding to the fixed-length field (119 bytes) minus the variable-length slot 1 (21 bytes). In this case, the video data link frame is generated as a short frame having the same length of 98 bytes as the variable-length slot 2 and transmitted in the variable-length slot 2. In the silent period, the variable-length slot 2 has the same size (119 bytes) as the fixed-length field. In this case, the video data link frame is generated as a long frame having the same length of 119 bytes as the variable-length slot 2 and transmitted in the variable-length slot 2.

The video data link frame may be provided with various codes depending on the method used for the retransmission control. For example, a reject code may be inserted as a retransmission request code only when an error occurs. Or, a data length code indicating the length of significant data may be provided, or stuffing (the operation of adding dummy bits in the empty part and removing them on the receiving side) may be performed, without a data length code, if an empty part takes place in the data field.

As has been described so far, this embodiment changes the frame length of the video data link frame depending on whether it is a speech period or a silent period. This enables synchronization between the transmitting timing of the fixed-length multiplex frames and the transmitting timing of the data link frames. The synchronization between the transmitting timing of the fixed-length multiplex frames and the transmitting timing of the data link frames herein means a state in which transmission of (a) complete Y (Y is a natural number: Y=1 in this embodiment) data link frame(s) is secured while X (X is a natural number: X=1 in this embodiment) fixed-length multiplex frame(s) is (are) transmitted. In this case, considering the overheads accompanying the data link frame of video data (or computer data), such as the data length, the frame number, the retransmission request code, the error detecting code, and the retransmission efficiency determined by the error characteristics of the transmission path, two or more of the variable-length slots 2 in adjacent fixed-length multiplex frames may be combined and the data link frame for video may be structured to that length. Or, two video data link frames may be stored in three multiplex data link frames, or three video data link frames may be stored in four multiplex frames.

As described above, in this embodiment, transmission of one complete data link frame is always secured while one fixed-length multiplex frame is transmitted. When a video data link frame is stored over a plurality of adjacent multiplex frames, it is necessary to identify the stored multiplex frames. In this embodiment each multiplex frame is completed and this provides a still higher tolerance for errors.

Thus, in the first embodiment, the multiplex frames for carrying audio data and video data are of a fixed length and the data link frames for video have their frame lengths varied depending on whether it is in a speech period or a silent period, so as to acquire synchronization between the transmitting timing of the fixed-length multiplex frames and the transmitting timing of the data link frames. This enables constant transmitting timing for the data link frames, which prevents the boundaries between the data link frames from being lost in the event of a transmission error to provide robustness against errors. That is to say, unlike H.223 in which synchronization is acquired by using flags, bits are not shifted due to the "0" insertion, and even if slot synchronization is lost due to a transmission error, it is possible to see the next header at once, facilitating resynchronization. This also enables effective utilization of the inactive speech periods to increase the transmission efficiency of video data, or the variable-length data employing retransmission.

Although the first embodiment has explained multiplexing of the audio data and the video data, other data such as the computer data may be transmitted as the variable-length data employing retransmission, or the audio data, the video data and the computer data can be multiplexed to provide the same effects. Although the first embodiment has explained the case in which the audio data link frame has a length of 21 bytes, the present invention is not limited to it. That is to say, the frame length of the audio frame may be otherwise determined. Audio data link frames provided with error-correcting redundant bits having different lengths, or audio data link frames coded to another bit rate, e.g., to 6.3 Kbps, may be used as well.

Furthermore, while the audio data link frame in the first embodiment can take two kinds of lengths (21 bytes and 0 byte) in the speech period and the silent period, it may take three or more kinds of lengths. In this case, synchronization is acquired between the transmitting timing of the fixed-length multiplex frames and the transmitting timing of the data link frames by adjusting the lengths of the variable-length slots 1 and 2 according to the length of the audio data link frame and sizing the video data link frame equal to the length of the variable-length slot 2.

(Second Preferred Embodiment)

Figure 2:
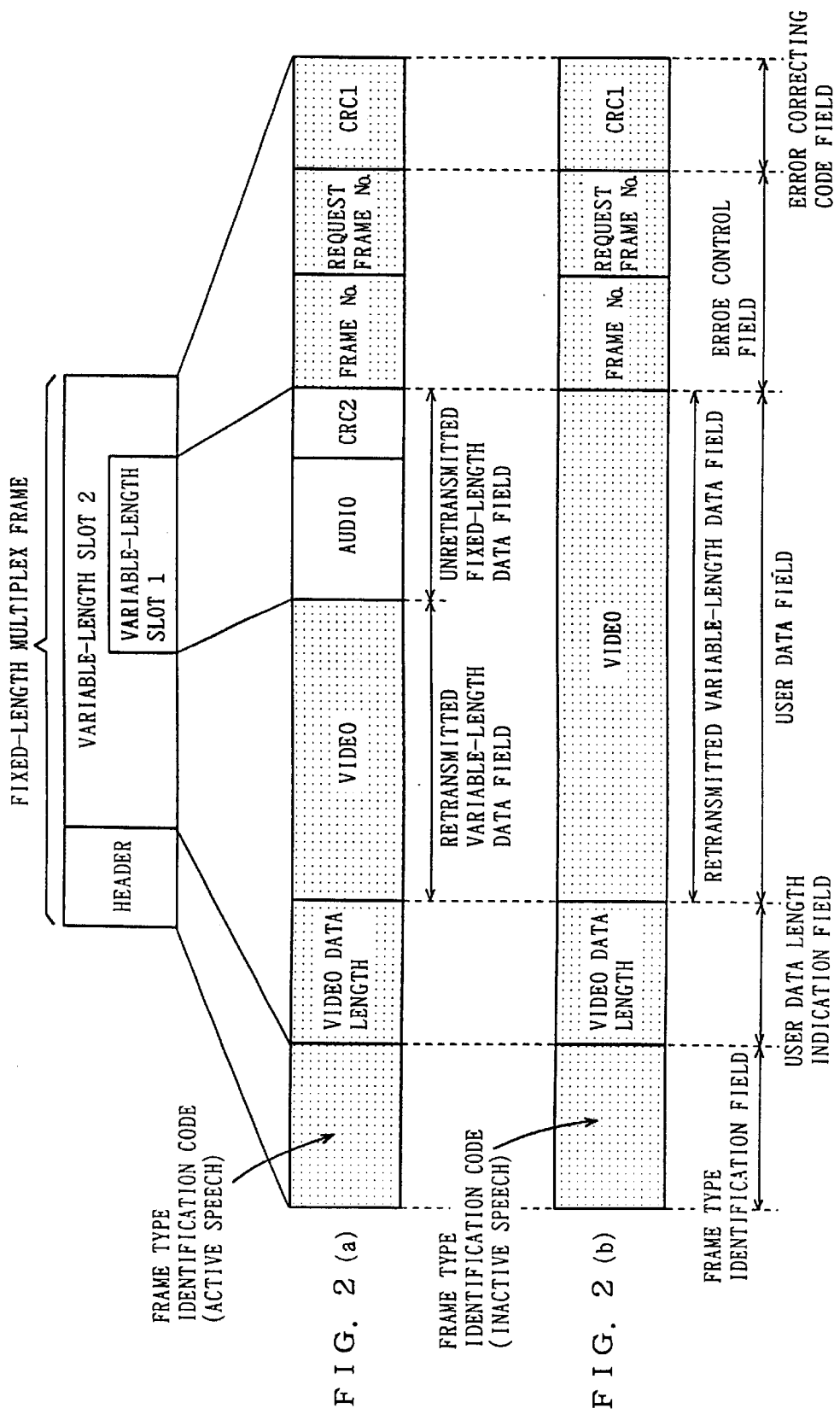
FIG. 2 is a diagram showing the structure of a fixed-length multiplex frame used in a second embodiment of the present invention.

FIG. 2 is a diagram showing a structure of a fixed-length multiplex frame used in a multiplex transmission method according to a second embodiment of the present invention. This embodiment adopts the structure of the ARQ frame of PIAFS as a structure of the fixed-length multiplex frame. That is to say, in this embodiment, the video data as the variable-length data employing retransmission and the audio data as the fixed-length data not employing retransmission are stored in the user data field of the ARQ frame in PIAFS.

As has been explained above, the ARQ frame of PIAFS is a data link frame formed of the frame type identification field for storing the frame type identification code, the user data field for storing user data, the user data length indication field indicating the data length of the significant data in the user data field, the error control field for storing the frame number and the request frame number used in the retransmission control, and the error correcting code field for storing the error correcting code for detecting error in the entire ARQ frame.

In this embodiment, as shown in FIG. 2(a), the user data field is divided into a data field for variable-length data employing retransmission and a data field for fixed-length data not employing retransmission to store the audio data in the user data field. These fields are previously agreed between transmitting and receiving sides.

When audio data is coded by using G.723, audio data is generated at 20 bytes/30 msec. In the G.723 system, however, no audio data is generated if it is silent during the unit time of 30 msec. When no audio data is generated, transmission is made by using the frame shown in FIG. 2(b) in this embodiment.

When audio data to be multiplexed exists, the transmitting side performs the transmission by using the frame of FIG. 2(a). That is to say, the transmission is made with the video data stored in the data field for variable-length data employing retransmission and the audio data provided with a CRC2, an error detecting code, stored in the data field for fixed-length data not employing retransmission. On the other hand, with no audio data to be multiplexed, the transmitting side conducts the transmission by using the frame of FIG. 2(b). That is to say, it performs the transmission with only the video data stored in the data field for variable-length data employing retransmission. Stored in the frame type identification field is a code indicating whether audio data is multiplexed in the user data field and stored in the user data length indication field is the data length of the video data. Stored in the error control field is the frame number and the request frame number required to conduct the retransmission control defined in PIAFS. Stored in the error correcting code field is the CRC1, which is the error detecting code for error detection in the dotted parts in FIG. 2(a) and FIG. 2(b), i.e., the frame type identification field, the user data length indication field, the video data having the length shown in the user data length indication field and the error control field.

On receiving the fixed-length multiplex frame, the receiving side first reads the frame type identification code in the frame type identification field to determine whether audio data is multiplexed in the user data field. When audio data is multiplexed as shown in FIG. 2(a), it extracts the audio data and the CRC2 from the no-retransmission-employing fixed-length data field. Then it detects error in the audio data by using the CRC2. When detecting an error, it discards the audio data, and when detecting no error, it gives the audio data to the upper layer.

The receiving side applies the transmission control defined in PIAFS to the data left after the audio data has been extracted. First, it reads the video data length from the user data length indication field to determine the area to be assigned to the CRC1 in the error correcting code field and performs error detection. In FIG. 2(a) and (b), the dotted parts correspond to the area error-detected by the CRC1. If an error is found, the data from which the audio data has been extracted is discarded.

This way, in the second embodiment, fixed-length data not employing retransmission control is multiplexed in the user data field of the ARQ frame defined in PIAFS. This enables multiplex transmission of video data and audio data without deteriorating the frame synchronization function providing a high tolerance for error realized in PIAFS.

In the second embodiment, the information indicating whether audio data is multiplexed or not is included in the frame type identification code. However, the receiving side may determine that a data field for fixed-length data not employing retransmission exists only when the video data length indicated in the user data length indication field is shorter than the length of the field for variable-length data employing retransmission in FIG. 2(a) to conduct the error detection of the audio data. Then if no error is found, it will give the audio data to the upper layer. This eliminates the necessity of including the information showing whether audio data is multiplexed in the frame type identification code, then the frame type identification code defined in PIAFS can be used as it is.

Although the second embodiment has explained multiplexing and transmitting of the audio data and the video data, other data such as the computer data may be transmitted as the variable-length data employing retransmission, or the audio data, the video data and the computer data can be multiplexed to provide the same effects. The audio data defined in PIAFS is applied to the retransmission control, but it is not limited to it. The retransmission control with less delay may be applied to it.

Although the second embodiment has explained the case in which the audio frame has a length of 20 bytes, the present invention is not limited to it. That is to say, the frame length of the audio frame may be set to another value. Audio data link frames provided with error-correcting redundant bits of different lengths, or audio frames coded to another bit rate, e.g., 6.3 Kbps, may be used as well.

(Third Preferred Embodiment)

Figure 3:
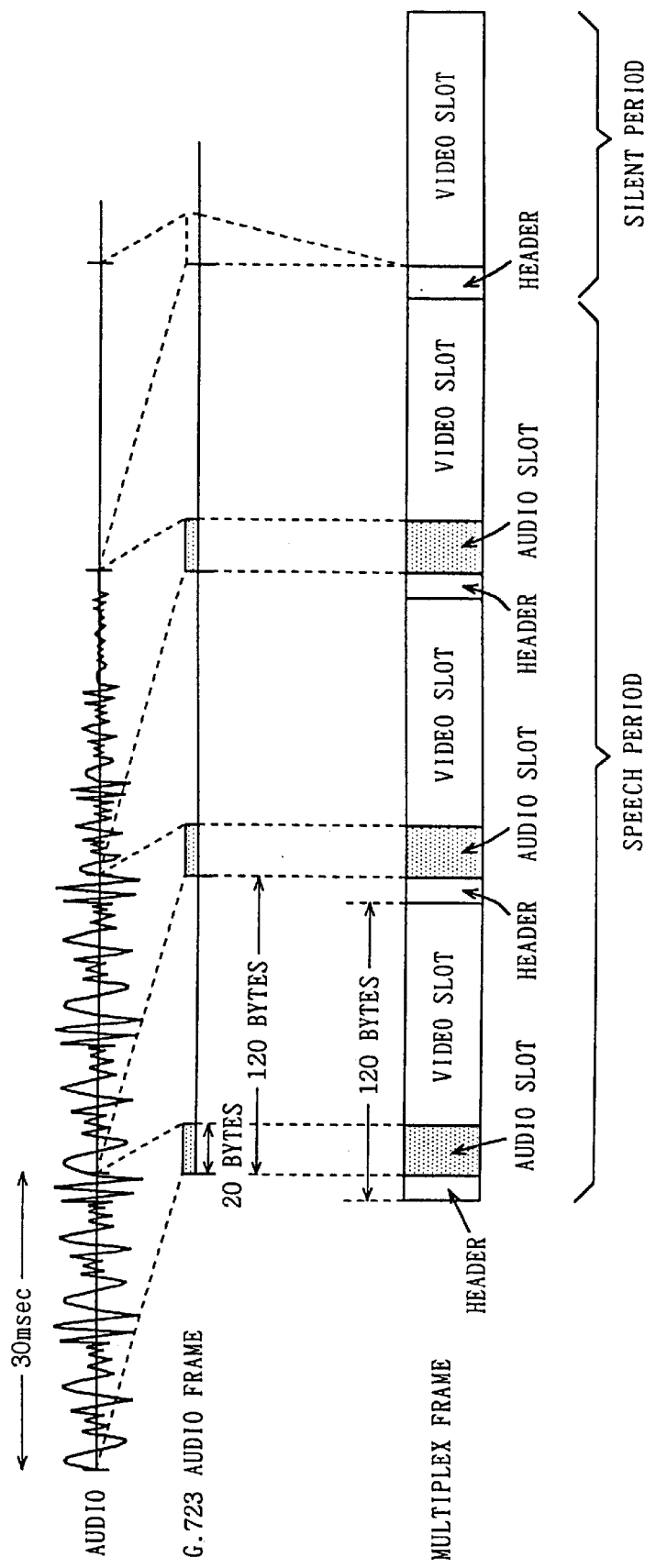
FIG. 3 is a diagram showing the multiplexing in the first or second embodiment, wherein audio data coded by G.723 is multiplexed with video data in the multiplex frames having a frame length set to 120 bytes and transmitted through a transmission path at 32 Kbps of PHS which is a simplified mobile telephone.
Figure 4:
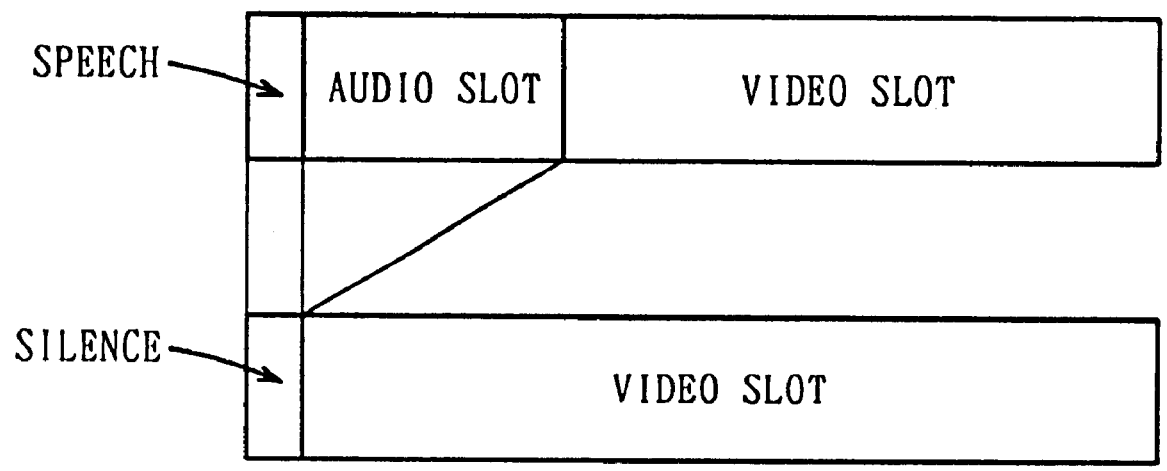
FIG. 4 is a diagram showing video slots of different sizes in a speech period and in a silent period in the multiplex frame shown in FIG. 3.

In the first and second embodiments described above, the following problem arises when audio data and other data are multiplexed. FIG. 3 shows an example of multiplexing in which audio data coded by G.723 is multiplexed with video data and transmitted through the 32-Kbps transmission path of PHS, a simplified portable telephone, with the multiplex frame length set to 120 bytes. As has been stated above, G.723 codes audio at a bit rate of 5.3 Kbps, wherein the audio signal is coded in 30-msec unit to form a fixed-length frame of 20 bytes. This fixed-length frame of 20 bytes is undividable and must necessarily be transmitted at a rate of one per 30 msec in a speech period. That is to say, in the case of PHS, an audio frame of 20 bytes must be multiplexed every time 120-byte data is transmitted. In a silent period without audio, it is not necessary to transmit the fixed-length frame. In this case, the audio decoder on the receiving side performs processing for silence, or outputs previously transmitted background sound. When the multiplex frame length is set to 120 bytes, the size of the video slot differs in a speech period and a silent period, as shown in FIG. 4.

In the first and second embodiments, a slot must include one complete ARQ frame (i.e., a data link frame). If the ARQ frame size is set equal to the slot size to improve the transmission efficiency, the size of the ARQ frame for video differs in a speech period and a silent period. Then, if a video frame transmitted in a silent period fails, it can not be retransmitted in a video slot in a speech period. The retransmission must be performed in the next silent period, or it must be performed by inserting a silent frame into a speech period in a forced manner. When the retransmission is made in the silent period coming next, a delay occurs in the retransmission data. This data delay exerts fatal effect especially on the transmission of the video data which requires real-time performance. When a silent frame is forced into a speech period, the transmission error only in the variable-length data employing retransmission causes audio to be muted, as if an error existed in audio, providing adverse effects on the quality of audio. The third embodiment is to solve these problems, which will now be explained referring to the drawings.

Figure 5:
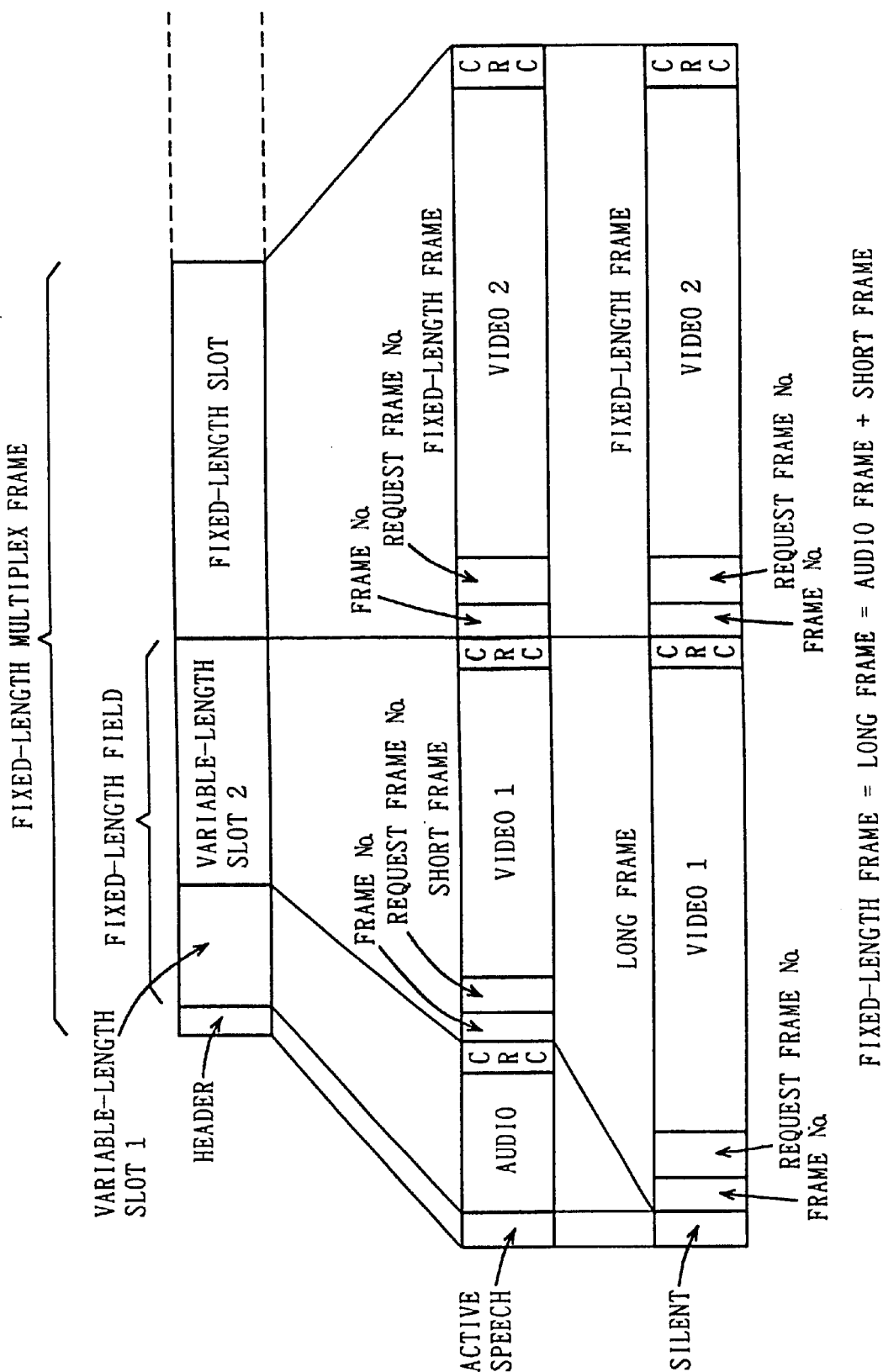
FIG. 5 is a diagram showing the structure of a fixed-length multiplex frame used in a third embodiment of the present invention.

FIG. 5 is a diagram showing the structure of a fixed-length multiplex frame used in a multiplex transmission method according to the third embodiment of the present invention. In FIG. 5, the fixed-length multiplex frame used in this embodiment includes a header, a fixed-length field, and a fixed-length slot. The fixed-length field is divided into two, a variable-length slot 1 and a variable-length slot 2. As in the first or second embodiment, the variable-length slot 1 contains a 20-byte audio frame plus a 1-byte CRC. A video data link frame is transmitted in the variable-length slot 2, whose size increases in a silent period, as has been explained in the first and second embodiments. The entire length of the fixed-length multiplex frame is selected to be 120 bytes.

The length of the fixed-length slot is set equal to or longer than the length of the fixed-length field. The retransmission of the variable-length slot 2 is made in the fixed-length slot in this embodiment. Hence, considering reduction of efficiency, it is desirable to set the length of the fixed-length slot to be as close to the length of the fixed-length field as possible. If the length of the fixed-length field and the length of the fixed-length slot are equal, it is possible to retransmit a data link frame transmitted in the fixed-length slot by using the variable-length slot 2 in a silent period. Herein, it is impossible to set the length of the fixed-length field equal to that of the fixed-length slot, for the header length is of an odd number of 1 byte. Accordingly, in this embodiment, the fixed-length field is set to 59 bytes and the fixed-length slot is set to 60 bytes.

This embodiment will now be explained in more detail in an example in which audio data coded by G.723 and video data coded by H.263 are multiplexed, like in the first embodiment.

In a speech period, in this embodiment, a video 1 frame with a 37-byte data link frame length is transmitted in the variable-length slot 2 and a video 2 frame with a 60-byte data link frame length is transmitted in the fixed-length slot. It is then repeated, where retransmissions of the frames are conducted by using the respective slots.

On the other hand, in a silent period, in this embodiment, the video 1 data link frame is set to 59 bytes and transmitted in the variable-length slot 2 and the video 2 frame with a 60-byte data link frame length is transmitted in the fixed-length slot.

Next, the retransmission is described. When a data link frame transmitted in a silent period has an error, it is transmitted in the same type of slot as long as the silent period continues. If speech is generated at the time of retransmitting a long frame transmitted in a silent period, the long frame of the video 1 frame is retransmitted in the fixed-length slot, instead of transmitting a new video 2 frame. If the speech becomes inactive at the time of retransmitting a video 1 frame transmitted in the previous speech period, it is transmitted in the long frame of the video 1 with a data length specified or stuffing.

Thus, according to the third embodiment, the length of the data link frame of video data in the fixed-length field is increased/decreased depending on the length of the audio frame to keep the transmitting timing of the fixed-length multiplex frames and the transmitting timing of the data link frames in synchronization. Then the boundaries between the data link frames will not be lost due to a transmission error, providing improved error robustness. Furthermore, a long frame of the variable-length slot 2 can be retransmitted by using a fixed-length slot without waiting for the next silent period to come, enabling retransmission without video delay.

Although the third embodiment has described a multiplex transmission for transmitting audio data and video data, other data such as computer data may be transmitted as the variable-length data employing retransmission. It is also possible to multiplex and transmit audio data, computer data and video data by transmitting the video data in the variable-length slot 2 and transmitting the computer data in the fixed-length slot, for example, though the silent periods can not be effectively utilized in this case. Considering the overheads accompanying the data link frame of the video data (or the computer data), such as the data length, the frame number, the retransmission request code, the error detecting code, and the retransmission efficiency determined by the error characteristics of the transmission path, two or more variable-length slots 2 in adjacent fixed-length multiplex frames may be combined and the data link frame for video data may be structured to that length.

Although the third embodiment has explained the case in which the audio frame has a length of 20 bytes, the present invention is not limited to it. That is to say, the frame length of the audio frame may take other values. Audio data link frames provided with redundant bits for error correction, or audio frames coded to another bit rate, e.g., 6.3 Kbps, may be used as well.

(Fourth Preferred Embodiment)

Figure 6:
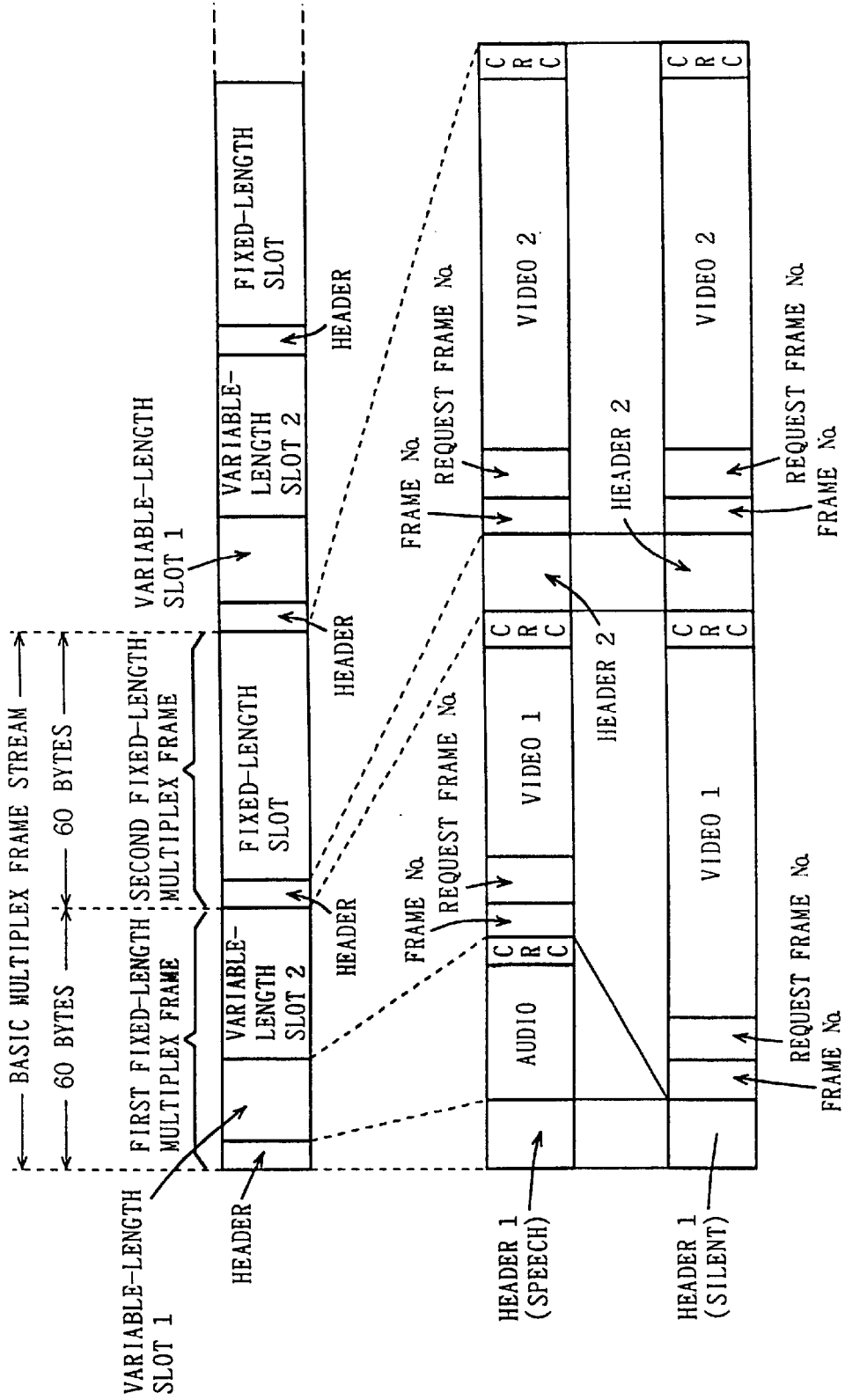
FIG. 6 is a diagram showing the structure of a fixed-length multiplex frame used in a fourth embodiment of the present invention.

FIG. 6 is a diagram showing the structure of a fixed-length multiplex frame used in a multiplex transmission method according to a fourth embodiment of the present invention. In FIG. 6, this embodiment alternately and continuously transmits a 60-byte first fixed-length multiplex frame containing a header, a variable-length slot 1, and a variable-length slot 2 and a second fixed-length multiplex frame having the same length as the first fixed-length multiplex frame and containing a fixed-length slot in the part other than the header. The internal structure of the first fixed-length multiplex frame is the same as that of the fixed-length multiplex frame of the first embodiment. However, note that the frame length is half of that of the first embodiment (60 bytes). The internal structure of the second fixed-length multiplex frame includes the fixed-length slot of the third embodiment and the header.

In this embodiment, the fixed-length data not employing retransmission (e.g., audio data) is transmitted by using the variable-length slot 1, the variable-length data employing retransmission (e.g., video data) by using the variable-length slot 2, and the variable-length data employing retransmission (e.g., video data) by using the fixed-length slot. The variable-length data employing retransmission is retransmitted, when an error occurs, in the same manner as that described in the third embodiment, which is not explained again here.

(Fifth Preferred Embodiment)

Figure 7:
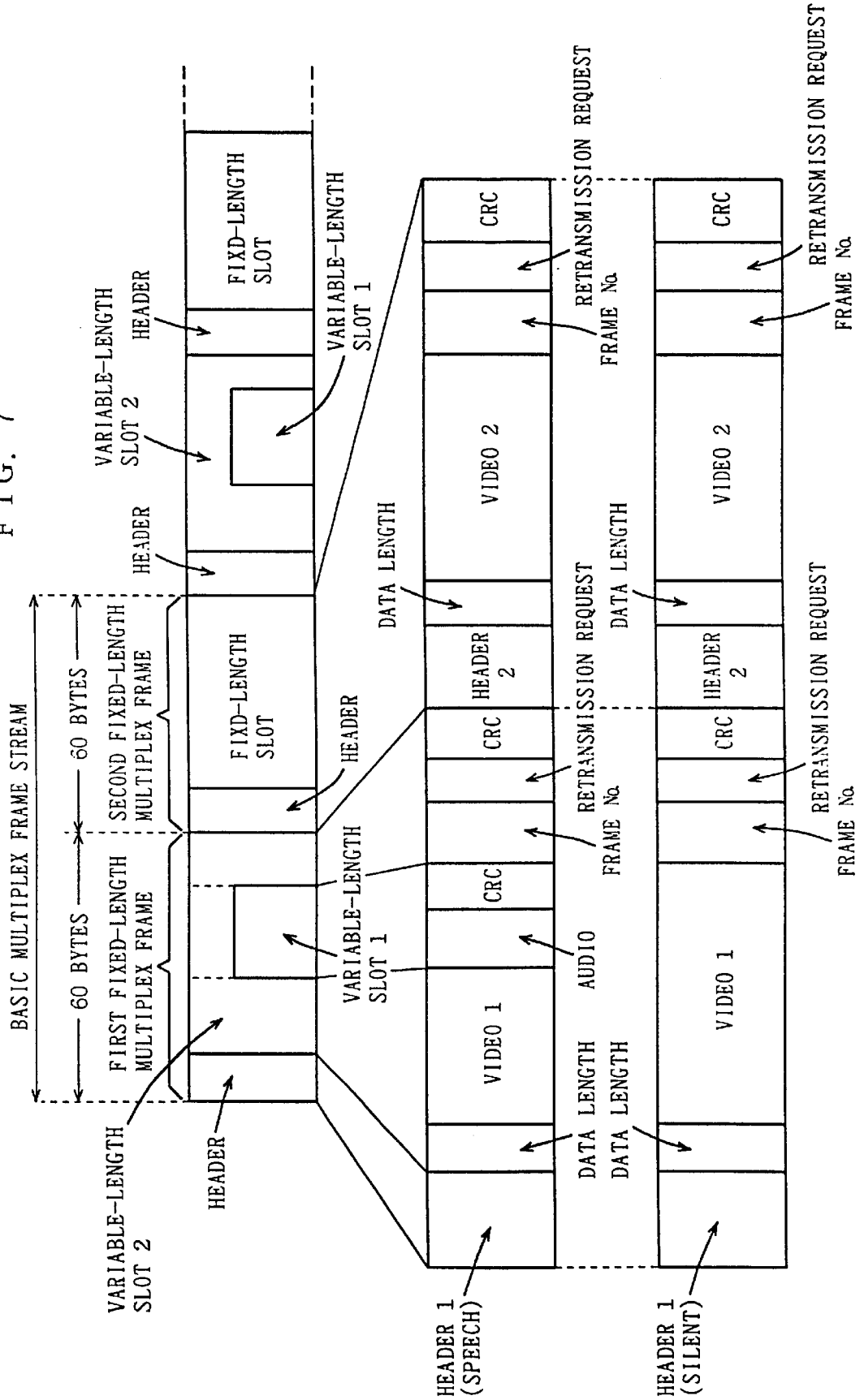
FIG. 7 is a diagram showing the structure of a fixed-length multiplex frame used in a fifth embodiment of the present invention.

FIG. 7 is a diagram showing the structure of a fixed-length multiplex frame used in a multiplex transmission method according to a fifth embodiment of the present invention. In FIG. 7, like the fourth embodiment, this embodiment transmits a 60-byte first fixed-length multiplex frame containing a header, a variable-length slot 1, and a variable-length slot 2 and a second fixed-length multiplex frame having the same length as the first fixed-length multiplex frame and containing a fixed-length slot in the part other than the header in an alternate and continuous manner. The first fixed-length multiplex frame has the same internal structure as the fixed-length multiplex frame of the second embodiment. The second fixed-length multiplex frame has the same internal structure as the PIAFS ARQ frame.

In this embodiment, fixed-length data not employing retransmission (e.g., audio data) is transmitted by using the variable-length slot 1, variable-length data employing retransmission (e.g., video data) is transmitted by using the variable-length slot 2, and variable-length data employing retransmission (e.g., video data) is transmitted by using the fixed-length slot. The variable-length data employing retransmission is retransmitted, when an error occurs, in the same manner as that in the third embodiment, which is not explained here again.

The fourth and fifth embodiments have shown examples in which a 60-byte first fixed-length multiplex frame including a variable-length slot 1 for storing a 20-byte audio frame and a 60-byte second fixed-length multiplex frame including no audio frame are alternately transmitted to transmit 20-byte audio data per 120 bytes. In this case, the frame length of the variable-length data employing retransmission includes 40 bytes and 60 bytes.

As the length of the retransmission-employing variable-length data frame closely relates to the transmission efficiency, a still larger frame length may be suitable. Accordingly, as shown in FIG. 8(a) and FIG. 9(a), an 80-byte first fixed-length multiplex frame including a variable-length slot 1 for storing a 20-byte audio frame and an 80-byte second fixed-length multiplex frame including no audio frame may be transmitted in such a pattern that they appear at a ratio of 2:1.

Figure 8:
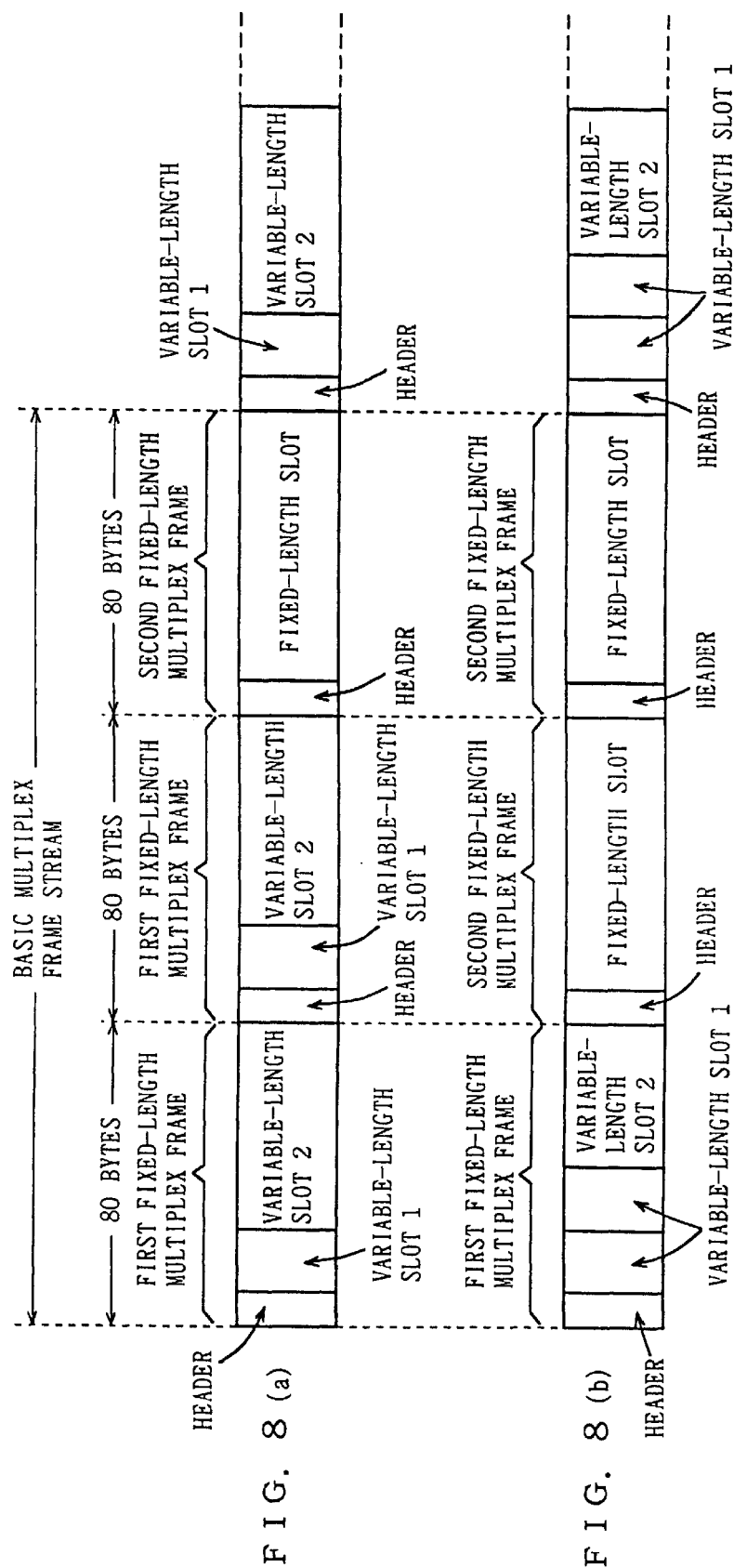
FIG. 8 is a diagram showing the structure of a fixed-length multiplex frame in the fourth embodiment, in which the frame length of each fixed-length multiplex frame is changed from 60 bytes to 80 bytes.
Figure 9:
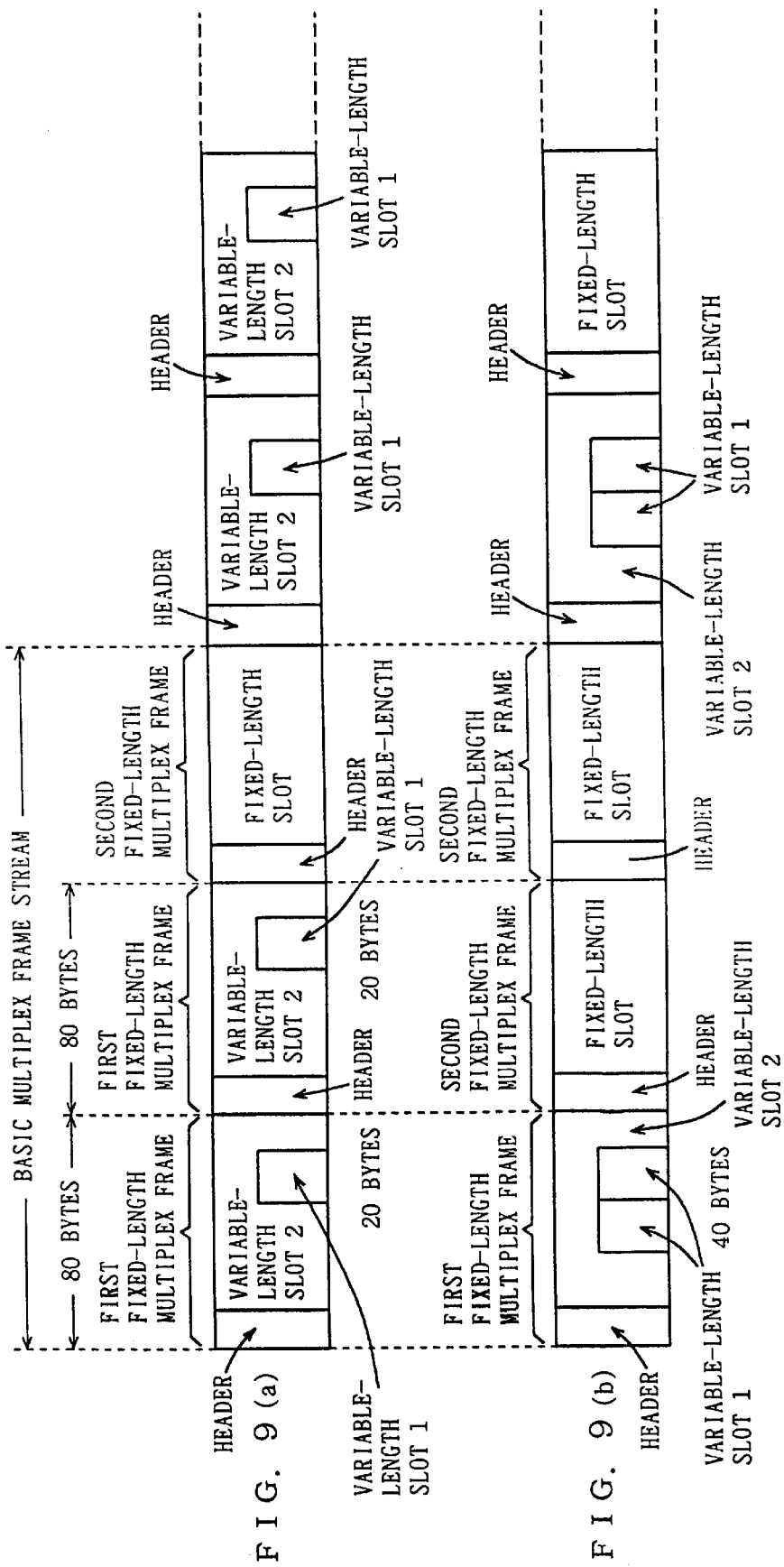
FIG. 9 is a diagram showing the structure of a fixed-length multiplex frame in the fifth embodiment, in which the frame length of each fixed-length multiplex frame is changed from 60 bytes to 80 bytes.

Or, as shown in FIG. 8(b) and FIG. 9(b), an 80-byte first fixed-length multiplex frame including a variable-length slot 1 capable of storing two 20-byte audio frames and an 80-byte second fixed-length multiplex frame including no audio frames may be transmitted in such a pattern that they appear at a ratio of 1:2.

In addition, also possible are a pattern in which a 90-byte first fixed-length multiplex frame including a 20-byte audio frame and a 90-byte second fixed-length multiplex frame including no audio frame appear at a ratio of 1:3, or a pattern in which a 100-byte first fixed-length multiplex frame including a 20-byte audio frame and a 100-byte second fixed-length multiplex frame including no audio frame appear at a ratio of 1:5.

In any of the above-described implementations, 20-byte audio frames can be transmitted per 120 bytes. In any of the cases, the variable-length slot 2 forms a long frame when no audio frame is generated in a silent period. When an error occurs in this long frame, it is retransmitted, if the silent period is continuing, by using the variable-length slot 2 forming a long frame in the first fixed-length multiplex frame, or it is retransmitted, if speech takes place, by using the fixed-length slot of the second fixed-length multiplex frame.

Thus, according to the fourth and fifth embodiments, while the silent periods are effectively utilized, synchronization is acquired between the transmitting timing of the data link frames and the transmitting timing of the fixed-length multiplex frames by increasing/decreasing the data link frame length of the video data, or the variable-length data employing retransmission. This realizes video and audio multiplex transmission having error robustness and high efficiency. Furthermore, the retransmission of a long frame of the variable-length slot 2 can be made, without waiting for the next silent period to come, by using the fixed-length slot. This enables retransmission without delay of video.

Although the fourth and fifth embodiments have described the multiplex transmission for transmitting audio data and video data, other data such as computer data may be transmitted as the variable-length data employing retransmission. In this case, the same data link frames having the same header may be used for the first fixed-length multiplex frame in which the variable-length slot 2 forms a long frame and the second fixed-length multiplex frame. It is also possible to multiplex and transmit audio data, computer data and video data by transmitting the video data in the variable-length slot 2 and transmitting the computer data in the fixed-length slot, though the silent periods can not be effectively utilized in this case. Considering the overheads accompanying the data link frame of the video data (or the computer data), such as the data length, the frame number, the retransmission request code, and the error detecting code, and the retransmission efficiency determined by the error characteristics of the transmission path, two or more variable-length slots 2 in adjacent fixed-length multiplex frames may be combined and a data link frame for the video data may be structured to that length.

Although the fourth and fifth embodiments have explained the case in which the audio frame has a length of 20 bytes, the present invention is not limited to it. That is to say, the frame length of the audio frame can take other values. Audio data link frames provided with redundant bits for error correction, or audio frames coded to another bit rate, e.g., to 6.3 Kbps, may be used as well.

(Sixth Preferred Embodiment)

The first to fifth embodiments have shown implementations in which the video data is transmitted as the variable-length data employing retransmission. Now, an implementation in which common computer data is transmitted as the variable-length data employing retransmission will be considered.

Figure 10:
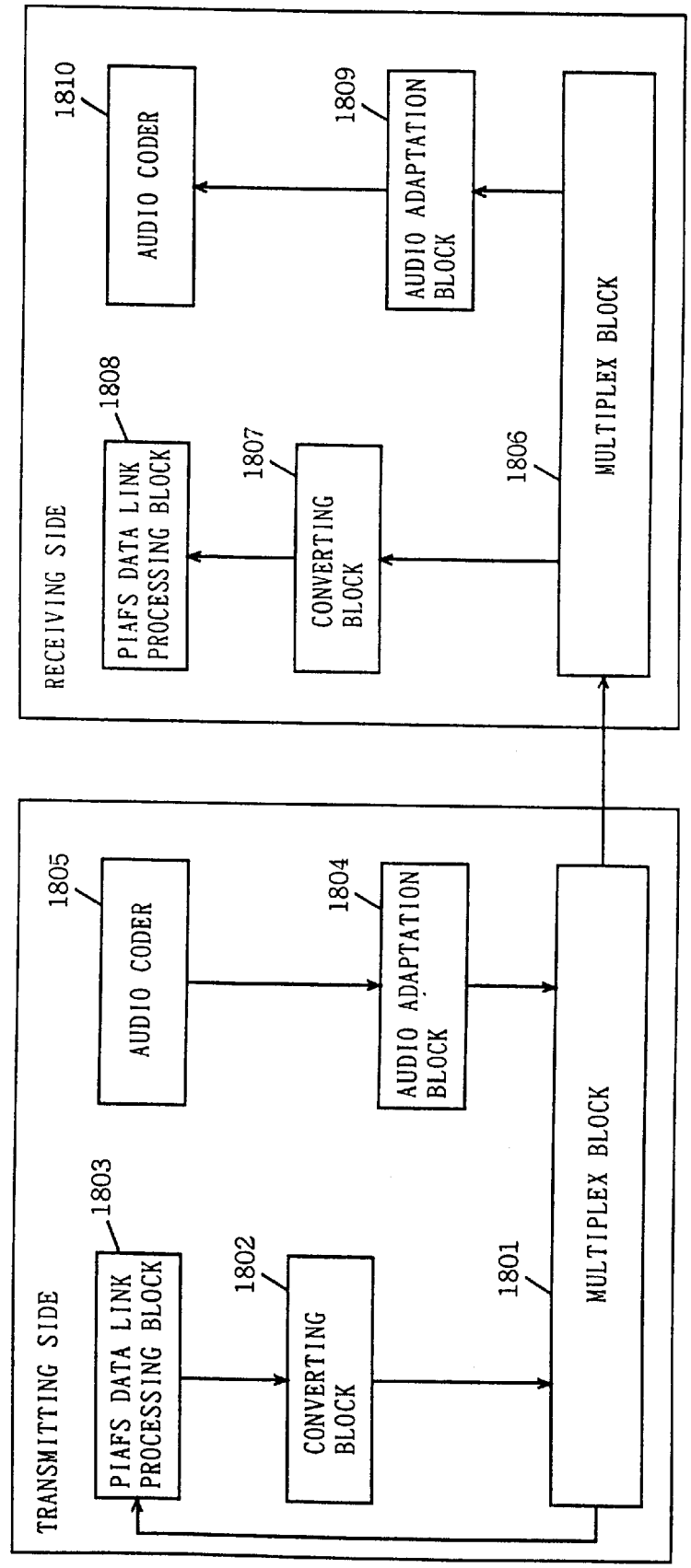
FIG. 10 is a layer diagram showing the structure of multiplex transmission devices in a sixth embodiment of the present invention.

FIG. 10 is a layer diagram showing the structure of a multiplex transmission device according to a sixth embodiment of the present invention. The multiplex transmission device of this embodiment is so constructed as to perform the transmission control according to that suggested in the above descrived PIAFS.

Figure 11:
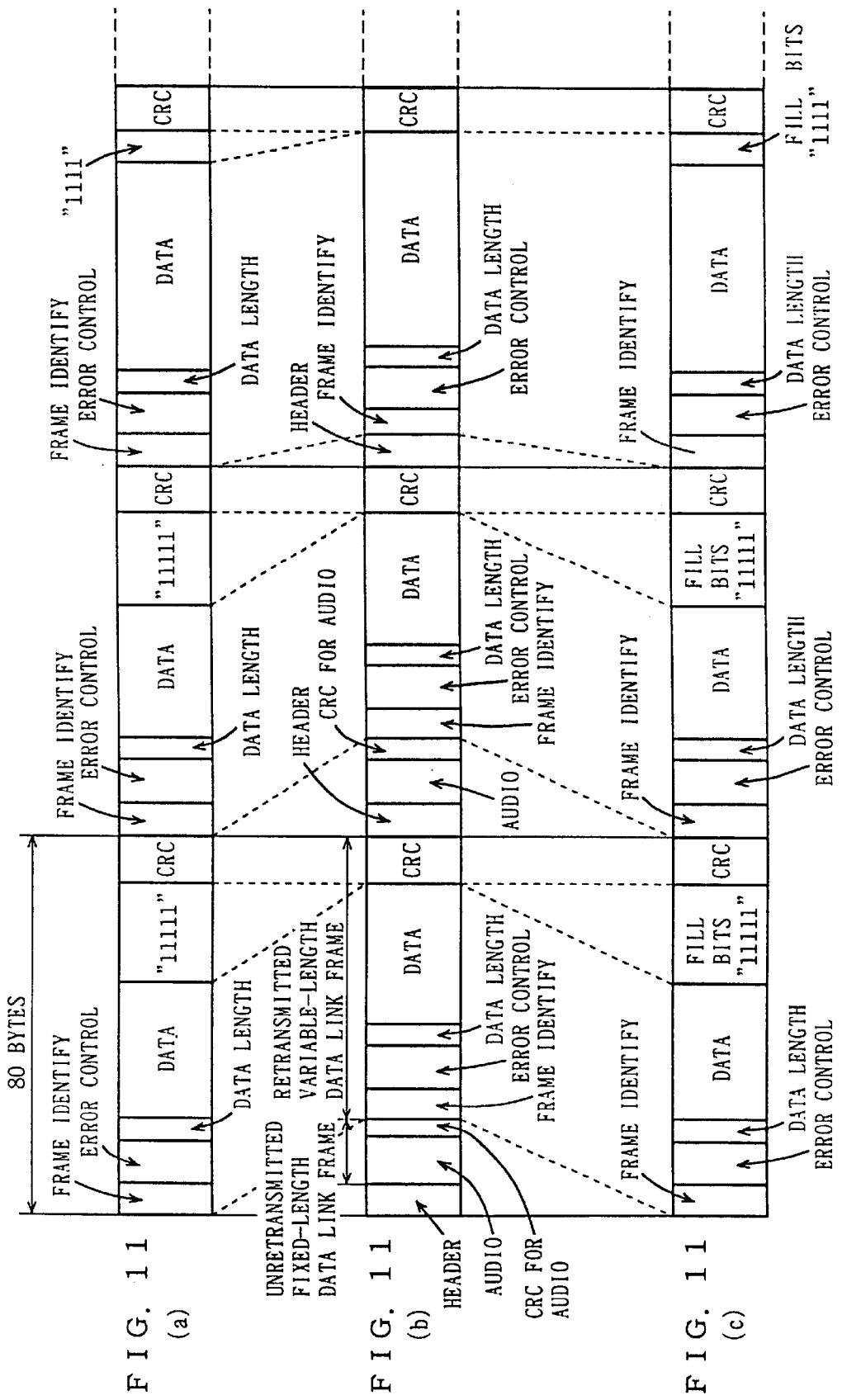
FIG. 11 is a diagram showing a first example of structure of a fixed-length multiplex frame used in the multiplex transmission device of FIG. 10.

FIG. 11 is a diagram showing a first example of structure of a fixed-length multiplex frame used in the multiplex transmission device of FIG. 10. In the fixed-length multiplex frame of FIG. 11, like that in the first embodiment, a data link frame for the variable-length data employing retransmission and a data link frame for the fixed-length data not employing retransmission are multiplexed together with the header containing the information showing the type of the multiplexing.

On the transmitting side, as shown in FIG. 11(*a*), the PIAFS data link processing block 1803 produces a PIAFS ARQ frame in which the significant data (the variable-length data employing retransmission) length in the user data is increased/decreased depending on presence/absence of a data link frame for the fixed-length data not employing retransmission to be multiplexed in the fixed-length multiplex frame. More specifically, the PIAFS data link processing block 1803 limits the length of the significant data in the user data under the maximum length of the user data minus the length of the data link frame for the fixed-length data not employing retransmission to be multiplexed and the header length. The converting block 1802 eliminates the dummy bits in the user data to convert it into a data link frame for the variable-length data employing retransmission having a reduced PIAFS user data field. The multiplexing block 1801 multiplexes a data link frame of fixed-length data not employing retransmission and the data link frame of the variable-length data employing retransmission and adds the header to constitute a fixed-length multiplex frame. (Refer to FIG. 11(*b*).)

The length of the fixed-length multiplex frame is set to the same size as the PIAFS ARQ frame length in PHS data communication (80 bytes). In this case, when they are transmitted by the method shown in the fifth embodiment (refer to FIG. 9), the length of the fixed-length multiplex frames can be set to 80 bytes. When the fixed-length multiplex frame has the same frame length as the PIAFS ARQ frame length in the PHS data communication, the frame timing of the data link frames of the variable-length data employing retransmission can have the same cycle and the same rate as the frame timing of PIAFS in the PHS data communication.

On the receiving side, the multiplex block 1806 demultiplexes the received fixed-length multiplex frame into the data link frame of the fixed-length data not employing retransmission and the data link frame of the variable-length data employing retransmission, and gives the former to the audio adaptation block 1809 and the latter to the converting block 1807. As shown in FIG. 11(*c*), the converting block 1807 inserts the fill bits "1" to the part in which the number is shorter than 80, between the user data field and the error detecting code to size the entirety to 80 bytes, and gives it to the PIAFS data link processing block 1808 for the PHS data communication. Thus the received data can be easily converted into a PIAFS ARQ frame for PHS data communication, then a processing block for common PHS data communication can process the data.

Figure 12:
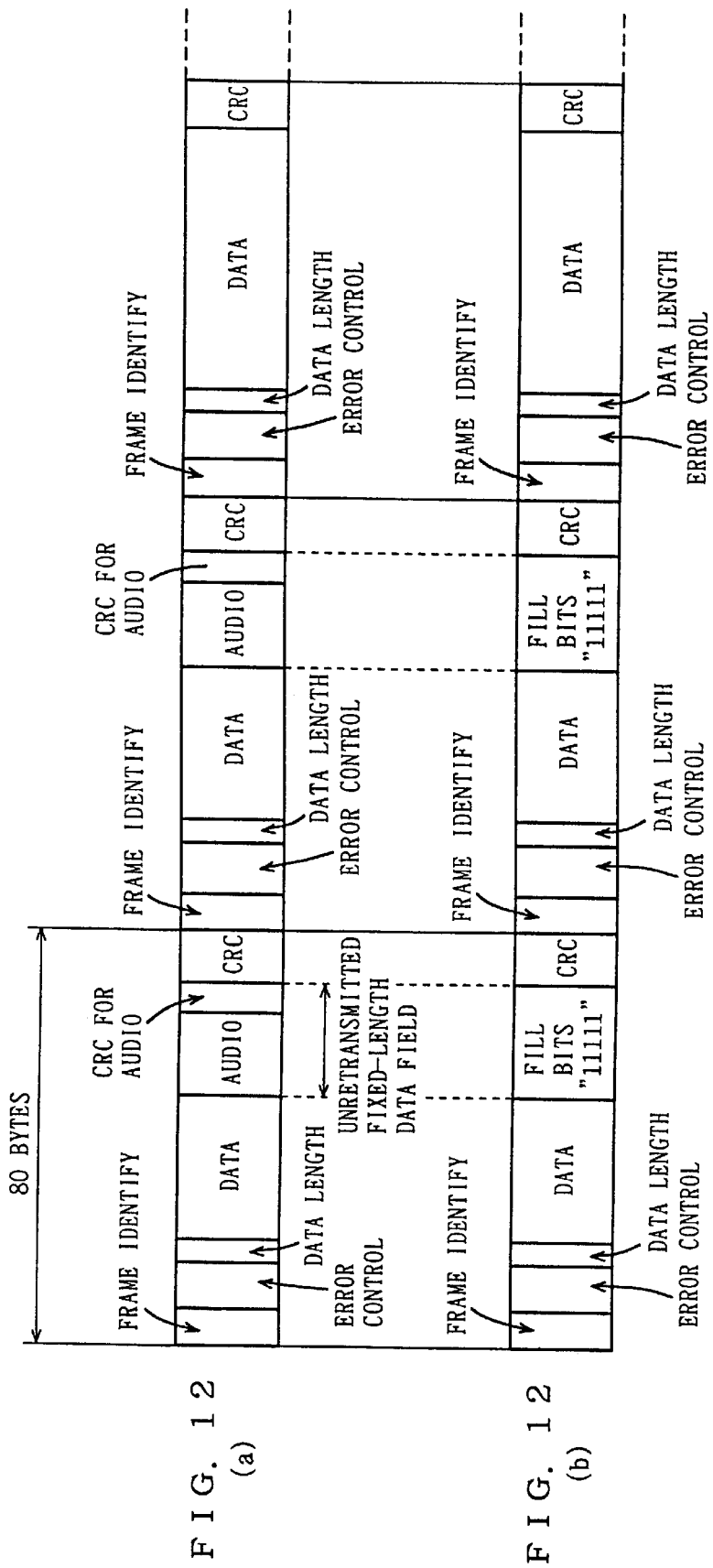
FIG. 12 is a diagram showing a second example of structure of a fixed-length multiplex frame used in the multiplex transmission device of FIG. 10.

FIG. 12 is a diagram showing a second example of structure of fixed-length multiplex frame used in the multiplex transmission device of FIG. 10. Like those in the second embodiment, the fixed-length multiplex frames of FIG. 12 have the same structure as the ARQ frame of PIAFS, wherein the audio data, or the fixed-length data not employing retransmission, is embedded and multiplexed in the user data field. The length of the fixed-length multiplex frame is the same as the length (80 bytes) of the PIAFS ARQ frame in the PHS data communication. As shown in FIG. 12(*a*), the frame format of the fixed-length multiplex frame other than the user data field is the same as that of PIAFS in the PHS data communication. Stored in the user data length indication field is the length of the significant variable-length data employing retransmission.

On the receiving side, the multiplexing block 1806 extracts the fixed-length data not employing retransmission (audio data) from the fixed-length multiplex frame received and gives it to the audio adaptation block 1809. The multiplex block 1806 gives the fixed-length multiplex frame to the converting block 1807 as it is. As shown in FIG. 12(*b*), the converting block 1807 entirely fills the field for the fixed-length data not employing retransmission with the fill bits "1" and gives it to the PIAFS data link processing block 1808 for PHS data communication. This allows the received data to be easily converted into a PIAFS ARQ frame for PHS data communication, which allows a processing block for performing common PHS data communication to process the data.

(Seventh Preferred Embodiment)

When the multiplex frame has a fixed length, it is desirable that the frame length corresponds to the audio frame generation cycle divided by an integer. For example, G.723 generates an audio frame with a cycle of 30 msec. If it is transmitted at 32 Kbps, the cycle is 120 bytes. Accordingly, it is desirable that the multiplex frame length is set to 120 bytes, 60 bytes, or 40 bytes. However, since the retransmission efficiency of ARQ depends on the relation between the error characteristics and the frame length, these multiplex frame lengths are not necessarily suitable. In PIAFS, it is possible to select the communication protocol by in-band negotiation. When the AV multiplex communication is selected, a multiplex frame length of 80 bytes enables continuous utilization of the synchronization established by PIAFS. This improves the transmission efficiency and reduces the processing procedure.

Figure 13:
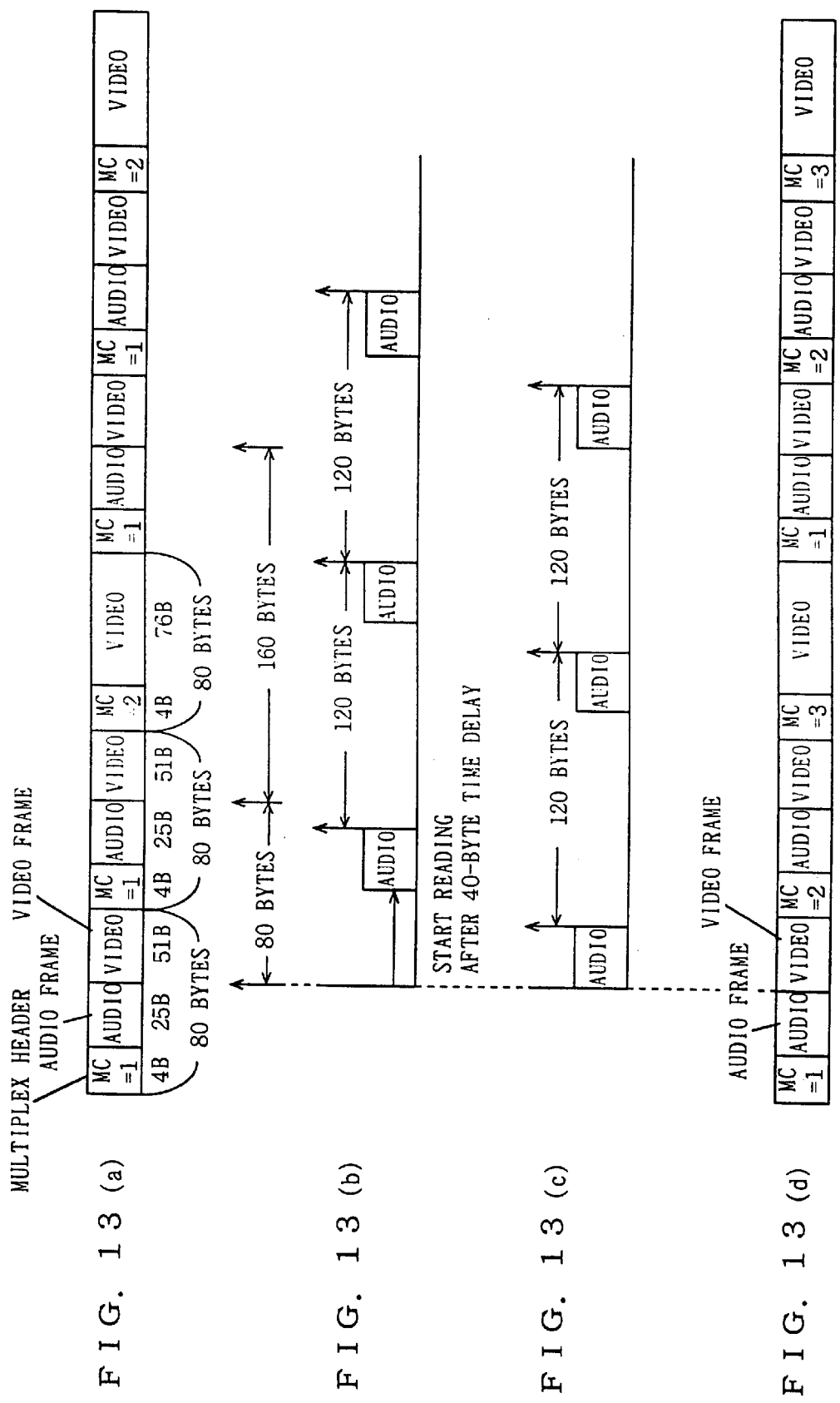
FIG. 13 is a diagram showing a first structure and the data reading timing of a fixed-length multiplex frame used in seventh and eighth embodiments of the present invention.

When a low-bitrate-coded 25-byte audio frame generated at the rate of one frame per 120-byte transmission time is carried on a multiplex frame with a fixed length of 80 bytes (refer to FIG. 13(*a*)), one multiplex frame having no multiplexed audio frame appears in every three multiplex frames. This causes jitter of 40 bytes in the time intervals between the audio frames. (Refer to FIG. 13(*b*).) In this specification, the variation in the relative time intervals between the audio frames (repeating 80-byte intervals and 160-byte intervals) with respect to the expected cycle (120 byte cycle) is defined as jitter. That is to say, the difference (the 40-byte interval) between the relatively short one of the audio frame intervals (the 80-byte interval) and the expected cycle (120-byte cycle) and the difference (40 bytes) between the relatively long time interval (the 160-byte interval) and the expected cycle (the 120-byte cycle) are regarded as jitter. A seventh embodiment is directed to a method for absorbing the jitter on the side receiving the multiplex frames.

FIG. 13 is a diagram for use in describing the jitter absorbing method according to the seventh embodiment of the present invention. The multiplex information MC in FIG. 13(*a*) includes numbers indicating the multiplex structure of the multiplex frames. The relation between the numbers and the multiplex structure is signaled from the transmitting side to the receiving side prior to the transmission of AV signal. It is now assumed that the relation between the multiplex structure and the multiplex information is specified by using the multiplex code table shown in FIG. 14.

As shown in FIG. 14, MC=1 indicates inclusion of a 25-byte audio frame and a 51-byte video frame and MC=2 indicates inclusion of a 76-byte video frame alone. Each multiplex frame has a fixed length of 80 bytes. Accordingly, two 120-byte-cycle audio frames are included in every three multiplex frames.

In the conventional manner, as stated above, in the case of the jitter of 40 bytes, for example, a received audio frame is accumulated in a buffer for the 40-byte transmission time or longer and reading of the audio frame is started when the 40-byte transmission time has passed, or later. Subsequently, the audio frames received before elapse of the 120-byte time are accumulated in the buffer so that the audio frames can be outputted with a 120-byte cycle. However, this method causes a delay of 40-byte transmission time on the receiving side. (Refer to FIG. 13(*b*).)

On the multiplex frame stream, as shown in FIG. 13(*a*), an audio frame multiplexed from the next audio frame at a relatively short time interval (the 80-byte interval) and an audio frame multiplexed from the next audio frame at a relatively long time interval (the 160-byte interval) alternately repeat. In this embodiment, the audio frame separated from the next audio frame at the relatively short time interval on the multiplex frame stream is outputted immediately after the reception without being stored in the buffer. After that, the audio frames received before elapse of the 120-byte time are accumulated in the buffer so that the audio frames can be outputted on the 120-byte time cycle. This eliminates the delay of the 40-byte time which the conventional art has suffered. (Refer to FIG. 13(*c*).)

This way, the seventh embodiment enables elimination of jitter without causing delay when 120-byte cycle audio is multiplexed and transmitted on 80-byte fixed-length multiplex frames. Particularly, when the jitter absorbing method of this embodiment is combined with the PIAFS devised as a transmission control method for transmitting computer data through the radio channel of PHS having a bit rate of 32 Kbps, the audio data can be multiplexed and transmitted without causing jitter and delay while adopting the multiplex frame length providing good transmission efficiency.

Methods for identifying the audio frame separated from the next audio frame in a relatively short time on the multiplex frame stream include the following methods, for example: A first method is to receive a plurality of multiplex frames first to acquire synchronization to the pattern of the multiplex frame stream; and a second method is to settle between the transmitting side and the receiving side in advance that a perdetermined multiplex frame (i.e., the multiplex frame containing an audio frame separated from the next audio frame in a relatively short time) always comes first.

The correspondence between the timings in the multiplex structure of FIG. 13(*a*) and the timing on the left end in FIGS. 13(*b*) and (*c*) depends on the processing capability on the receiving side and the multiplex structure. It may be immediately after the reception of an audio frame, or may be after completion of the reception of the multiplex frame.

Figures 18A, 18B, 18C:
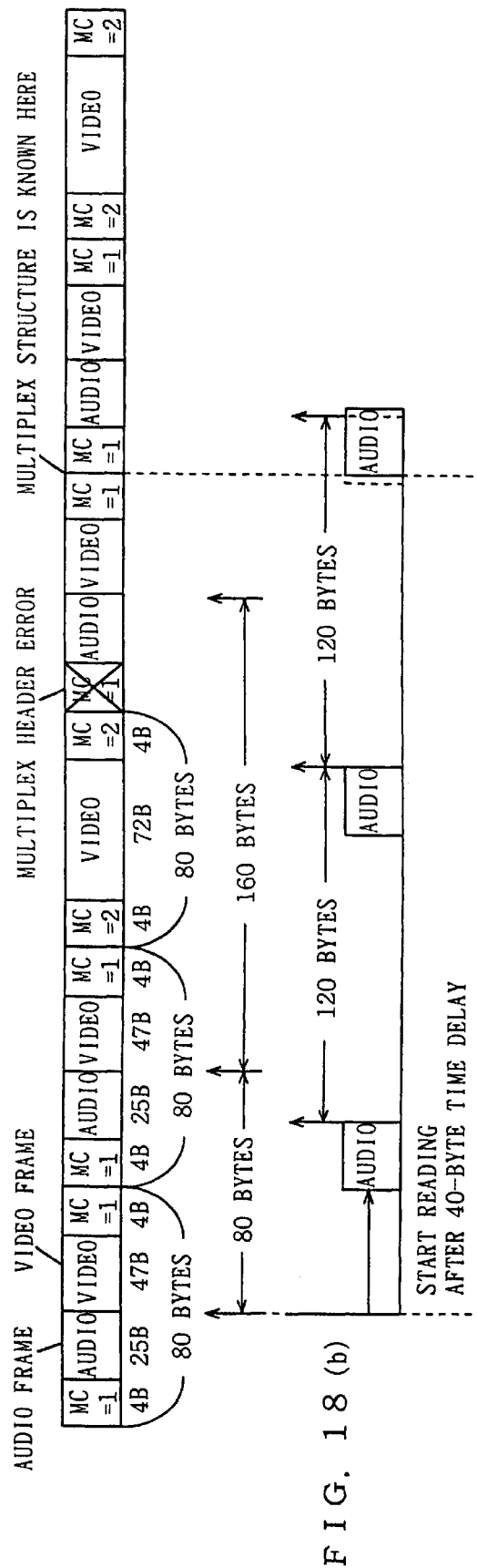
FIG. 18 is a diagram illustrating the reason why data is not read immediately after arrival of audio data in FIG. 17.

When the relation between the multiplex structure and the multiplex information is defined by using the multiplex code table in FIG. 14 with one multiplex frame having one header, the timing will be like that shown in FIGS. 13(*a*), (*b*), (*c*). When the relation between the multiplex structure and the multiplex information is defined by using the multiplex code table of FIG. 15, the timing will be like that shown in FIGS. 16(*a*), (*b*), (*c*). When the audio data and video data are multiplexed in this order in a multiplex frame with each multiplex frame provided with two multiplex headers at the head and the end, the timing will be like that shown in FIGS. 17(*a*), (*b*), (*c*). This is for the following reason: If data is to be outputted immediately after the arrival of the audio data as shown in FIGS. 18(*a*), (*b*), (*c*), the output timing will be like that shown in FIG. 18(*c*), which causes jitter. Because the output is provided after the arrival of the multiplex header at the end when the multiplex header at the head is errored and the multiplex header at the end when the multiplex header at the head is errored and the multiplex header at the end is correctly received. As can be seen by referring to the diagrams, the present invention can provide the same effects in any of the multiplex structures.

The seventh embodiment has shown an example in which no synchronization flag is provided at the head of the multiplex frame. However, the present invention can be applied to provide the effects described in the embodiments as long as the audio frames are transmitted in multiplex frames of different cycle, even when the multiplex frames always have a synchronization flag at the head without utilizing synchronization by frames, or when the multiplex frames are defined by another format, or when the multiplexed information include data or control information.

Although the seventh embodiment has explained the case in which the audio frame has a length of 25 bytes, the present invention is not limited to it. That is to say, the frame length of the audio frame can take other values. Audio frames provided with redundant bits for error correction, or audio frames coded to another bit rate, e.g., 6.3 Kbps, may be used as well.

(Eighth Preferred Embodiment)

The seventh embodiment has shown the following two methods as methods for identifying an audio frame separated from the next audio frame at a shorter time interval on a stream of the multiplex frames:

(1) A method of receiving a plurality of multiplex frames first and adjust the synchronization to the pattern of the multiplex frame stream. (Referred to as a first method, hereinafter.)

(2) A method of previously settling between the transmitting side and the receiving side that a certain multiplex frame (i.e., a multiplex frame including an audio frame separated from the next audio frame in a shorter time) always comes first. (Referred to as a second method, hereinafter).

The above methods, however, introduce the following problems.

In the case of the first method, even if the plurality of multiplex frames received first include audio frames, the audio frames can not be decoded until synchronization has been acquired to the pattern of the multiplex frame stream. That is to say, the first active speech can not be reproduced in the first method. Furthermore, in the first method, if a silent frame is generated first, a single audio frame can not be reproduced until active speech frames are successively generated. On the other hand, in the second method, if a transmission error occurs in the multiplex frame, it becomes impossible to know which is the first multiplex frame.

In any of the methods, if a reference audio frame is missed, the next audio frame does not arrive even when a 120-byte time has passed. However, the audio decoder recognizes it just as a silent period and continues decoding. As a result, the audio sounds strange to listeners but the decoder can not recognize it.

Accordingly, an eighth embodiment of the invention realizes a method for enabling identification of a reference audio frame prior to transmission/reception of the audio frames.

The eighth embodiment uses the multiplex code table shown in FIG. 19 to define the relation between the multiplex structure and the multiplex information. FIG. 13(d) shows an example of a multiplex frame stream used in the eighth embodiment. In FIG. 19, as the multiplex information for the multiplex frames having the same structure and in which an audio frame and a video frame are multiplexed, the multiplex information MC=1 is assigned to the multiplex frame separated from the next audio frame in a shorter time, and the multiplex information MC=2 is assigned to the multiplex frame separated from the next audio frame in a longer time. The multiplex information MC=3 is assigned to the multiplex frame containing only a video frame.

The relation between the frame numbers and the multiplex structures is defined on the transmitting side and transferred to the receiving side prior to a transmission of the audio and video data. Accordingly, the receiving side easily recognizes, at the time of receiving the multiplex information (MC), that different, two kinds of multiplex information are assigned to the multiplex frames having the same kind of multiplex structure. For example, when it is predetermined to use an audio frame multiplexed in a multiplex frame with multiplex information of a smaller MC number as a reference audio frame, the reference audio frame is instantly identified on the reception of the multiplex information in the multiplex frame.

(Ninth Preferred Embodiment)

It is also possible that a transmitting terminal does not support the function described above. In this case, however, it is possible to absorb the audio jitter if the receiving terminal has the functions of both of the seventh and eighth embodiments. The processing on the receiving terminal side in this case is shown in the flow chart of FIG. 20.

Figure 20:
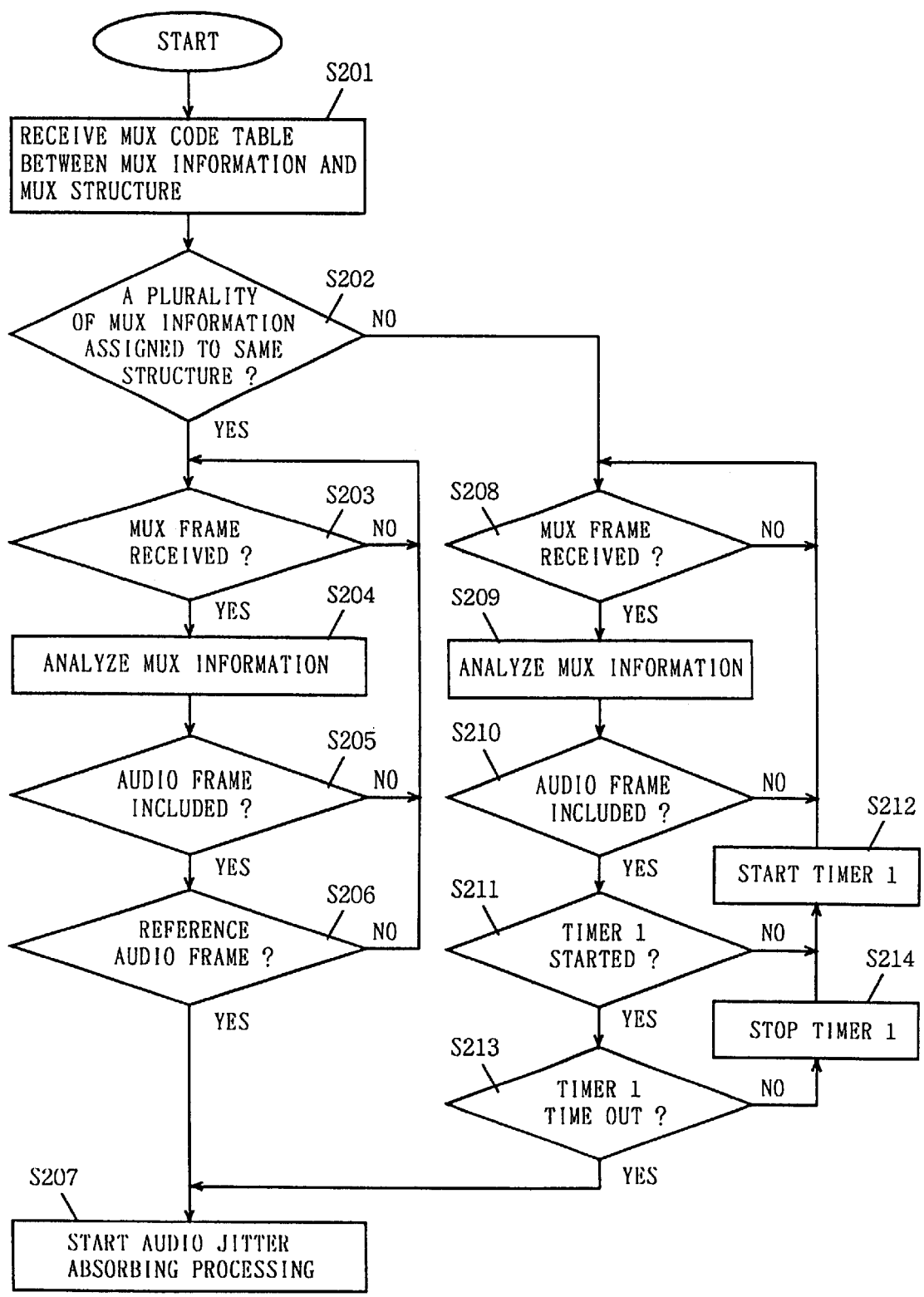
FIG. 20 is a flow chart showing processing on the receiving terminal side in a ninth embodiment of the present invention.

In FIG. 20, the receiving terminal receives, prior to a transmission of the audio/video data, the multiplex multiplex code table describing the relation between the multiplex information and the multiplex structures (Step S201). Next, the receiving terminal analyzes the received multiplex information (MC) to determine whether different MC numbers are provided to multiplex frames having the same multiplex structure containing multiplexed audio frames (Step S202).

If the determination in Step S202 is YES, the flow branches to the processing described in the eighth embodiment. That is to say, the receiving terminal waits for reception of a multiplex frame (Step S203). When receiving one, it analyzes the multiplex structure of the received multiplex frame from the multiplex information (MC) included in the multiplex frame (Step S204). Next, the receiving terminal determines on the basis of the result of the analysis in Step S204 whether the received multiplex frame is a multiplex frame having an audio frame multiplexed (Step S205). If no audio frame is multiplexed in the received multiplex frame, the receiving terminal returns to Step S203 to wait for reception of the next multiplex frame. On the other hand, if the received muliplex frame contains an audio frame multiplexed therein, the receiving terminal determines whether that audio frame is a reference audio frame (Step S206). If the multiplexed audio frame is not a reference audio frame, the receiving terminal returns to Step S203 to wait for reception of the next multiplex frame. On the other hand, if the multiplexed audio frame is a reference audio frame, the receiving terminal starts the audio jitter absorbing processing (Step S207). In this audio jitter absorbing processing, the audio frame received this time is transferred as a reference frame to the audio decoder without delay and the following audio frames are transferred to the audio decoder every time a 120-byte time passes. Audio frames received before the 120-byte time has passed are temporarily stored in a buffer.

On the other hand, if the determination in Step S202 is NO, the flow moves to the processing described in the seventh embodiment. That is to say, the receiving terminal waits for reception of a multiplex frame (Step S208). When receiving one, it analyzes the multiplex structure of the received multiplex frame from the multiplex information (MC) included in that multiplex frame (Step S209). Next, the receiving terminal determines on the basis of the result of the analysis in Step S209 whether the received multiplex frame is a multiplex frame containing a multiplexed audio frame (Step S210). If no audio frame is multiplexed in the received multiplex frame, the receiving terminal returns to Step S208 to wait for reception of the next multiplex frame. On the other hand, if an audio frame is multiplexed in the received multiplex frame, the receiving terminal determines whether a timer 1 has been started or not (Step S211). This timer 1 is started when a multiplex frame containing a multiplexed audio frame is received, and stopped when a multiplex frame containing a multiplexed audio frame is received again before the time-out. The time-out time of the timer 1 is set larger than the shorter multiplex frame interval between audio frames in the multiplex frame stream, and smaller than the longer multiplex frame interval between the audio frames. Specifically, the timer 1 is started in Step S212 and stopped in Step S214.

Now, suppose that, on the receiving terminal side, the interval between the audio frame received first and the audio frame received second is short and the interval between the audio frame received second and the audio frame received third is long. In this case, the timer 1 is started in response to the reception of the first audio frame (Step S212). Then the second audio frame is received before the timer 1 expires, in response to which the timer 1 is stopped (Step S213). Subsequently, the timer 1 is started in Step S212 again to start the counting operation again from a 0-clear state. Next, the timer 1 time-outs before the third audio frame is received. Accordingly, the receiving terminal determines that the timer 1 has expired at the time when the third audio frame is received (Step S213) and starts the audio jitter absorbing processing (Step S207).

Thus, like the seventh embodiment, the eighth and ninth embodiments allow the 120-byte-cycle audio to be multiplexed and transmitted in the 80-byte multiplex frames without jitter and delay. Furthermore, it reduces the number of initial audio frames which are not reproduced, as compared with the seventh embodiment. When the jitter absorbing methods of these embodiments are combined with the PIAFS devised as a transmission control method for transmitting computer data through the radio channel of PHS having a bit rate of 32 Kbps, audio data can be multiplexed and transmitted without jitter and delay while adopting the multiplex frame length providing high transmission efficiency.

Although the seventh to ninth embodiments have explained multiplexing and transmitting of the audio data and the video data, other data such as the computer data may be transmitted as the variable-length data employing retransmission, or the audio data, the video data and the computer data can be multiplexed and transmitted to provide the same effects.

In the seventh to ninth embodiments, even when a plurality of audio frames are multiplexed in one multiplex frame, the audio jitter can be absorbed as in the embodiments above by regarding the multiplex information of the multiplex frame as a reference multiplex frame and using the first audio frame as a reference audio frame. In this case, Step S202 in FIG. 20 determines whether a plurality of audio frames are included in one multiplex frame and Step S206 regards the leading audio frame as a reference audio frame unconditionally.

Figure 22:
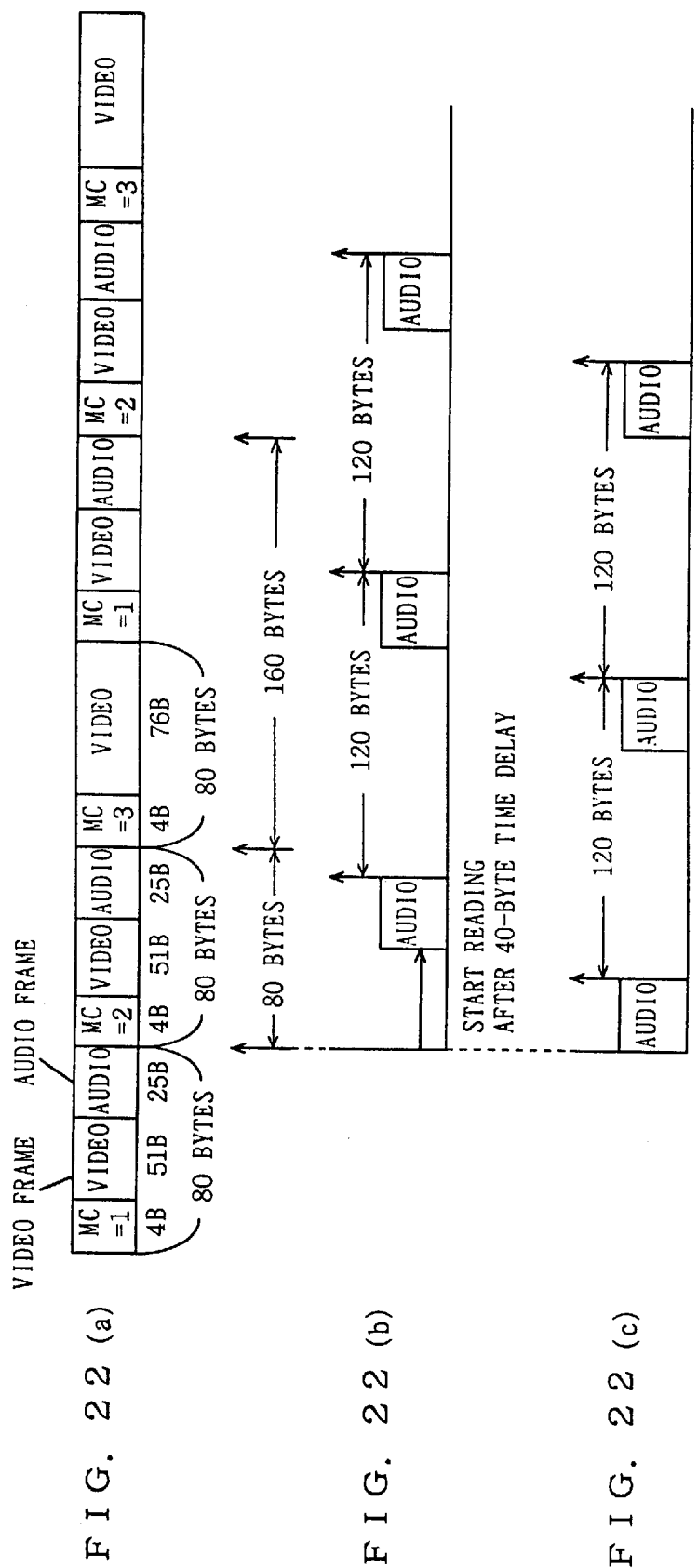
FIG. 22 is a diagram showing a second structure and the data reading timing of a fixed-length multiplex frame used in the eighth embodiment of the present invention.
Figure 23:
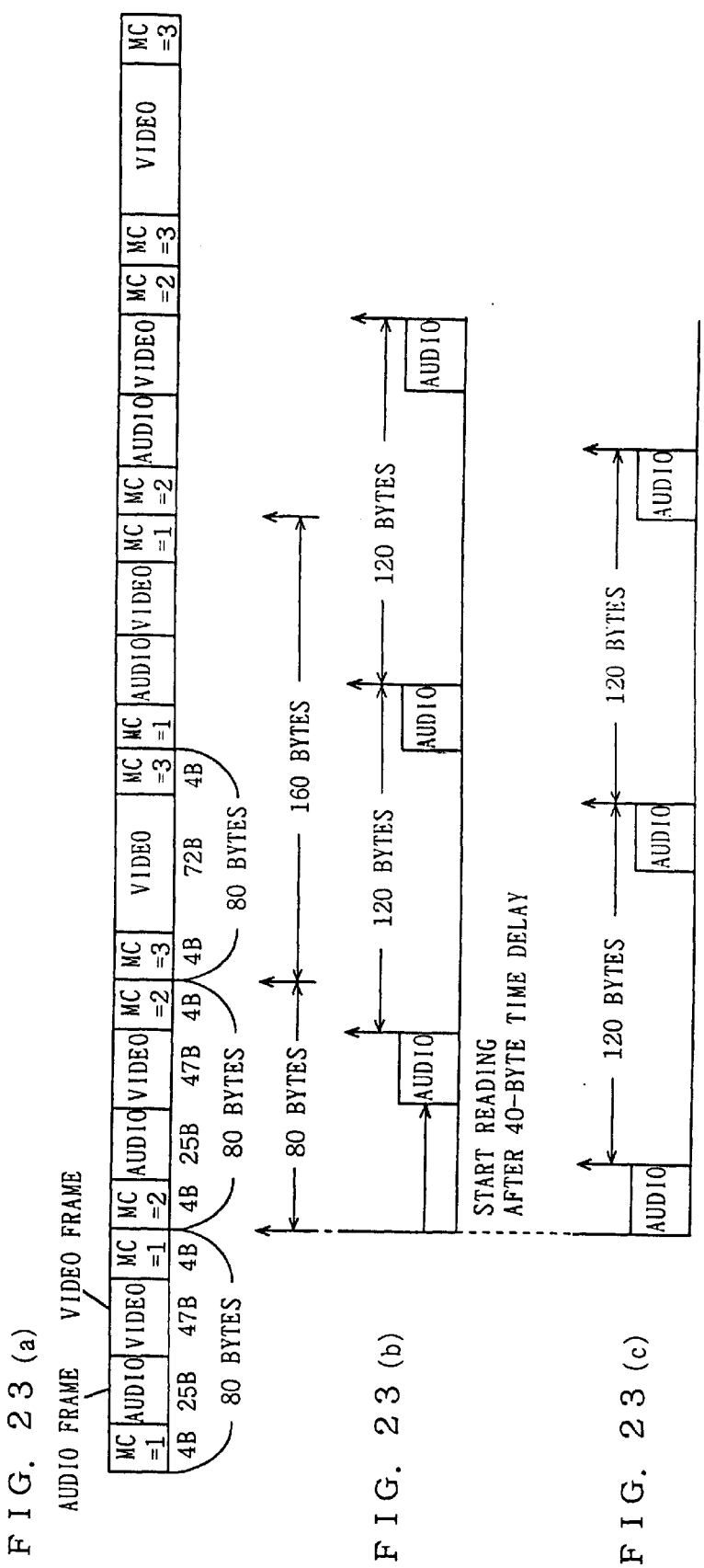
FIG. 23 is a diagram showing a third structure and the data reading timing of a fixed-length multiplex frame used in the eighth embodiment of the present invention.

It depends on the processing capability on the receiving side and the multiplex structure to which of the timings in the multiplex structure of FIG. 13(d) the timing on the left end in FIGS. 13(b) and (c) corresponds. It may be immediately after reception of an audio frame, or may be after completion of the reception of the multiplex frame. When the relation between the multiplex structure and the multiplex information is defined by using the multiplex code table in FIG. 19 with one multiplex frame having one multiplex header, the timing will be like that shown in FIGS. 13(b), (c), (d). When the relation between the multiplex structure and the multiplex information is defined by using the multiplex code table of FIG. 21, the timing will be like that shown in FIGS. 22(a), (b), (c). When the correspondence between the multiplex structure and the multiplex information is defined by using the multiplex code table shown in FIG. 19 with one multiplex frame provided with two multiplex headers at the head and the end, the timing will be like that shown in FIGS. 23(a), (b), (c). As can be seen by referring to each of the diagrams, the present invention can similarly provide the effects in any of the multiplex structures.

The eighth and ninth embodiments have shown examples in which no synchronization flag is provided at the head of the multiplex frame. However, the present invention can be applied to provide the effects shown in the embodiments as long as the audio frames are transmitted in multiplex frames with different cycle, even when the multiplex frames always have a synchronization flag at the head without utilizing synchronization by frames, or when the multiplex frames are defined by another format, or when the information to be multiplexed includes data or control information.

Although the eighth and ninth embodiments have explained the case in which the audio frame has a length of 25 bytes, the present invention is not limited to it. That is to say, the frame length of the audio frame can take other values. Audio frames provided with redundant bits for error correction, or audio frames coded to another bit rate, e.g., 6.3 Kbps, may be used as well.

(Tenth Preferred Embodiment)

In the above-described seventh to ninth embodiments, it is necessary for the transmitting side to multiplex audio codes generated at constant intervals in the audio fields of the multiplex frames having jitter with a minimum delay. That is to say, unlike the receiving side, the transmiting side must store the audio code into the audio frame field separated at a relatively short interval from the next audio frame field with a delay equal to or larger than the jitter time, on the basis of the audio frame field separated from the next audio frame at a relatively long interval. A large delay time causes no problem when storing, but increases the delay time of audio reproduced on the receiving side. This brings about the necessity of preventing an increase of the delay time by making the relation between occurrence of the audio frames and the phase of the multiplex frames constant. For this aim, the transmitting terminal shall control the operation start timing of the audio coder.

The time from the start of the audio coder to the output of the audio code is taken as T, the jitter time of the time intervals between the audio frames in the multiplex frames as J, and the time required for determining whether the audio frame is an active speech frame or a silent frame, assembling a multiplex frame corresponding to the determination, and sending it out onto the transmission channel as $\alpha$. When the first multiplex frame is sent out onto the transmission channel immediately after the total time (T+J+$\alpha$) has passed after the start of the audio coder, the audio delay time can be minimized while absorbing the time interval jitter between the audio frames. Considering this, the tenth embodiment of the invention determines the most suitable start timing of the audio coder.

Figure 24:
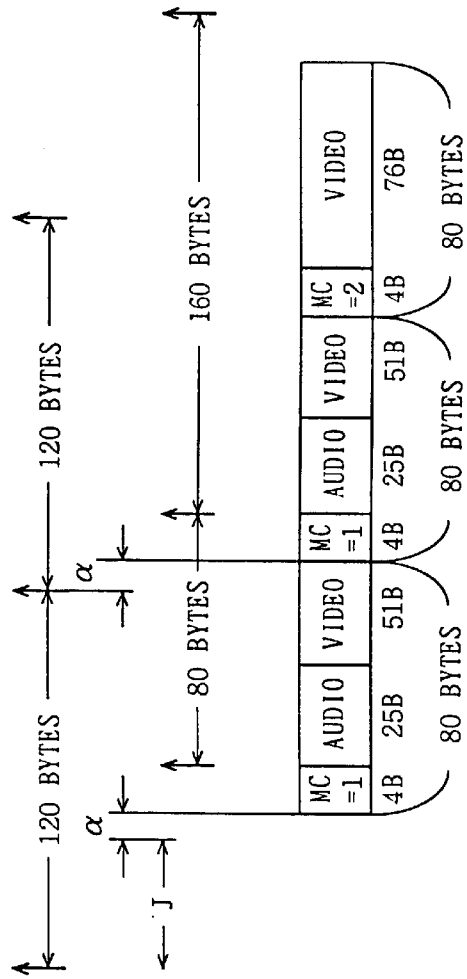
FIG. 24 is a timing chart showing a first example of operation on the transmitting side in a tenth embodiment of the present invention.

FIG. 24 is a timing chart showing the operation on the transmitting side in the multiplex transmission method according to the tenth embodiment of the present invention. In the tenth embodiment, the relation between the multiplex structure and the multiplex information is defined by using the multiplex code table shown in FIG. 14.

FIG. 24(a) shows the timing for starting the audio coder. In FIG. 24(a), T is the time required from when the audio coder is started to when the audio code is outputted. FIG. 24(b) shows the timing of output of the audio code from the audio coder. FIG. 24(c) shows the timing at which the multiplex frame is outputted onto the transmission channel. In the case of the multiplex frame stream shown in FIG. 24(d), the time intervals between the audio frames (repeating 80-byte intervals and 160-byte intervals) cause 40-byte jitter with respect to the cycle (120-byte cycle) of occurrence of the audio codes. That is to say, J=40 bytes. The character $\alpha$ represents the time margin required to determine whether speech is active or inactive after the audio frame is outputted, assemble a multiplex frame corresponding to the determination, and send it out onto the transmission channel. In this embodiment, $\alpha$ is set to a value larger than the longer one of the time margins for the speech period and the silent period.

From the relation above, when the time at which the first multiplex frame goes out onto the transmission channel is used as a reference, this embodiment sets the start timing of the audio coder so that it starts preceding the reference time for the total time (T+J+$\alpha$). If the time difference between the start timing of the audio coder and the time at which the first multiplex frame is sent out onto the transmission channel is set to a value larger than the total time (T+J+$\alpha$), it causes no problem when multiplexing, but leads to an audio delay. Accordingly, it is desirable that the time difference is set as close to the total time (T+J+$\alpha$) as possible.

The tenth embodiment thus enables multiplexing and transmitting of the 120-byte cycle audio on the 80-byte multiplex frames without jitter nor delay. When the jitter absorbing method of this embodiment is combined with PIAFS devised as a transmission control method for transmitting computer data on the radio channel of PHS having a bit rate of 32 Kbps, the audio data can be multiplexed and transmitted without jitter and delay while adopting the multiplex frame length providing high transmission efficiency.

Figure 25:
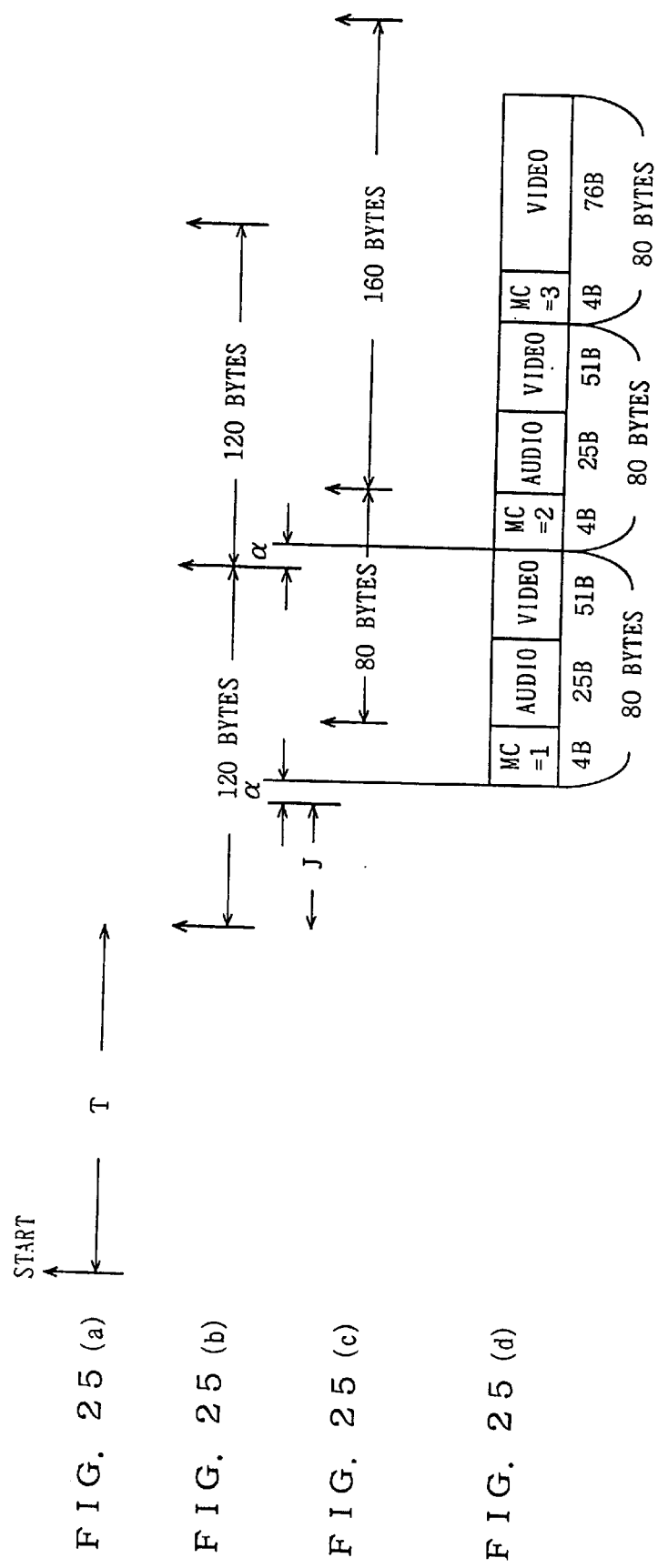
FIG. 25 is a timing chart showing a second example of operation on the transmitting side in the tenth embodiment of the present invention.
Figure 26:
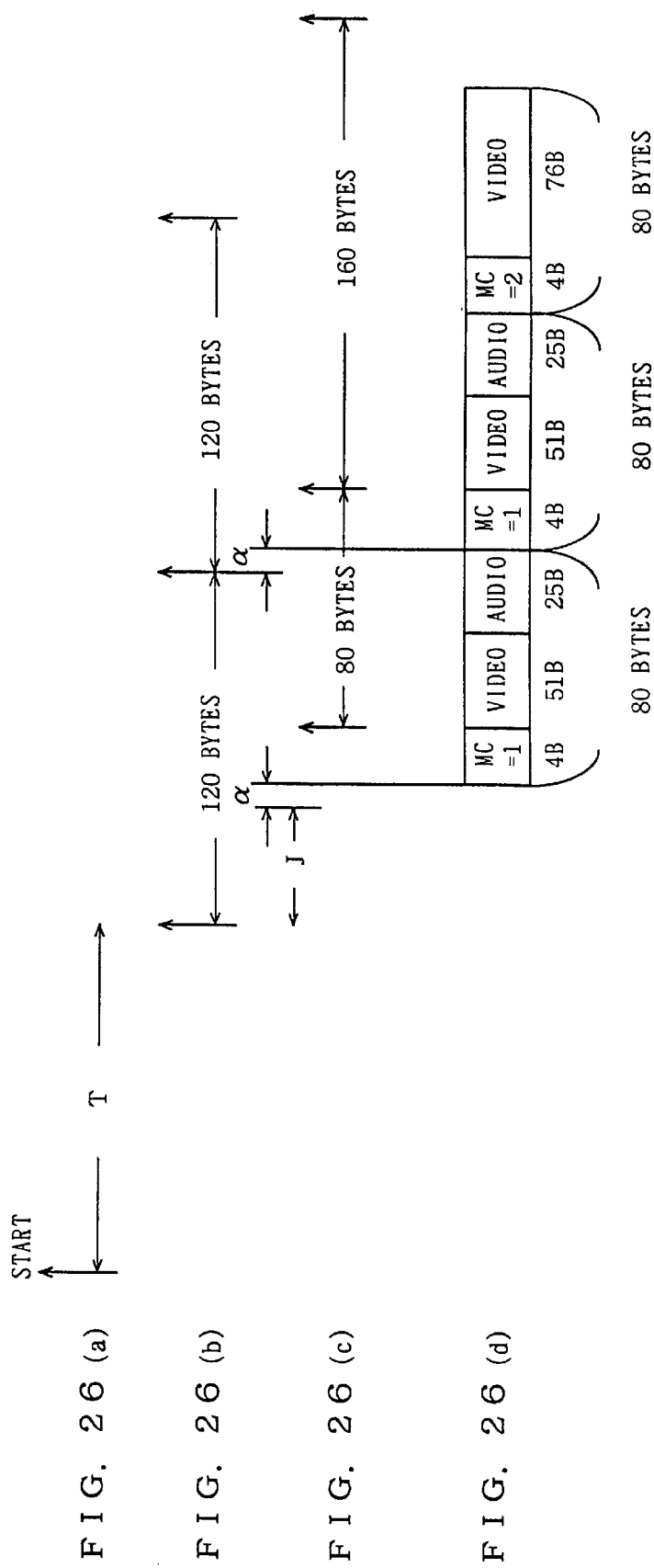
FIG. 26 is a timing chart showing a third example of operation on the transmitting side in the tenth embodiment of the present invention.

When multiplex frames have the multiplex information (MC) from which a reference audio frame can be identified, as those in the eighth and ninth embodiments, the timing will be that shown in FIG. 25. The relation between the multiplex structure and the multiplex information in FIG. 25 is defined by the multiplex code table shown in FIG. 19. In FIG. 25, MC=1 indicates a multiplex frame including audio data generated after being delayed for J time after the audio code was outputted, and MC=2 indicates a multiplex frame including audio data generated immediately after the audio frame was outputted. This enables the receiving side to know whether the audio frame was stored after being delayed or stored at once to easily specify an audio frame as a reference for reproduction. When the relation between the multiplex structure and the multiplex information is defined by using the multiplex code table shown in FIG. 15, the timing is like that shown in FIG. 26 when the video data and the audio data are multiplexed in this order. The timing of FIG. 26 is based on the fact that it must be known whether the audio frame is speech-active or speech-inactive at the time of determining the frame structure. In any cases, the present invention provides the same effects as the tenth embodiment.

When a plurality of audio frames are multiplexed in one multiplex frame with the number of the multiplexed frames being f, the invention provides the effects above with J=120×f bytes.

Although the tenth embodiment has explained the case in which the audio frame has a length of 25 bytes, the present invention is not limited to it. That is to say, the frame length of the audio frame can take other values. Audio frames provided with redundant bits for error correction, or audio frames coded to another bit rate, e.g., 6.3 Kbps, may be used as well.

(Eleventh Preferred Embodiment)

Even when a complete ARQ frame is included in a fixed-length multiplex frame, if the frames are multiplexed as shown in FIG. 27, the position of the ARQ header of the video frame differs depending on whether an audio frame is multiplexed in the information field (FIG. 27(a)) or no audio frame is multiplexed (FIG. 27(b)). Accordingly, if the multiplex header has an error, the position of the ARQ header of the video frame is lost. If the position of the ARQ header is not known, it is impossible to know the frame number of the transmission frame, the frame number of an error-detected frame, the reject command, and so on. Then an error must be checked for from the next correctly arrived frame and time-out in a time-consuming manner.

Described next is a multiplex transmission method which enables analysis of the ARQ header of the video frame and an immediate retransmission request even if the multiplex header of the multiplex frame has an error.

FIG. 28 is a diagram showing multiplex structures of multiplex frames used in the multiplex transmission method according to the eleventh embodiment of the invention. As shown in FIG. 28, in this embodiment, the video frame is always multiplexed in the preceding position in the information field. Then the ARQ header of the video frame can be always located in the same position, irrespective of whether an audio frame is multiplexed in the information field (FIG. 28(a)) or no audio frame is multiplexed (FIG. 28(b)). This allows the receiving side to know the position of the ARQ header of the video frame even if the multiplex header has an error.

Figure 29:
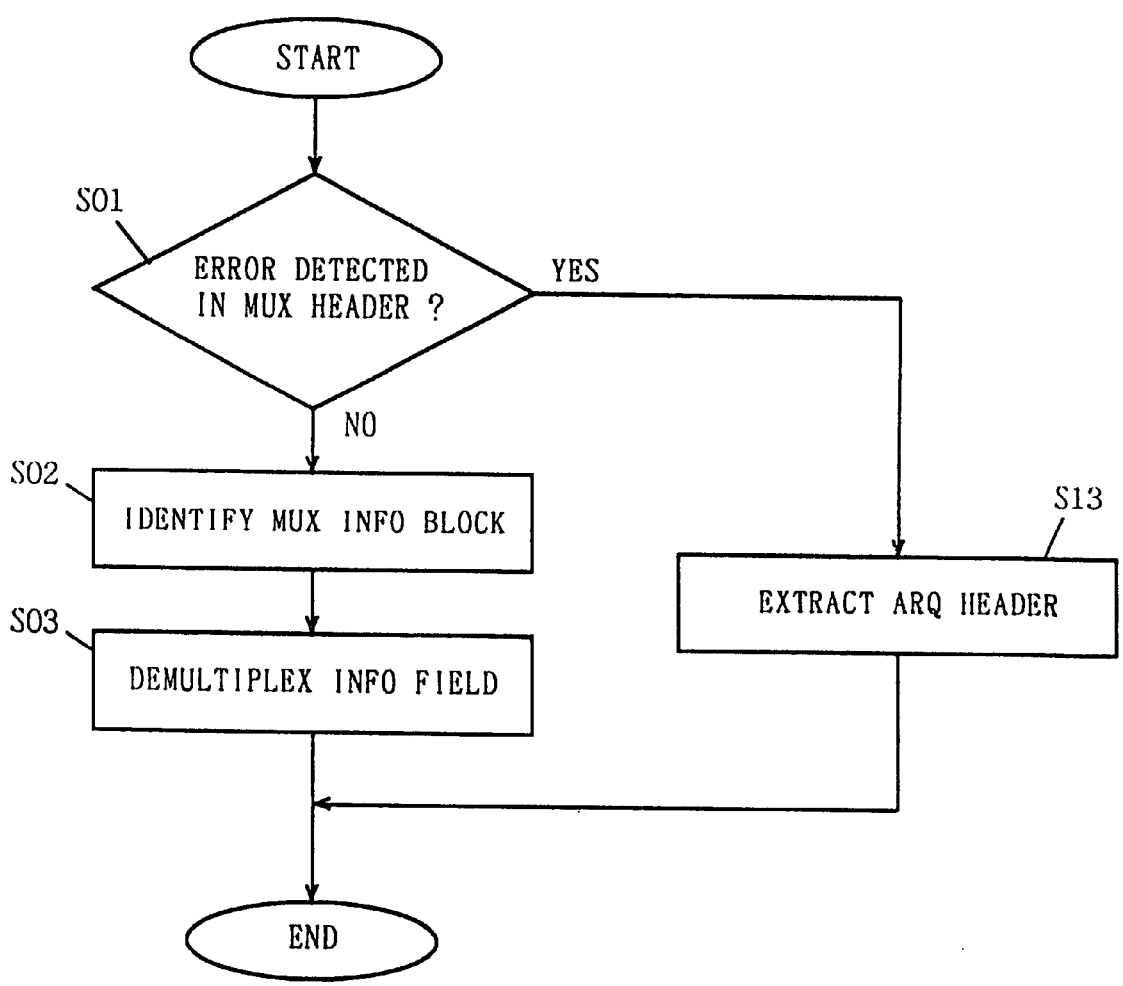
FIG. 29 is a flow chart showing processing performed by a multiplex layer on the receiving side in the eleventh embodiment of the present invention.

FIG. 29 is a flow chart showing the processing performed by the multiplex layer on the receiving side. In FIG. 29, on receiving a multiplex frame, the multiplex layer on the receiving side first applies error detection to the multiplex header (Step S01). If the multiplex header has no error, the multiplex layer analyzes the multiplex information block (Step S02), demultiplexes the information field into the video frame, the audio frame, or the like, according to the multiplex information, and gives them to the corresponding error control processing layers (Step S03). On the other hand, when detecting an error in the multiplex header, the multiplex layer extracts the ARQ header of the video frame stored in the fixed position in the multiplex frame and gives it to the video error control processing layer (Step S13).

Figure 30:
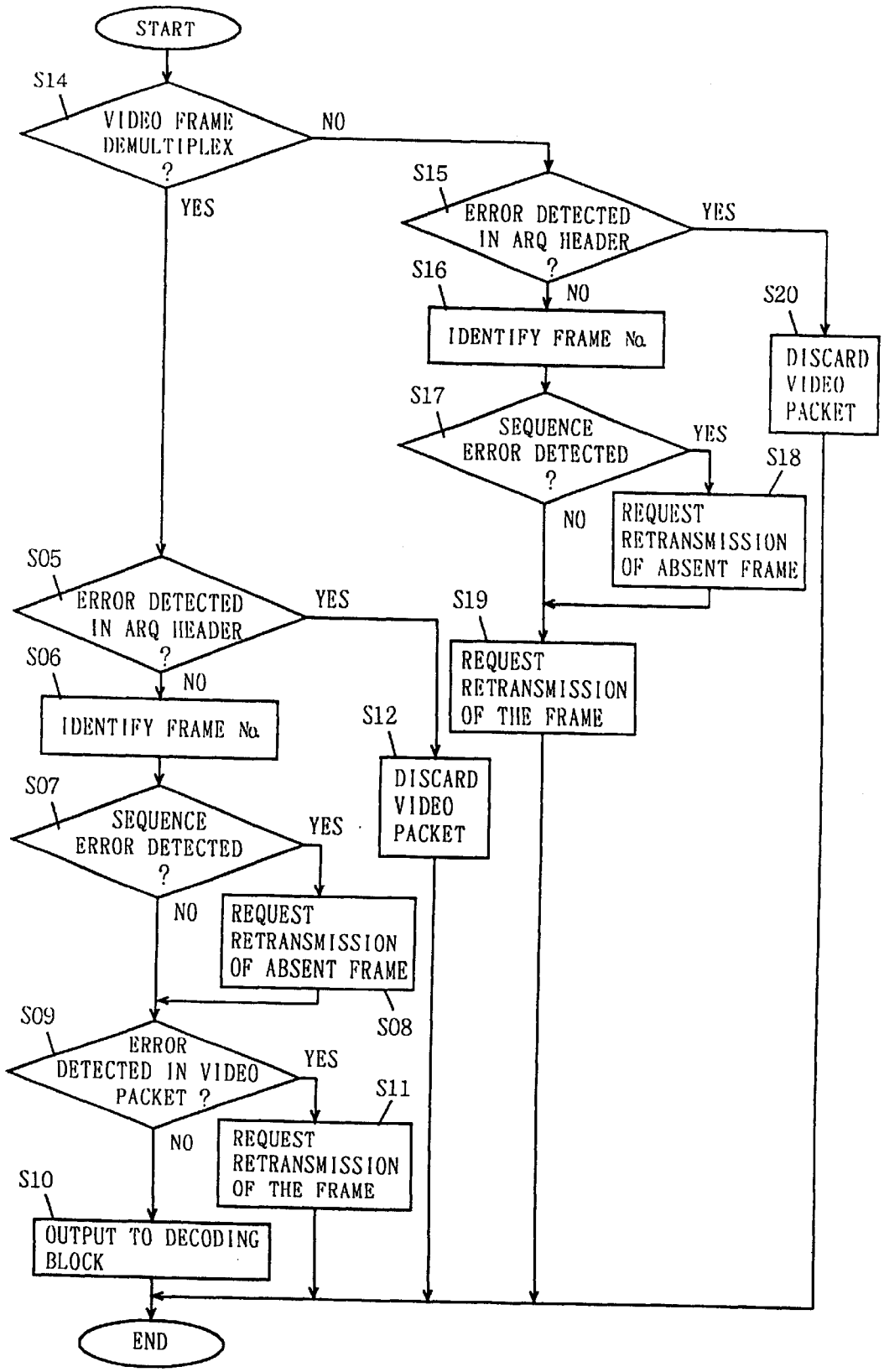
FIG. 30 is a flow chart showing processing performed by a video error control processing layer in the eleventh embodiment of the present invention.

FIG. 30 is a flow chart showing the processing performed by the video error control processing layer. In FIG. 30, the error control layer first determines whether it has received a demultiplexed video frame from the multiplex layer (Step S14).

When having received a demultiplexed video frame from the multiplex layer (that is, when the multiplex header has no error), the error control processing layer performs error correction and error detection of the ARQ header (Step S05). If the ARQ header has no error, the error control processing layer reads the frame number (Step S06). Next, the error control processing layer determines whether a sequence error has been detected, or whether the read frame number differs from the frame number to be received next (Step S07). When a sequence error is detected, the error control processing layer transmits a retransmission request for the video frame of the absent frame number to the transmitting side (Step S08). Then the error control processing layer performs error detection of the video packet (Step S09). If the video packet has no error, the error control processing layer outputs the video data to the video decoding layer (Step S10), and if the video data has an error, the error control processing layer transmits a retransmission request for that frame number to the transmitting side (Step S11). In the Step S05, when an error is detected in the ARQ header, the error control processing layer discards the video packet (Step S12).

On the other hand, when it has received only the ARQ header of the video frame from the multiplex layer in Step S14 (that is, when the multiplexing header has an error), the error control processing layer performs error correction and error detection of the received ARQ header (Step S15). When the ARQ header has no error, the error control processing layer reads the frame number (Step S16). Next, the error control processing layer determines whether a sequence error has been detected, or whether the read frame number differs from the frame number to be received next (Step S17). When a sequence error is detected, the error control processing layer transmits a retransmission request for the video frame of the absent frame number to the transmitting side (Step S18). Then the error control processing layer transmits a retransmission request for that read frame number to the transmitting side (Step S19). When an error is detected in the ARQ header in Step S15, the error control processing layer discards the video packet (Step S20).

Figure 31:
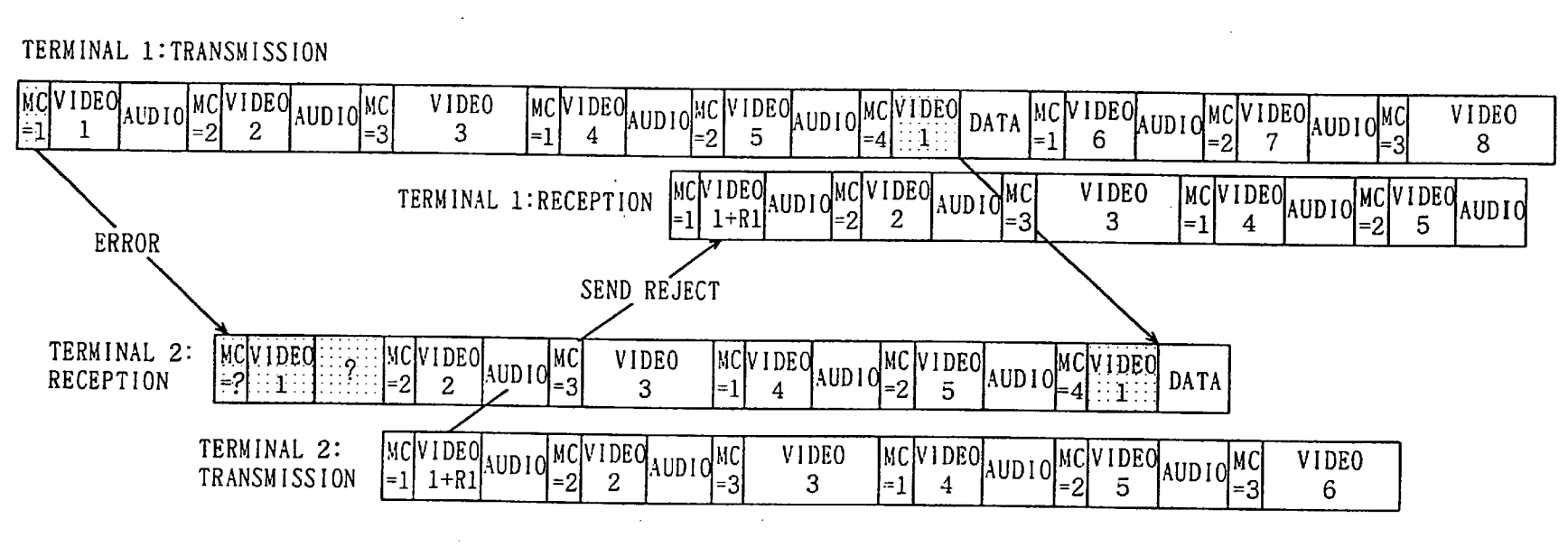

FIG. 31 is a timing chart showing the operation when retransmission control is performed in the eleventh embodiment. R1 in FIG. 31 indicates a reject transmitted back for the video 1. In FIG. 31, when a transmission error takes place in the multiplex header of the multiplex frame (the multiplex frame containing the video frame of the frame number 1) transmitted from the terminal 1, the terminal 2 receives it and then analyzes the ARQ header of the video frame. If the ARQ header has no error, it sends a reject. Thus the terminal 2 can immediately tramsmit back a reject for the frame number 1.

Thus, in the eleventh embodiment, a video frame is always multiplexed in the head part of the multiplex frame. Hence, even if the multiplex header has an error, the ARQ header of the video frame can be analyzed so that a reject for the video frame can immediately be transmitted back, and retransmission delay of the video frame are thus reduced.

This embodiment provides more efficient effects when the ARQ headers are extracted only when all multiplex frames contain video data multiplexed therein.

(Twelfth Preferred Embodiment)

Next, a multiplex transmission method according to a twelfth embodiment of the present invention will be explained. This embodiment is characterized in that the multiplex layer demultiplexes a video frame of certain bytes and gives it to the error control processing layer even if the multiplex header of the multiplex frame has an error.

If the multiplex code table for the multiplex information signaled from the transmitting side at the beginning of a communication is the multiplex code table shown in FIG. 19, the receiving side determines that the ARQ headers of the video frames are not located in a fixed position in the multiplex frames. In this case, the multiplex layer on the receiving side performs the processing shown in FIG. 32 and the video error control processing layer performs the processing shown in FIG. 33.

Figure 32:
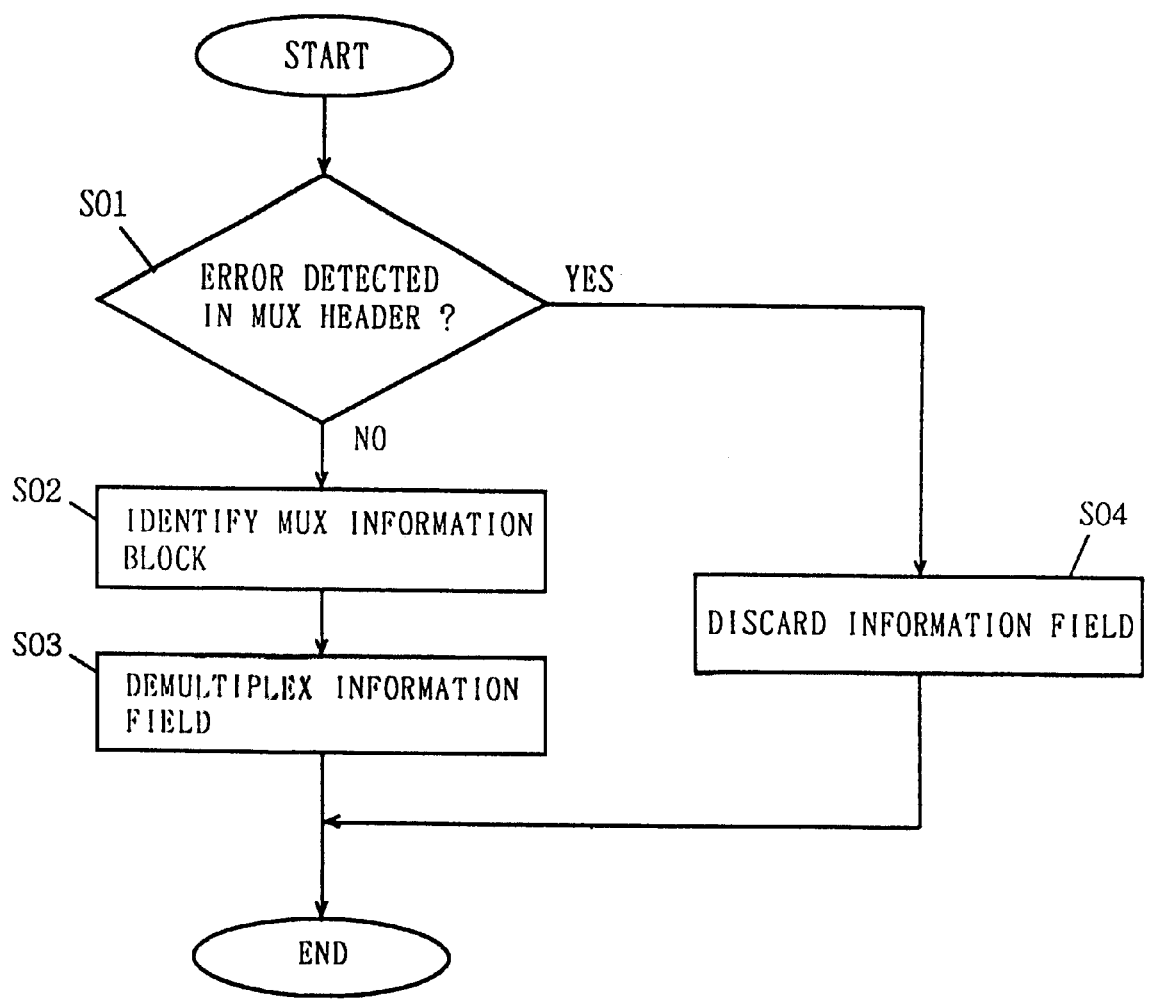
FIG. 32 is a flow chart showing processing performed by a multiplex layer on the receiving side in a twelfth embodiment of the present invention.

In FIG. 32, when receiving a multiplex frame, the multiplex layer on the receiving side first performs error detection of the multiplex header (Step S01). If the multiplex header has no error, the multiplex layer analyzes the multiplex information block (Step S02), demultiplexes the information field into the video frame, the audio frame, and so on, according to the multiplex information, and gives them to the corresponding error control processing layers (Step S03). On the other hand, when detecting an error in the multiplex header, the multiplex layer discards the data in the information field since the multiplex information for the information field is unknown (Step S04).

Figure 33:
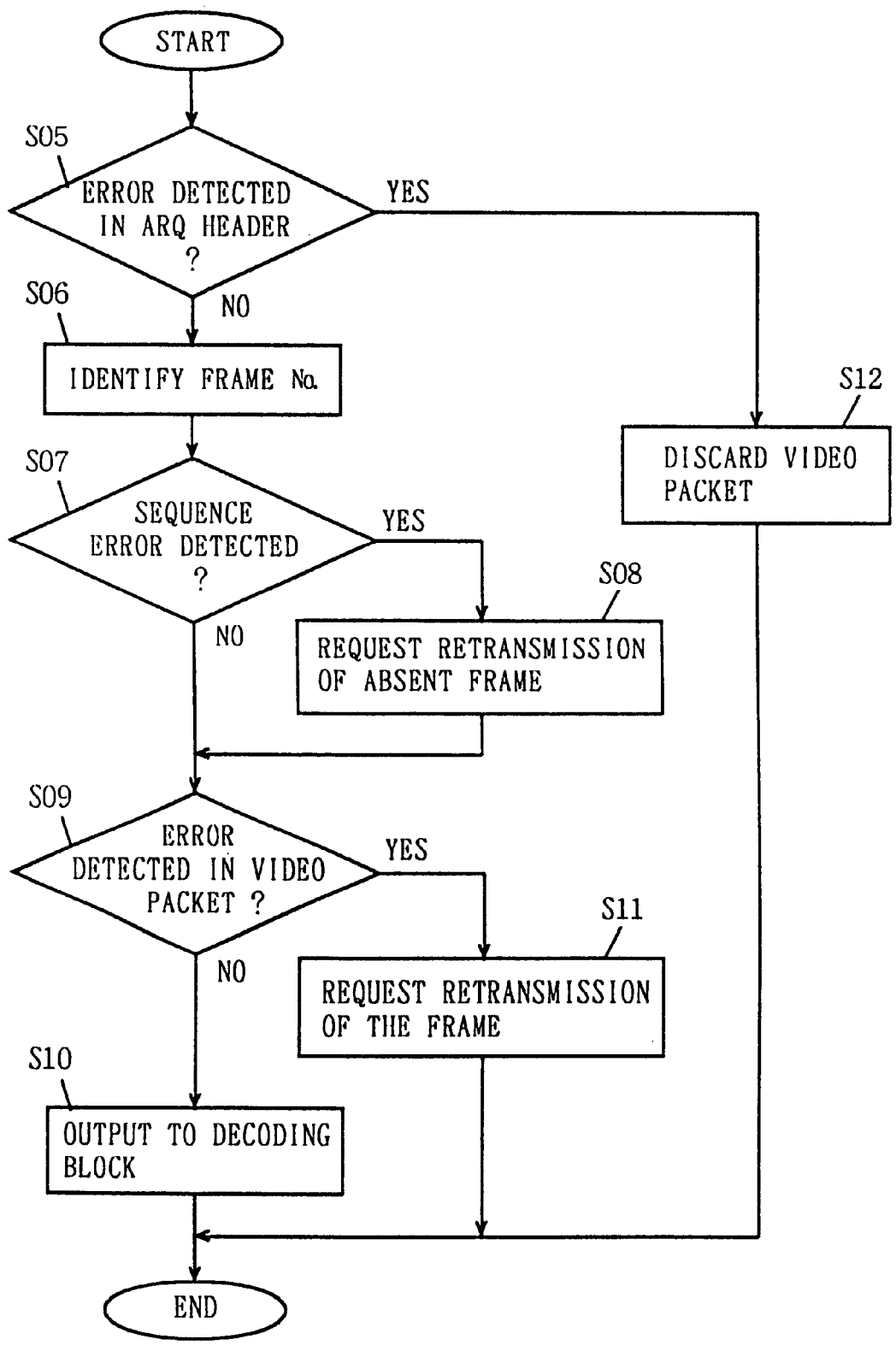
FIG. 33 is a flow chart showing processing performed by a video error control processing layer in the twelfth embodiment of the present invention.

In FIG. 33, when having received a demultiplexed video frame from the multiplex layer (that is, when the multiplex header has no error), the error control processing layer performs error correction and error detection of the ARQ header (Step S05). If the ARQ header has no error, the error control processing layer reads the frame number (Step S06). Next, the error control processing layer determines whether a sequence error has been detected, i.e., whether the read frame number differs from the frame number to be received next (Step S07). When a sequence error is detected, the error control processing layer transmits a retransmission request for the video frame of the absent frame number to the transmitting side (Step S08). Then the error control processing layer performs error detection of the video packet (Step S09). If the video packet has no error, It outputs the video data to the video decoding layer (Step S10), and if it has an error, it transmits a retransmission request for that frame number to the transmitting side (Step S11). In the Step S05, when an error is detected in the ARQ header, the error control processing layer discards the video packet (Step S12).

On the other hand, if the multiplex code table of the multiplex information is the multiplex code table shown in FIG. 21, the receiving side determines that the ARQ headers of the video frames are always located in a fixed position in the multiplex frames. In this case, the multiplex layer on the receiving side performs the processing shown in FIG. 34 and the video error control processing layer performs the processing in FIG. 33.

Figure 34:
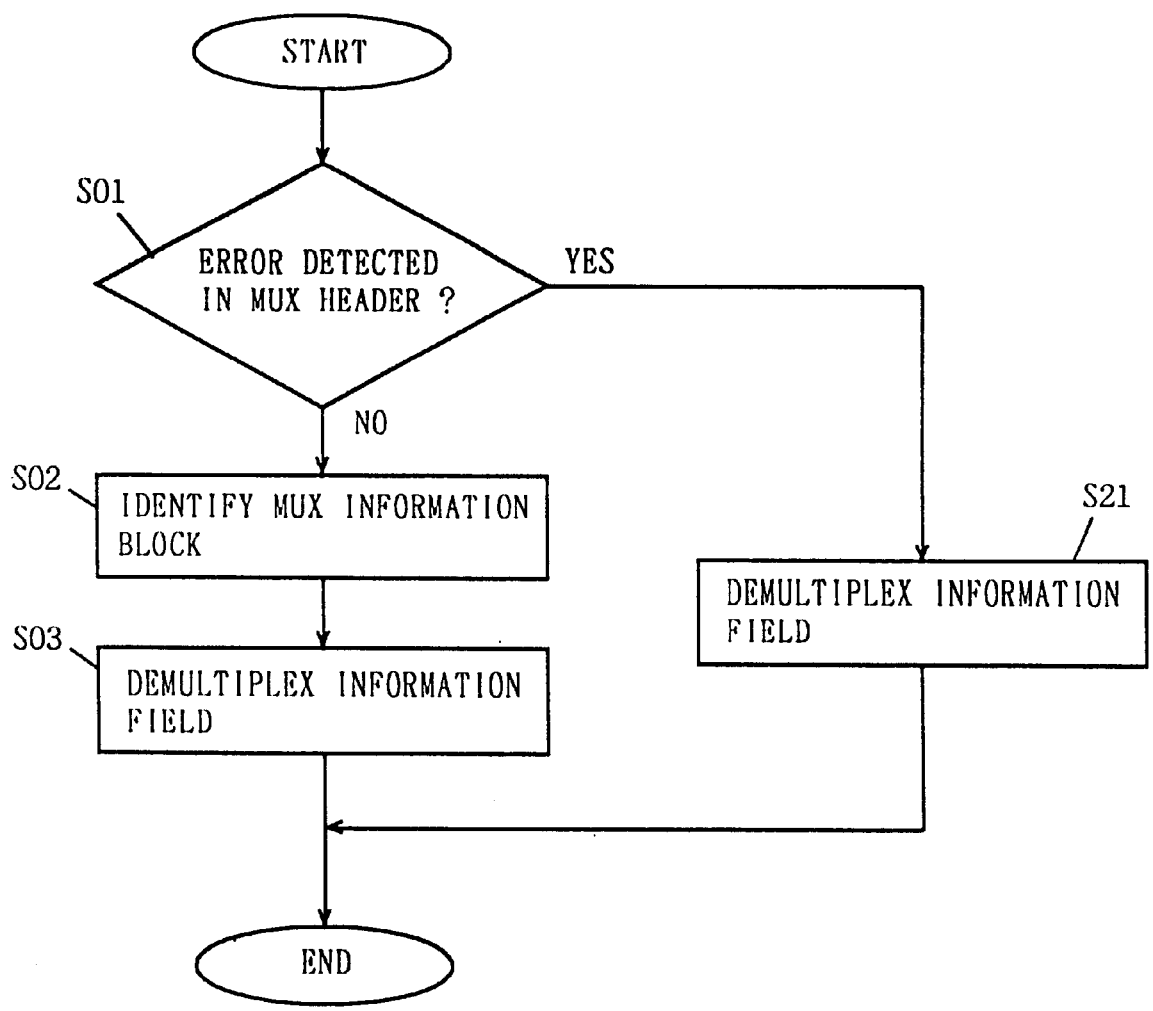
FIG. 34 is a flow chart showing processing performed by a multiplex layer on the receiving side in the twelfth embodiment of the present invention.

In FIG. 34, when receiving a multiplex frame, the multiplex layer on the receiving side first performs error detection of the multiplex header (Step S01). If the multiplex header has no error, the multiplex layer analyzes the multiplex information block (Step S02), demultiplexes the information field into the video frame, the audio frame, and so on, according to the multiplex information, and gives them to the corresponding error control processing layers (Step S03). On the other hand, if an error is detected in the multiplex header, the multiplex layer demultiplexes the 51 bytes following the multiplex header as a video frame and gives it to the video error control processing layer, and demultiplexes the 25 bytes at the end as an audio frame and gives it to the audio error control processing layer (Step S21).

In FIG. 33, if the multiplex layer has erroneously demultiplexed the information field but the ARQ header has no error (Step S05), the video error control processing layer can correctly identify the frame number (Step S06). Then it is possible to detect an error in the video packet (Step S09) and a retransmission request for that frame can be transmitted (Step 11).

Similarly, the audio error control processing layer performs error detection of the audio packet to discard or make a retransmission of the audio packet. If, by chance, the video frame and the audio frame demultiplexed by the multiplex layer are correct, no error is detected in the video packet and the audio packet and the data are handled as valid data.

Thus, in the twelfth embodiment, even if the multiplex header has an error, a video frame of certain bytes from the head and an audio frame of certain bytes from the end are demultiplexed and given to the error control processing layers. This allows the video and audio error control processing layers to immediately transmit back a reject for the errored frame, reducing the retransmission delay.

This embodiment will more effectively provide the effects when it is determined on the basis of the multiplex code table for the multiplex structure whether the ARQ headers of the video frames are located in a fixed position in the multiplex frames and the ARQ headers are extracted only when they are located in the fixed position.

This embodiment will provide more remarkable effects if the video frame and the audio frame are demultiplexed, when the ARQ header has an error, on the basis of a most frequently appearing one of the video and audio multiplex structures, or if they are demultiplexed by predicting the multiplex structure when the multiplex structures appear in a repeated certain pattern.

Furthermore, when multiplexing computer data in addition to the video data and the audio data, multiplexing the computer data between the video data at the head and the audio data at the tail will allow the video data and the audio data to be extracted with priority, providing more significant effects.

Although the twelfth embodiment has explained the case in which the audio frame has a length of 25 bytes, the present invention is not limited to it. That is to say, the frame length of the audio frame can take other values. Audio frames provided with redundant bits for error correction, or audio frames coded to another bit rate, e.g., to 6.3 Kbps, may be used as well.

(Thirteenth Preferred Embodiment)

Figures 35A, 35B, 35C:
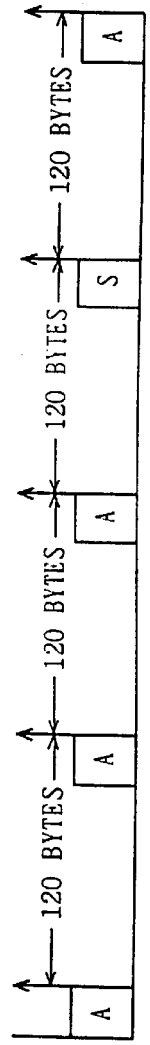
FIG. 35 is a diagram for describing a multiplex transmission method according to a thirteenth embodiment of the present invention.

Next, a multiplex transmission method having the features of the above-described embodiments will be explained. FIG. 35 is a diagram for use in describing a multiplex transmission method according to a thirteenth embodiment of the invention. Specifically, FIG. 35(a) shows a multiplex frame stream transmitted by the transmitting side, FIG. 35(b) shows a multiplex frame stream received on the receiving side, and FIG. 35(c) shows the timing of outputting audio on the receiving side.

As shown in FIG. 35(a), each multiplex frame in the multiplex frame stream has an 80-byte fixed length. In this multiplex frame stream, the pattern repeats in which two multiplex frames with 20-byte audio frames multiplexed therein continuously appear and then one multiplex frame with no audio frame multiplexed therein appears. Thus 20-byte audio is transmitted per 120 bytes. When an error exists in the video frame V5 which includes a long frame because of inactive speech, this video frame V5 can be retransmitted in a multiplex frame with no audio frame multiplexed (which necessarily appears once or more in successive three multiplex frames).

In the data to be multiplexed, the video data is always stored in the leading part of the multiplex frame. Even if an error is detected in the multiplex information, the receiving side demultiplexes the leading part as a video frame. Then, if the error exists only in the multiplex information, the demultiplexed video frame V4 can be correctly processed.

Multiplex information MC having different values are stored in the header parts depending on the time to the next audio frame. On the receiving side, an audio frame separated from the next audio frame in a relatively short time on the multiplex frame stream is immediately outputted without being accumulated and the following audio frames are outputted on the 120-byte time cycle. This enables multiplexing of audio of 120-byte cycle in 80-byte multiplex frames without jitter and delay.

FIG. 36 shows a method of multiplex transmission with each multiplex frame having a length of 60 bytes. Particularly, FIG. 36(a) shows a multiplex frame stream transmitted from the transmitting side, FIG. 36(b) shows a multiplex frame stream received on the receiving side, and FIG. 36(c) shows the timing at which the receiving side outputs audio.

As shown in FIG. 36(a), each multiplex frame on the multiplex frame stream has a fixed-length of 60 bytes. On this multiplex frame stream, a multiplex frame containing a 20-byte audio frame and a multiplex frame without an audio frame alternately repeat. This enables transmission of 20-byte audio per 120 bytes. When the video frame V3 which includes a long frame due to silence has an error, this video frame V3 can be retransmitted in a multiplex frame containing no multiplexed audio frame (which necessarily appears once per successive two multiplex frames).

In the data to be multiplexed, the video data is always stored in the preceding part of the multiplex frame. Even if an error is detected in the multiplex information, the receiving side demultiplexes the head part as a video frame. This allows the demultiplexed video frame V5 to be correctly processed if only the multiplex information has an error.

Thus, according to the thirteenth embodiment, the data link frames for video data can always be obtained with constant timing when audio frames generated on the 120-byte cycle are multiplexed in 80-byte multiplex frames or when multiplexed in 60-byte multiplex frames. Accordingly, even when the silent periods are effectively used by increasing/decreasing the transmission band width for video data or computer data, or the variable-length data employing retransmission, the transmitting timing of the data link frames can be synchronized with the transmitting timing of the multiplex frames, resulting in a multiplex transmission with improved error robustness. Furthermore, retransmission of a long frame of the variable-length slot 2 can be performed by using the fixed-length slot, which enables retransmission control without delay of audio.

Although the thirteenh embodiment has explained the case in which the audio frame has a length of 20 bytes, the present invention is not limited to ft. That is to say, the frame length of the audio frame may be otherwise determined. Audio frames provided with redundant bits for error correction, or audio frames coded to another bit rate, e.g., to 6.3 Kbps, may be used as well.

(Fourteenth Preferred Embodiment)

Figure 37:
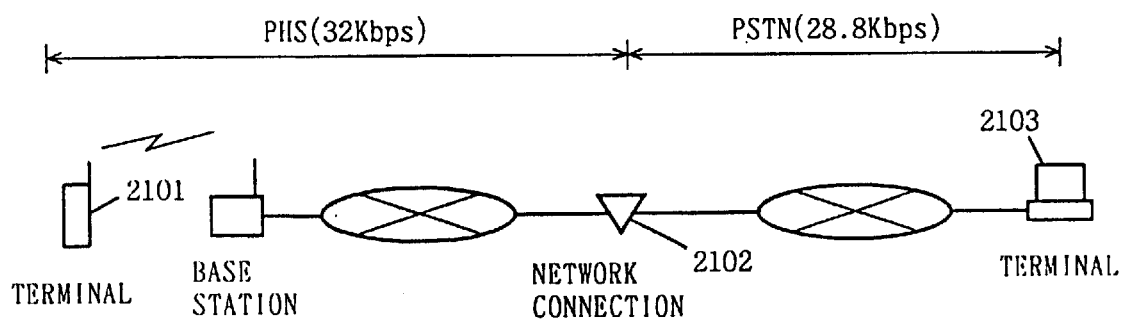
FIG. 37 is a diagram showing the structure of a communication system to which a fourteenth embodiment of the present invention is applied.

Consider that, in a communication system in which a PHS network is connected to an existing analogue public switched telephone network PSTN as shown in FIG. 37, video data and audio data are multiplexed from a terminal 2101 connected to the PHS network to a terminal 2103 connected to the PSTN.

It is assumed that the video data retransmission control is made between the terminal 2101 and the terminal 2103. The two terminals determine the maximum bit rate between the terminals according to the definition of H.324 by ITU-T at the beginning of a communication, for example. Since the PHS network has a bit rate of 32 Kbps and the PSTN has a bit rate of 28.8 Kbps, the maximum bit rate of this communication system is determined to be 28.8 Kbps.

At the interconnection of the PHS network and the PSTN network, the video data is the data employing retransmission and is retransmitted when erroneously received. Video data errored in the PHS network is discarded at the network connection 2102 and a retransmission request is issued. Accordingly, if an error occurs in the video data in the PHS network, the less video data to be multiplexed is in the PSTN network, the more is retransmitted, and then the PSTN network actually has less data to be transmitted than 28.8 Kbps. That is to say, the effective bit rate falls under 28.8 Kbps. As compared with the wired transmission path of PSTN, the radio transmission channel of PHS is more prone to errors and retransmission is made more frequently. Accordingly, the bit rate between the terminals is limited by the bit rate in the PHS network, leading to inferior transmission efficiency.

The fourteenth embodiment described next is directed to a solution of the deterioration of the transmission efficiency.

Figure 38:
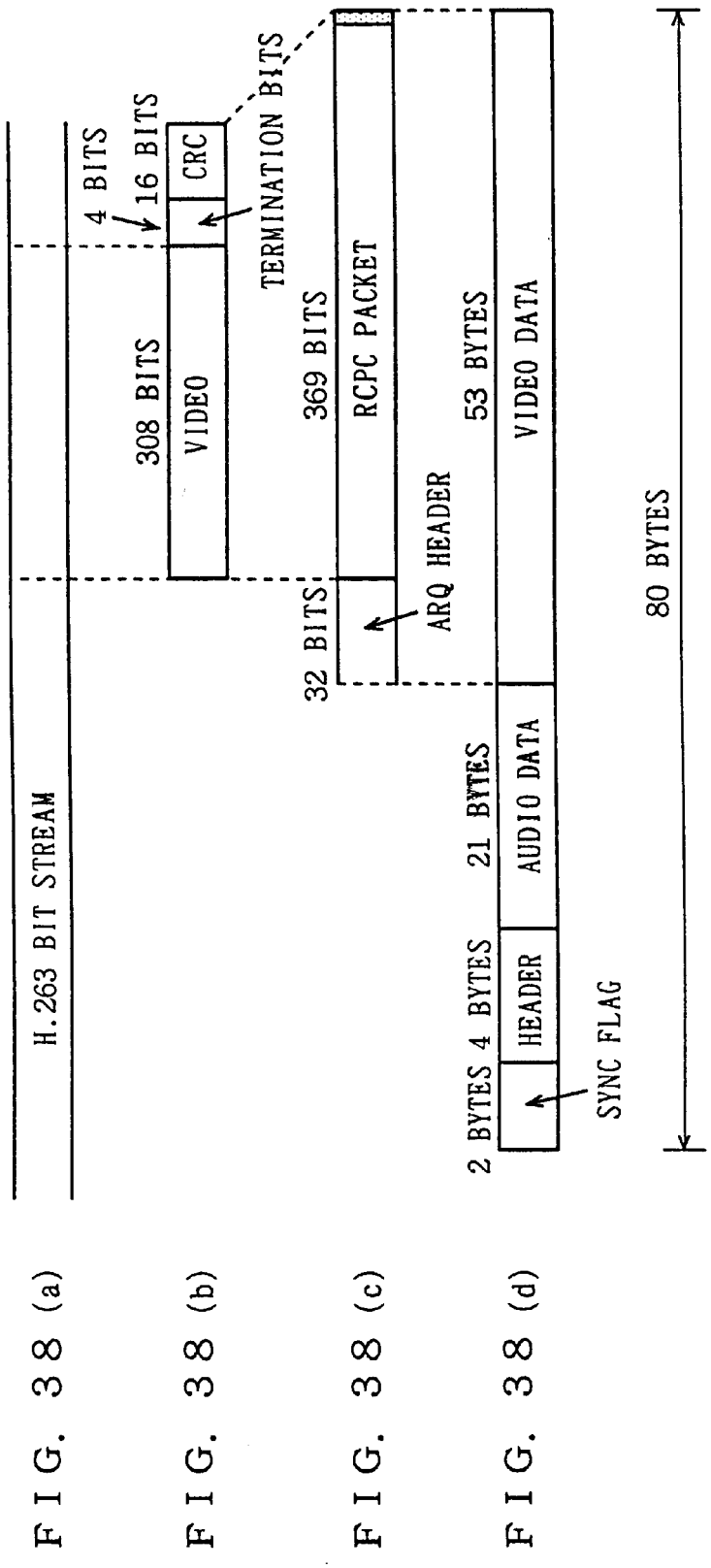
FIG. 38 is a diagram illustrating a multiplexing method at a terminal connected to the PHS network in the fourteenth embodiment of the present invention.

The multiplexing method at the terminal 2101 will now be described referring to FIG. 38. The terminal 2101 cuts out 308 bits from the bit stream of video data (refer to FIG. 38($a$)) coded by H.263 or the like and adds a 16-bit CRC and 4-bit termination bits to it as shown in FIG. 38($b$). The CRC is the code for error detection and the termination bits are dummy bits for Viterbi decoding. The terminal 2101 applies error correction coding with a code rate r=8/9 by rate compatible punctured convolutional coding (RCPC coding) to the total of 328-bit (=41-byte) data to generate an RCPC packet of 328 bits×(9/8)=369 bits. The terminal 2101 adds the 32-bit ARQ header including information such as the sequence number for retransmission control to the head of this RCPC packet to generate the 401-bit ($\leq$53 bytes) video data shown in FIG. 38($c$). Further, the terminal 2101 multiplexes the video data and the audio data to generate the 80-byte multiplex frame shown in FIG. 38($d$). Then the terminal 2101 generates this 80-byte multiplex frame once per 80 bytes/32 Kbps=20 msec.

Figure 39:
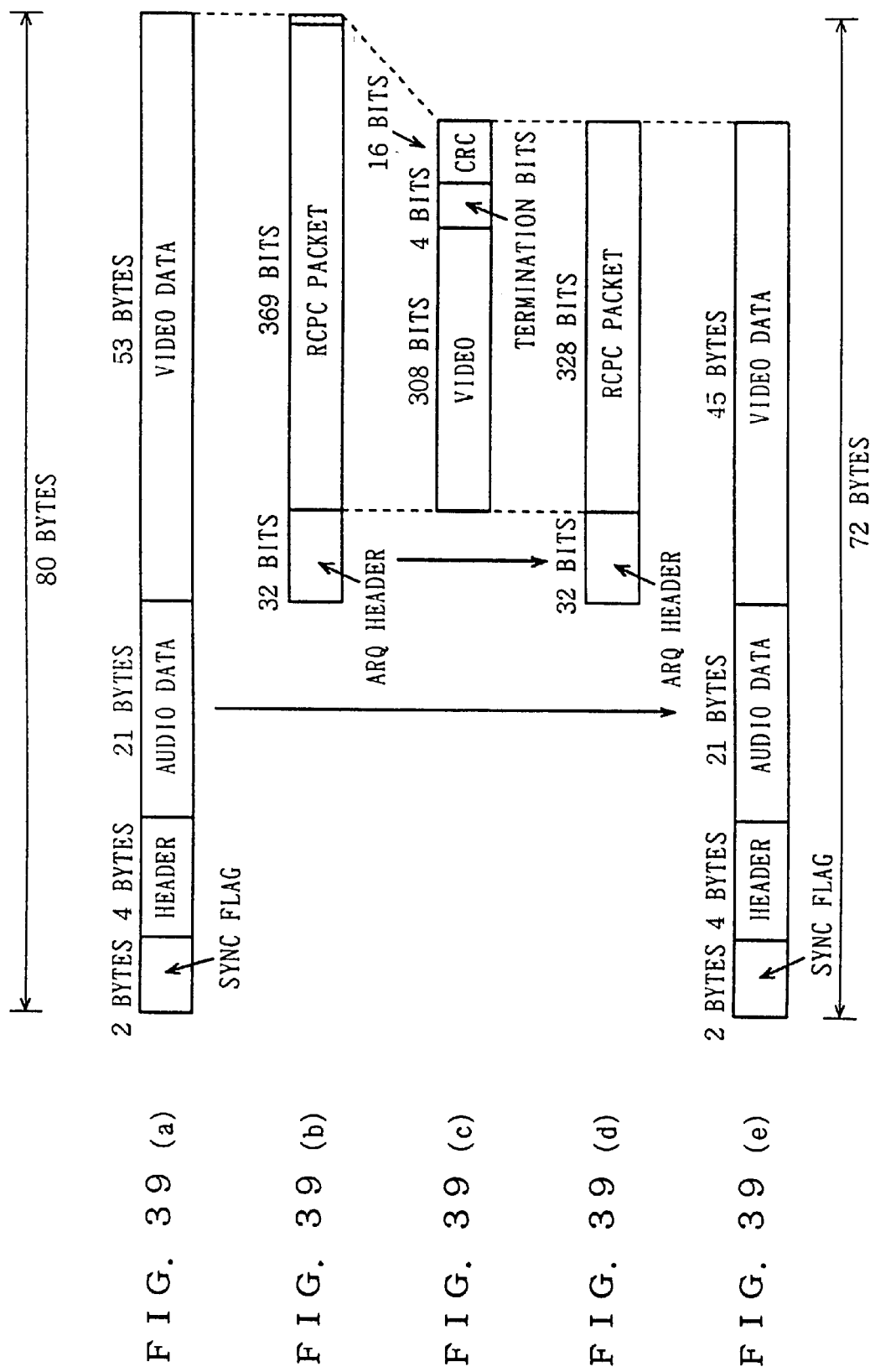
FIG. 39 is a diagram for illustrating a method of converting the rate at the network connection in the fourteenth embodiment of the present invention.

Next, the rate converting method at the network connection 2102 will be explained referring to FIG. 39. The network connection 2102 releases the multiplexing of the muliplex frame shown in FIG. 39($a$) and demultiplexes the video data into the ARQ header and the RCPC packet, as shown in FIG. 39($b$). Next, the network connection 2102 applies Viterbi decoding (error correction) to the RCPC packet to take out 41-byte data shown in FIG. 39($c$). Next, the network connection 2102 applies error correction coding with a code rate r=8/8=1 to the 41-byte data by RCPC coding to generate a 41-byte RCPC packet. Furthermore, the network connection 2102 adds, as shown in FIG. 39($d$), the previously demultiplexed 32-bit ARQ header to the head of the RCPC packet to generate 45-byte video data. Next, the network connection 2102 multiplexes the 45-byte video data with the previously demultiplexed 21-byte audio data to generate the 72-byte multiplex frame shown in FIG. 39($e$) and transmits it on the PSTN network. The 72-byte multiplex frame is generated once per 20 msec, then 72 bytes/20 msec=28.8 Kbps, which can be transmitted on the PSTN network.

The code rate is determined as follows. The PHS network has a bit rate Vf of 32 Kbps, and the PSTN has a bit rate Vs of 28.8 Kbps. Therefore the PHS network has a bit rate higher than that of the PSTN by $Rv$=(32−28.8)/32=0.1 that is, by 10%. Hence, 80×0.1=8 bytes in the frame length Lm (=80 bytes) of the multiplexed frame in the PHS network is empty in a conventional manner and the frame length of the multiplex frames in PSTN is therefore 80−8=72 bytes.

The length Ld of the video frame in the multiplex frame in PSTN corresponds to the multiplex frame length minus the header, the audio data, and the ARQ header of the video frame, that is, $Ld$=72−2−4−21−4=41 bytes.

The 8 bytes are assigned to the redundant bits for error correction of the Video frame, and then the code rate Rc=41/(41+8)=41/49 or larger. Preferably, selecting a value close to this value (=41/49) provides the best efficiency. In the RCPC coding explained above, the code rate must be 8/n (8$\leq$n$\leq$32). Hence, considering that the condition 41/49$\leq$8/9 holds, this embodiment selects the code rate of 8/9.

Although the fourteenth embodiment performs error correction of video data by using convolutional coding, block coding may be used. In this case, the network connection 2102 can make the rate conversion just by discarding the parity bits without performing error correction.

In the fourteenth embodiment, the error correction coding is applied to the video data with a retransmission processing. Similarly, the error correction coding may be applied to the audio data without the retransmission processing and the network connection 2102 may convert the code rate of the error correction coding.

In the fourteenth embodiment, synchronization flags are provided at the heads of the multiplex frames. However, as explained in other embodiments described above, the synchronization flags are not essential.

The PHS network and th e PSTN network in the fourteenth embodiment may be a customer-provided PHS network and a customer-provided analogue telephone network.

As has been explained above, the fourteenth embodiment takes advantage of the fact that the PHS network has a bit rate 10% higher than that of the PSTN to increase the error correcting capability of the video data. This increases the effective bit rate in the error-prone PHS network, resulting in suppressing reduction of the transmission efficiency between terminals.

(Fifteenth Preferred Embodiment)

Described next is a method for muliplexing and transmitting video data and audio data from the terminal 2101 connected to the PHS network to the terminal 2103 connected to the PSTN in such a communication system as shown in FIG. 37 wherein the PHS network is connected to the existing analogue public switched telephone network PSTN, like that in the fourteenth embodiment.

In this embodiment, retransmission control of video data is performed between the terminal 2101 and the network connection 2102 and between the network connection 2102 and the terminal 2103. The PHS network has a bit rate of 32 Kbps, and the PSTN has a bit rate of 28.8 Kbps, and the network connection 2102 performs conversion of the bit rate and conversion of multiplexing.

The terminal 2101 multiplexes and transmits data cut out from the video bit stream coded by H.263 or the like and audio data at 32 Kbps.

Figure 40:
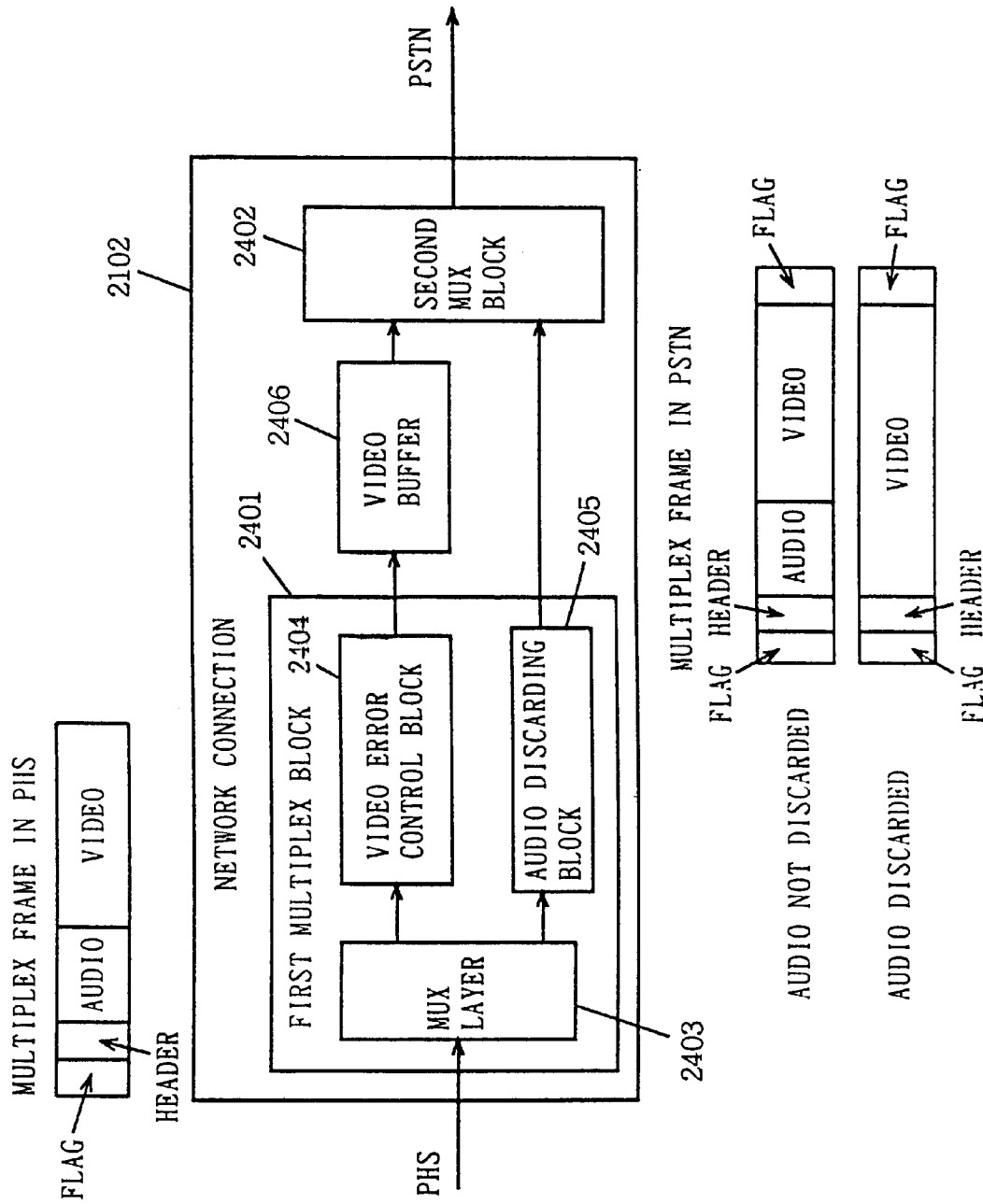
FIG. 40 is a block diagram showing the structure of the network connection in a fifteenth embodiment of the present invention.

The structure of the network connection 2102 in this embodiment is shown in FIG. 40. In FIG. 40, the network connection 2102 includes a first multiplexing block 2401, a second multiplexing block 2402 and a video buffer 2406. The first multiplexing block 2401 includes a multiplex layer 2403, a video error control block 2404, and an audio discarding block 2405.

The multiplex layer 2403 in the first multiplexing block 2401 releases the multiplexing of a multiplex frame received from the PHS network and demultiplexes the multiplex frame into video data and audio data. The video error control block 2404 performs error correction or error detection of the video data and performs retransmission control of error-uncorrected or error-detected video data. The video error control block 2404 rearranges the video data subjected to the retransmission control in the order of the sequence numbers to generate a bit stream having no error and stores it in the video buffer 2406. The audio discarding block 2405 performs error detection of the audio data, and discards error-detected audio data and outputs error-free audio data only to the second multiplexing block 2402. The second multiplexing block 2402 multiplexes the bit stream of the error-free video data stored in the video buffer 2406 and the error-free audio data at 28.8 Kbps. If an error occurs in the audio data and the audio data is discarded, the second multiplexing block 2402 assigns that band to the video data in multiplexing.

When the effective bit rate in the PHS network is larger than that in the PSTN network, data is accumulated in the video buffer 2406 to cause an overflow. When the video buffer 2406 overflows, the video retransmission control block 2404 sends a retransmission request for the data which could not be stored into the buffer to the transmitting terminal 2101. Therefore, actually, the effective bit rate in the PHS network does not exceed the effective bit rate in the PSTN network.

Accordingly, according to this embodiment, the bit rate between the two terminals is equal to the effective bit rate in the PSTN network unless the effective bit rate in the PHS network falls under the effective bit rate in the PSTN network. This prevents a decrease of the transmission efficiency. The transmission efficiency can be further increased by assigning the field for the errored audio data to the video data.

In this embodiment, synchronization flags are provided at the heads of the multiplex frames. However, as explained in other embodiments above, the synchronization flags are not essential.

The PHS network and the PSTN network in this embodiment may be a customer-provided PHS network and a customer-provided analogue telephone network.

(Sixteenth Preferred Embodiment)

Figure 41:
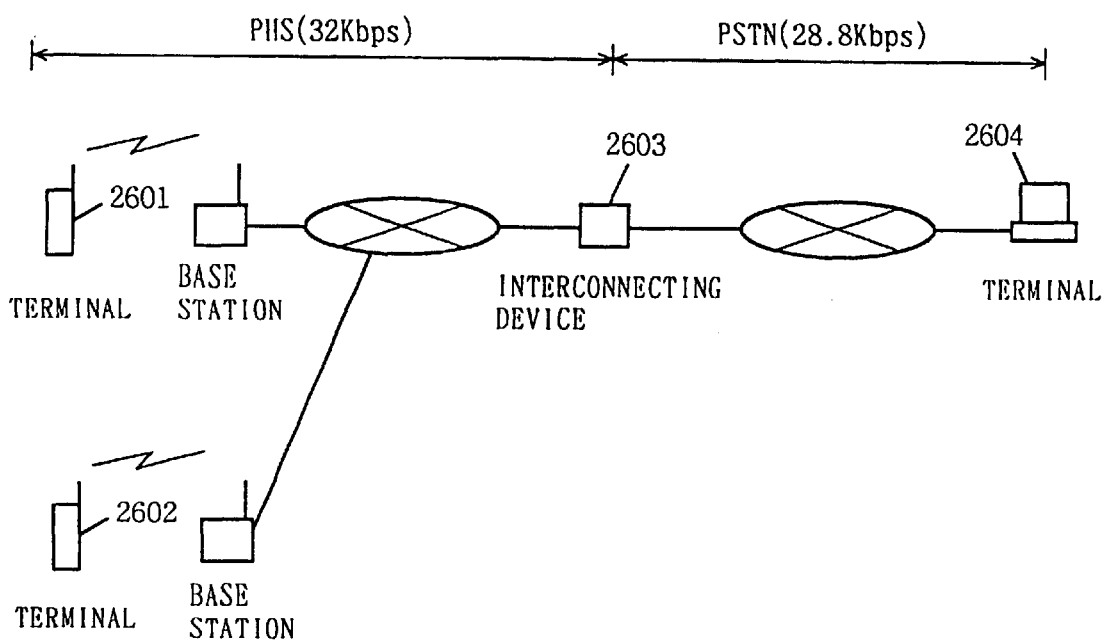
FIG. 41 is a diagram showing a structure of a communication system to which sixteenth and seventeenth embodiments of the present invention are applied.
Figure 44:
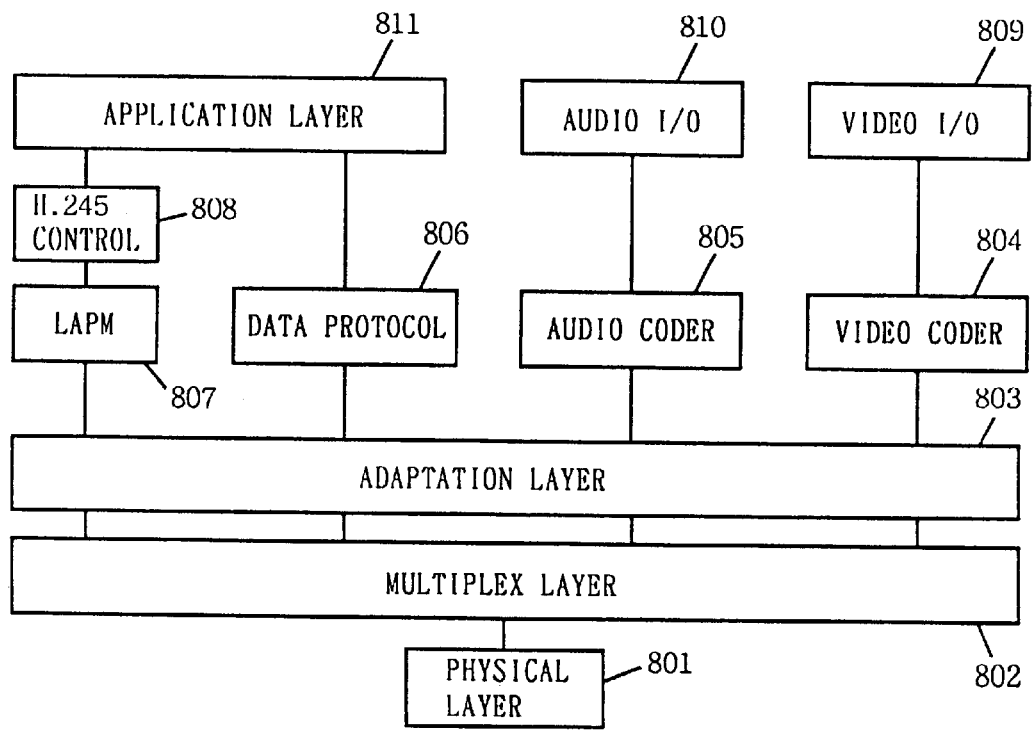
FIG. 44 is a diagram showing a common layer structure of a conventional multiplex transmission device which adopts the multiplex transmission method determined by H.223.
Figure 45:
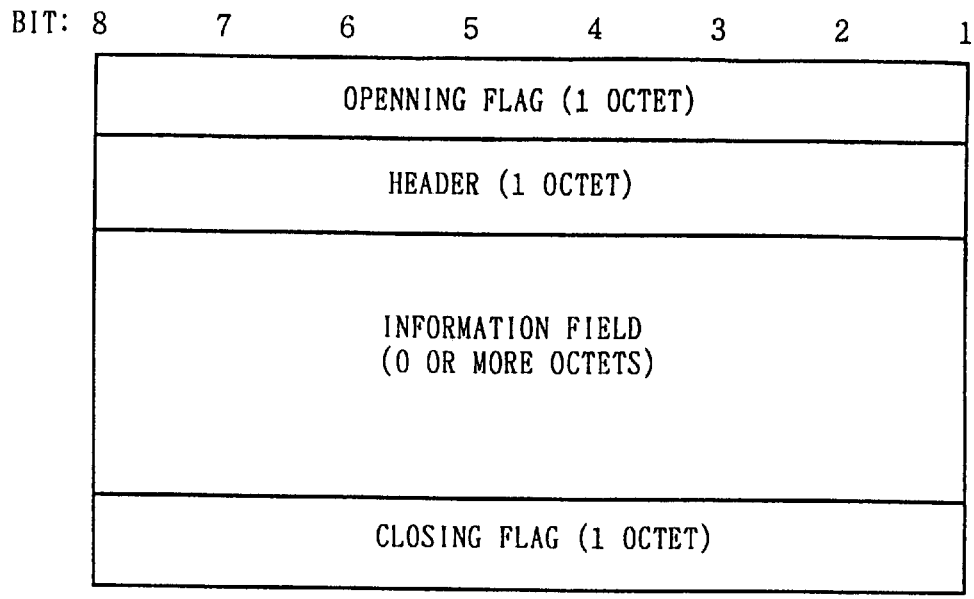
FIG. 45 is a diagram showing the multiplex frame format in the multiplex layer in H.223.
Figure 46:
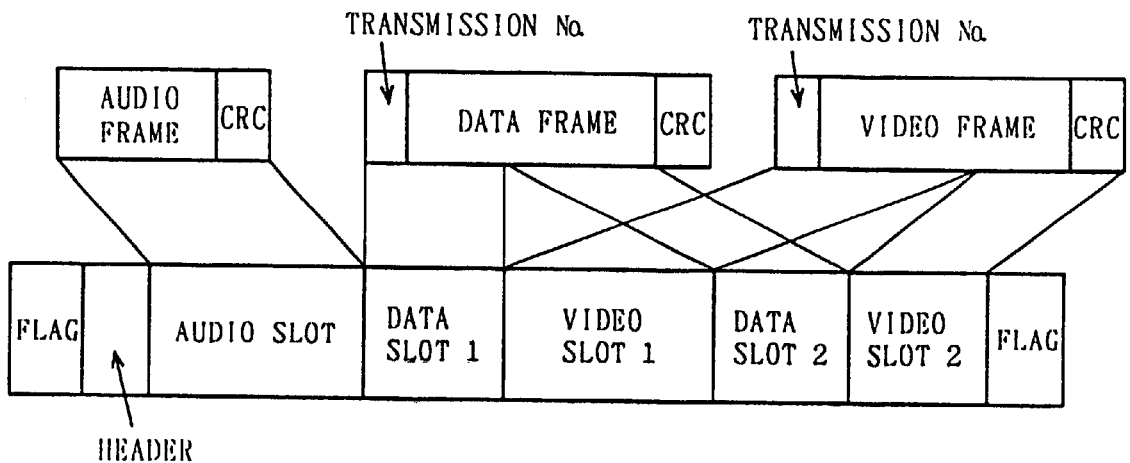
FIG. 46 is a diagram showing an example of a multiplex frame format in the multiplex layer in the case where audio data, computer data and video data are multiplexed.
Figure 47:
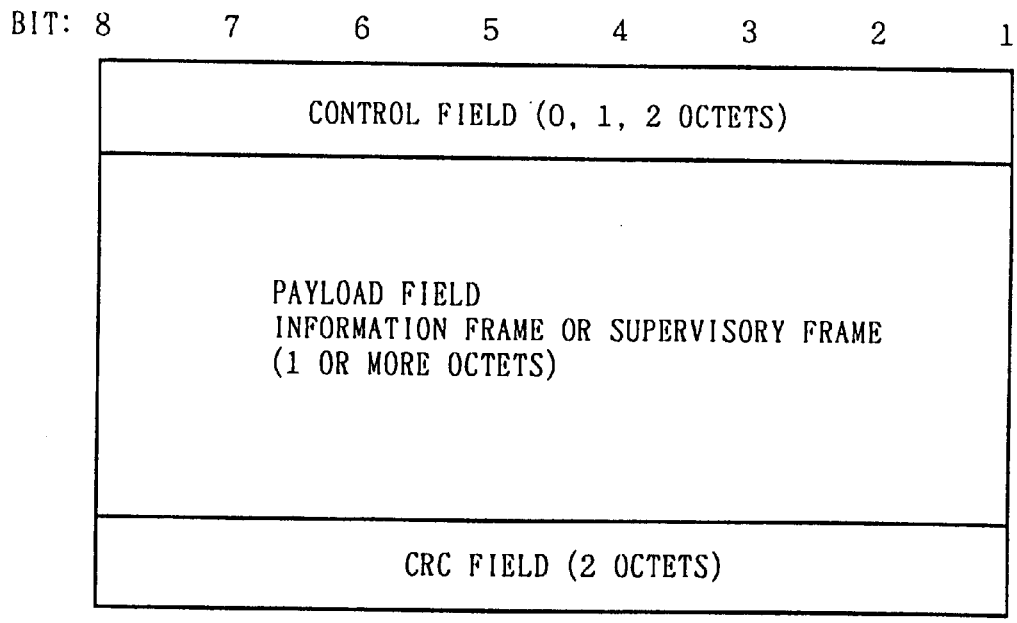
FIG. 47 is a diagram showing the format of the ARQ frame for error correction by retransmission control of video.
Figure 48:
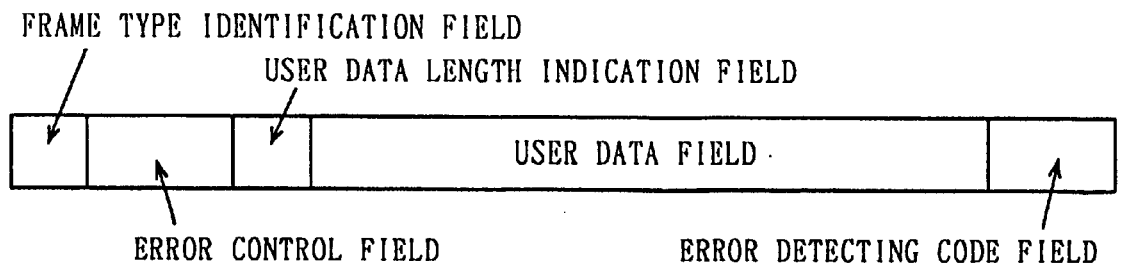
FIG. 48 is a diagram showing the frame structure defined in PIAFS.
Figure 49:
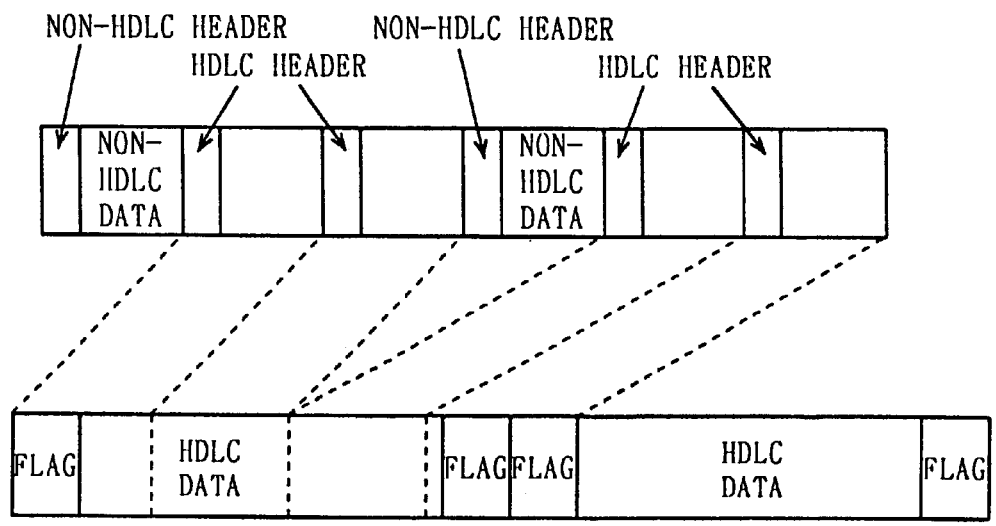
FIG. 49 is a diagram for describing "Mixing Transfer System for HDLC Variable Length Packet and None HDLC Fixed Length Packet" disclosed in Japanese Patent Publication No.8-13057.
Figure 50:
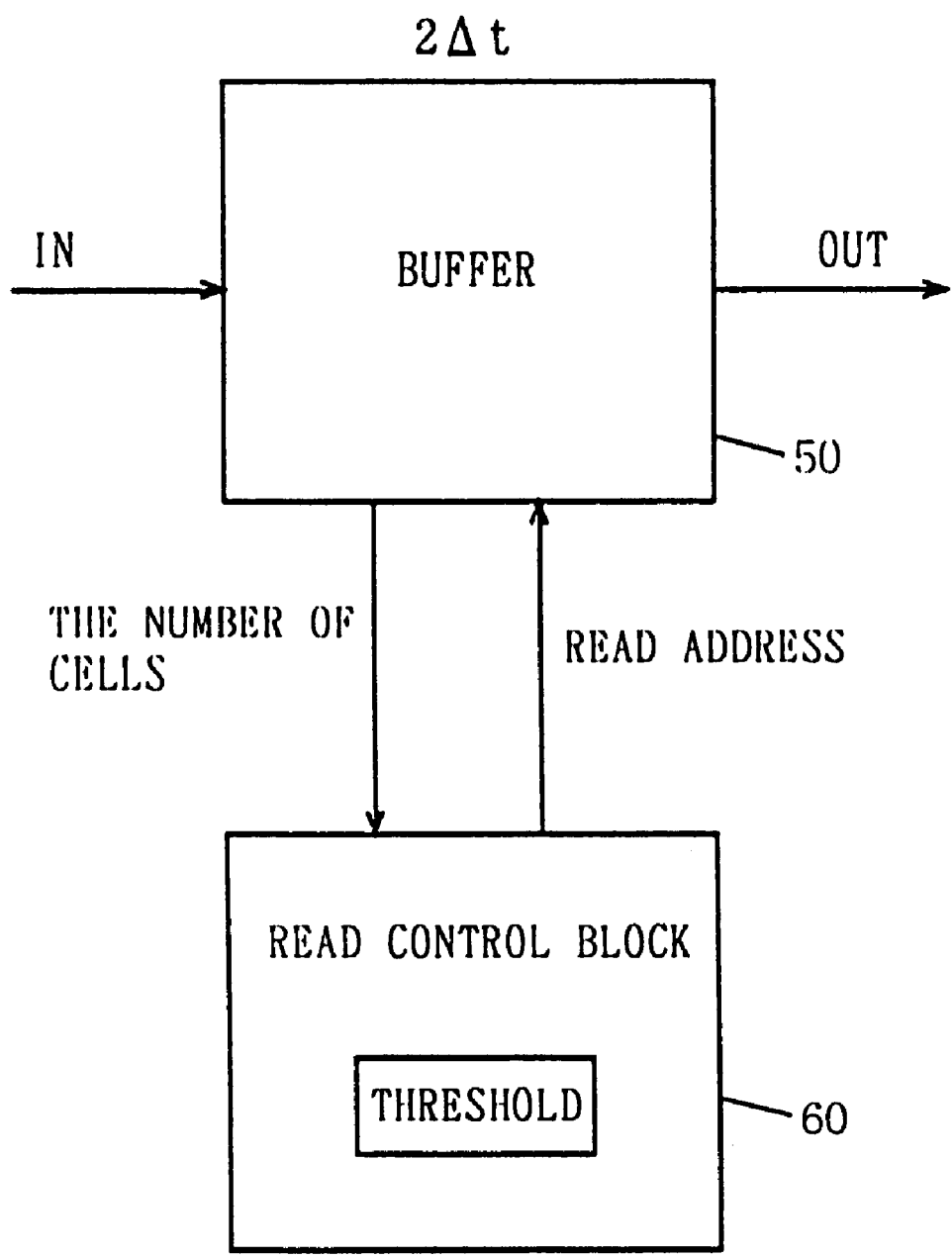
FIG. 50 is a block diagram showing a structure of a conventional jitter correcting circuit.

Considered next is a communication in such a communication system as shown in FIG. 41 wherein a PHS network is connected to an existing analogue public switched telephone network PSTN, in which a terminal 2601 connected to the PHS network communicates with a terminal 2602 connected to the PHS network and a terminal 2604 connected to the PSTN.

In FIG. 41, the interconnecting device 2603 has a function of PHS bearer communication, a function of communication in a PSTN analogue telephone network through a modem, a function of acquiring frame synchronization of the multiplex frames in the individual networks, and a function of rate conversion.

FIG. 42(*a*) shows a structure of a multiplex frame transmitted by the terminal 2601 connected to the PHS network. The multiplex frame has the same frame length of 80 bytes as the data frame in the PIAFS and contains "0101000011101111001010011001011" as a synchronization flag in the head part of the frame, for example. This is followed by a header including the multiplex information, and multiplexed audio data and video data, and then 8-byte dummy bits are filled. The terminal 2602 and the interconnecting device 2603 establish frame synchronization by using the PIAFS synchronization frame since the multiplex frames has the same frame length as the PIAFS data frame.

The interconnecting device 2603 eliminates the fill bits to convert the multiplex frame shown in FIG. 42(*a*) into the multiplex frame shown in FIG. 42(*b*) to convert the bit rate.

The terminal 2604 receives the multiplex frames while keeping frame synchronization by using the synchronization flags at the heads of the multiplex frames of FIG. 42(*b*).

According to this embodiment, the terminal 2602 and the interconnecting device 2603 do not require the function of searching in the synchronization flags at the heads of the multiplex frames, and the interconnecting device 2603 is not required to newly add the synchronization flags.

As methods for the bit rate conversion in the interconnecting device 2603, the method shown in the fourteenth embodiment is also applicable as well as the method of eliminating previously inserted fill bits.

This embodiment can be applied to the multiplex transmission methods explained in the first to fifth, tenth and eleventh embodiments to provide the effects of both of the embodiments.

The PHS network and the PSTN network in this embodiment may be a customer-provided PHS network or a customer-provided analogue telephone network, respectively.

When communicating with a terminal which is connected to the PHS network or to an ISDN network connected thereto but may be supposed to be connected to a network incapable of synchronization, the multiplex frames after the synchronization has been established by the synchronization frame may be transmitted with a synchronization flag at each head and then it will be negotiated whether to remove the synchronization flag.

(Seventeenth Preferred Embodiment)

Considered next is another embodiment of the communication in such as communication system as shown in FIG. 41 wherein a PHS network is connected to an existing analogue public switched telephone network PSTN, in which the terminal 2601 connected to the PHS network communicates with the terminal 2602 connected to the PHS network and the terminal 2604 connected to the PSTN.

In FIG. 41, the interconnecting device 2603 has a function of PHS bearer communication, a function of communication in a PSTN analogue telephone network through a modem, a function of acquiring frame synchronization of the multiplex frames in the individual networks, and a function of the bit rate conversion.

FIG. 43 shows a structure of a multiplex frame transmitted by the terminal 2601 connected to the PHS network. As shown in FIG. 43, as in the sixteenth embodiment, the multiplex frame has the same frame length of 80 bytes as the PIAFS data frame. Accordingly, the terminal 2602 and the interconnecting device 2603 establish frame synchronization by using the PIAFS synchronization frame. When the other terminal in a communication is connected to the PSTN, the terminal 2601 uses, as shown in FIG. 43(b), a multiplex frame having a synchronization flag stored at its head, as in the sixteenth embodiment. If the other terminal is connected to the PHS network, it uses a multiplex frame having no synchronization flag at its head, as shown in FIG. 43(c). In this case, fill bits are not inserted into the multiplex frame since the bit rate conversion is not required.

According to this embodiment, unnecessary synchronization flags are not provided when the other party is connected to the PHS network so that more data can be multiplexed. This improves the transmission efficiency.

This embodiment can be applied to the multiplex transmission methods explained in the first to fifth, tenth and eleventh embodiments to provide the effects of both of the embodiments.

The PHS network and the PSTN network in this embodiment may be a customer-provided PHS network or a customer-provided analogue telephone network, respectively.

It can be negotiated whether to insert synchronization flags between terminals at the beginning of a communication, or it may be estimated from the maximum bit rate negotiated between the terminals as explained in the fourteenth and fifteenth embodiments, or information may be exchanged to show the types of the networks to which the terminals are connected.

When communicating with a terminal which is connected to the PHS network or to an ISDN network connected thereto but may be supposed to be connected to a network incapable of synchronization, the multiplex frame after establishment of the synchronization frame may be transmitted with a synchronization flag at its head and then it may be negotiated as to whether to remove the synchronization flag.

The multiplex transmission system, the multiplex transmission device and the jitter absorbing system described in the above first to seventeenth embodiments may be realized by each dedicated circuit device or a computer device. When they are realized by the computer device, software program for storing the procedure of processing in the above each embodiment is executed by the computer device.

The present invention is further directed to a storage medium for storing software program, such as a flexible disk, CD-ROM, a hard disk device, a semiconductor memory and so on.

While the invention has been described in detail, the foregoing description is; in all aspects illustrative and not restrictive. It is understood that numerous other, modifications and variations can be devised without departing from the scope of the invention.

What is claimed is:

1. A method for multiplexing and transmitting variable-length data and fixed-length data in multiplex frames, wherein the variable-length data is data on which retransmission has been employed and to which error correction by retransmission control has been applied, and the fixed-length data is data on which retransmission has not been employed and to which error correction by retransmission control has not been applied, said method comprising:

forming multiplex frames such that each multiplex frame has a fixed length, and forming a variable-length data link frame in each multiplex frame such that the data link frame has a frame length based on the length of the fixed-length data, and storing the variable length data in the data link frame;

transmitting the multiplex frames in a transmission stream of the multiplex frames; and before said transmitting, storing each data link frame such that each data link frame is completed in one multiplex frame so that the data link frames can be transmitted at a timing kept in synchronization, for each multiplex frame, with the transmission stream of the multiplex frames.

2. The multiplex transmission method according to claim 1, wherein said forming multiplex frames comprises forming each multiplex frame so as to include a respective fixed-length field divided into first and second variable-length slots, such that the first variable-length slot has a predetermined fixed length when fixed-length data not employing retransmission is to be multiplexed into the respective fixed-length field and a length of zero when no fixed-length data is to be multiplexed into the respective fixed-length field, and such that the second variable-length slot has a relatively short first length when fixed-length data not employing retransmission is to be multiplexed into the respective fixed-length field and a relatively long second length when no fixed-length data is to be multiplexed into the respective fixed-length field, said method further comprising transmitting the fixed-length data not employing retransmission in the first variable-length slot and the variable-length data employing retransmission in the second variable-length slot.

3. The multiplex transmission method according to claim 1, wherein said forming multiplex frames comprises forming each multiplex frame so as to include a respective multiplex frame header containing multiplex information indicating whether the fixed-length data not employing retransmission is multiplexed in the multiplex frame that includes the respective multiplex frame header.

4. The multiplex transmission method according to claim 2, wherein said forming multiplex frames further comprises forming each multiplex frame so as to include a fixed-length slot for storing and transmitting the variable-length data employing retransmission.

5. The multiplex transmission method according to claim 4, further comprising storing in the fixed-length slot variable-length data employing retransmission of the same kind as the variable-length data employing retransmission stored in the second variable-length slot.

6. The multiplex transmission method according to claim 5, further comprising setting the length of the fixed-length slot to be equal to or larger than the length of the fixed-length field.

7. The multiplex transmission method according to claim 4, further comprising storing in the fixed-length slot variable-length data employing retransmission of a different kind from the variable-length data employing retransmission stored in the second variable-length slot.

8. The multiplex transmission method according to claim 4, further comprising setting the length of the data link frame for storing the variable-length data employing retransmission to be equal to that of the second variable-length slot when the variable-length data employing retransmission is transmitted in the second variable-length slot and equal to that of the fixed-length slot when the variable-length data employing retransmission is transmitted in the fixed-length slot.

9. The multiplex transmission method according to claim 1, wherein said forming multiplex frames further comprises forming each multiplex frame so as to include,
   a frame type identification field for storing a code for identifying a frame type,
   a user data field for storing user data,
   a user data length indication field for storing the length of significant data in the user data field,
   a retransmission control field for storing a frame number used in retransmission control, and
   an error detecting code field for storing an error detecting code,
   said method further comprising:
      dividing the user data field into a field for the variable-length data employing retransmission and a field for the fixed-length data not employing retransmission;
      storing the variable-length data employing retransmission in the field for variable-length data employing retransmission;
      storing the fixed-length data not employing retransmission in the field for fixed-length data not employing retransmission;
      storing the length of said variable-length data employing retransmission accommodated in the field for variable-length data employing retransmission in the user data length indication field; and
      storing an error detecting code for error detection in the part excluding the field for the fixed-length data not employing retransmission in the error detecting code field.

10. The multiplex transmission method according to claim 9, wherein said forming multiplex frames further comprises forming each multiplex frame so as to include
   a frame type identification field for storing a code for identifying a frame type,
   a user data field for storing user data,
   a user data length indication field for storing the length of significant data in the user data field,
   a retransmission control field for storing a frame number used in retransmission control, and
   an error detecting code field for storing an error detecting code;
   said method further comprising:
      when fixed length data not employing retransmission is to be multiplexed, dividing the user data field into a field for variable-length data employing retransmission and a field for fixed-length data not employing retransmission, storing the variable-length data in the field for variable-length data employing retransmission, and storing the fixed length data in the field for fixed-length data not employing retransmission;
      when no fixed-length data is to be multiplexed, storing the variable-length data in the entirety of the user data field as the field for variable-length data employing retransmission;
      storing, in the frame type identification field, an identification code indicating whether the user data field includes the field for fixed-length data not employing retransmission;
      storing, in the user data length indication field, the length of the variable-length data accommodated in the field for variable-length data employing retransmission; and
      storing, in the error detecting code field, an error detecting code for error detection in the part of the user data field excluding the field for fixed-length data not employing retransmission.

11. The multiplex transmission method according to claim 1, further comprising, when fixed-length data not employing retransmission is to be multiplexed, repeatedly transmitting a basic multiplex frame stream including at least one first multiplex frame in which the fixed-length data not employing retransmission is multiplexed and at least one second multiplex frame in which the fixed-length data not employing retransmission is not multiplexed.

12. The multiplex transmission method according to claim 11, wherein said repeatedly transmitting comprises forming the at least one first multiplex frame so as to include a fixed-length field divided into first and second variable-length slots, such that the first variable-length slot has a predetermined fixed length when fixed-length data not employing retransmission is to be multiplexed and a length of zero when no fixed-length data is to be multiplexed, and such that the second variable-length slot has a relatively short first length when fixed-length data not employing retransmission is to be multiplexed and a relatively long second length when no fixed-length data is to be multiplexed, and such that the second multiplex frame includes a fixed-length slot,
   said method further comprising transmitting, in the first variable-length slot, the fixed-length data not employing retransmission and transmitting, in the second variable-length slot and the fixed-length slot, the variable-length data employing retransmission.

13. The multiplex transmission method according to claim 11, wherein said repeatedly transmitting comprises forming the at least one first and second fixed-length multiplex frames to each have a length of 60 bytes, and
   forming the basic multiplex frame stream of one of the first multiplex frame and one of the second fixed-length multiplex frame,
   said method further comprising storing one audio frame as the fixed-length data not employing retransmission in the first multiplex frame.

14. The multiplex transmission method according to claim 11, wherein said repeatedly transmitting comprises forming the at least one first and second fixed-length multiplex frames to each have a length of 80 bytes, forming the basic multiplex frame stream of two of the first multiplex frames and one of the second fixed-length multiplex frame, and forming the first multiplex frame so as to contain one audio frame as the fixed-length data not employing retransmission.

15. The multiplex transmission method according to claim 11, wherein said repeatedly transmitting comprises forming the at least one first and second fixed-length multiplex frames to each have a length of 80 bytes, forming the basic multiplex frame stream of one of the first multiplex frame and two of the second fixed-length multiplex frames, and storing, in the first multiplex frame, two audio frames as the fixed-length data not employing retransmission.

16. A method for multiplexing and transmitting a first data frame provided with a frame number and an error detecting code and second to kth data frames, where k is an integer of 2 or larger, in multiplex frames from a transmitting side to a receiving side, said method comprising:
   including in each multiplex frame multiplex information indicating the structure of multiplexing of the first data frame and the second to kth data frames;
   locating, at the transmitting side, the frame number of the first data frame always in a fixed position in each multiplex frame, and transmitting the multiplex-frames from the transmitting side; and receiving the multiplex frames at the receiving side, and when detecting presence of an error in the multiplex information in each multiplex frame received, reading, at the receiving side, the frame number of the first data frame from the fixed position in each multiplex frame, and transmitting a retransmission request for the read frame number from the receiving side to the transmitting side.

17. The multiplex transmission method according to claim 16, further comprising:

locating at least at a head of each multiplex frame a fixed-length multiplex header including at least the multiplex information and an error detecting code for detecting an error in the multiplex information; and locating the first data frame always at a position adjacent to the multiplex header among one or more data frames stored following the multiplex header.

18. The multiplex transmission method according to claim 17, wherein the first data frame has a header including at least the frame number and an error detecting code for detecting an error of the frame number, wherein the header is located at least at the head when the first data frame is located adjacently after the multiplex header and at least at the end when the first data frame is located adjacently before the multiplex header.

19. The multiplex transmission method according to claim 18, further comprising:

extracting, at the receiving side, certain bytes of data following/preceding the multiplex header as the first data frame when detecting presence of an error in the multiplex header of each multiplex frames received; and immediately transmitting, from the receiving side, a retransmission request for the first data frame to the transmitting side when detecting absence of error in the header of the extracted first data frame and detecting presence of an error in data other than the certain bytes.

20. The multiplex transmission method according to claim 17, wherein each multiplex frame has a fixed length, the second data frame is always located in the first one or the last one of one or more data frames stored following the multiplex header; and said method further comprises extracting, at the receiving side, data in a range of certain bytes from the end of the information field of each multiplex frame as the second data frame when detecting presence of an error in the multiplex header of each multiplex frame received, and when the second data frame is located always in the last one;

extracting, at the receiving side, data in a range of certain bytes from the head of the information field of each multiplex frame as the second data frame when said second data frame is always located in the first one;

handling, at the receiving side, the second data frame as correctly received data when detecting absence of an error in the extracted second data frame; and discarding, at the receiving side, the second data frame when detecting presence of an error in said extracted second data frame.

21. A multiplex transmission method comprising:

storing, multiplexing and transmitting an audio frame having a frame length of 30 ms and being of 120-byte cycle when transmitted at 32 Kbps, to a multiplex frame having a frame length of 20 ms and being of 80-byte cycle when transmitted at 32 Kbps; and repeatedly transmitting a basic multiplex frame stream formed of two first multiplex frames containing the audio frame and one second multiplex frame containing none of the audio frame.

22. The multiplex transmission method according to claim 21, further comprising:

when an audio frame is to be multiplexed, storing the audio frame always in the same position in an information field in the first multiplex frames; and demultiplexing, at the a receiving side, the audio frame from each multiplex frame received, absorbing jitter of the demultiplexed audio frame, and outputting the audio frame.

23. The multiplex transmission method according to claim 22, further comprising:

defining different multiplexing information for the two first multiplex frames included in the basic multiplex frame stream so that a reference audio frame demultiplexed from the next audio frame at a minimum interval can be identified; and outputting, at the receiving side, the audio frame demultiplexed from each received multiplex frame for each 30 ms using the timing of output of the reference audio frame as a reference.

24. The multiplex transmission method according to claim 21, wherein the first multiplex frame contains a first video frame which is one complete video ARQ frame, together with the audio frame, and the second multiplex frame contains a second video frame which is one complete video ARQ frame having a frame length equal to or larger than the sum of the frame length of the audio frame and that of the first video frame in the first multiplex frame.

25. The multiplex transmission method according to claim 24, further comprising:

when the audio frame is not transmitted in a silent period, using the first multiplex frame as a third multiplex frame which forms a third video frame which is one complete video ARQ frame having a frame length equal to the sum of the frame lengths of the audio frame and the first video frame; and when the third video frame could not be normally received, performing a retransmission of the third video frame in the second or third multiplex frame.

26. The multiplex transmission method according to claim 21, further comprising:

locating a fixed-length multiplex header, at least including multiplex information indicating the internal multiplex structure and an error detecting code for detecting error of the multiplex information, at the head of each of the first and second multiplex frames; and storing, in each of the first and second multiplex frames, an ARQ header for each of the first and second video frames immediately after the multiplex header or at the end of each of the first and second multiplex frames; and when an error is detected in the multiplex header and the internal multiplex structure is not known, reading the video frame including the ARQ header and performing retransmission control of the video frame including the ARQ header.

27. The multiplex transmission method according to claim 21, further comprising:

locating a fixed-length multiplex header, at least including multiplex information indicating internal multiplex structure and an error detecting code for detecting error of the multiplex information, at the head and at the end of each of the first and second multiplex frames;

in each of the first and second multiplex frames, storing an ARQ header for each of the first and second video frames immediately after the multiplex header located at the head of each of the first and second multiplex frames or immediately before the multiplex header located at the end of each of the first and second multiplex frames; and when an error is detected in the multiplex header and the internal multiplex structure is not known, reading the video frame including the ARQ header and performing retransmission control of the video frame including the ARQ header.

28. A multiplex transmission method comprising:

storing, multiplexing and transmitting an audio frame having a frame length of 30 ms and being of 120-byte cycle when transmitted at 32 Kbps to a multiplex frame having a frame length of 15 ms and being of 60-byte cycle when transmitted at 32 Kbps; and alternatively and repeatedly transmitting a first multiplex frame containing the audio frame and a second multiplex frame containing none of the audio frame.

29. The multiplex transmission method according to claim 28, wherein the first multiplex frame contains a first video frame which is one complete video ARQ frame, together with the audio frame, and the second multiplex frame contains a second video frame which is one complete video ARQ frame having a frame length equal to or larger than the sum of the frame length of the audio frame and that of the first video frame in the first multiplex frame.

30. The multiplex transmission method according to claim 29, further comprising:

when the audio frame is not transmitted in a silent period, using the first multiplex frame as a third multiplex frame which forms a third video frame which is one complete video ARQ frame having a frame length equal to the sum of the frame length of the audio frame and that of the first video frame; and when the third video frame can not be normally received, performing a retransmission of the third video frame in the second or third multiplex frame.

31. The multiplex transmission method according to claim 29, further comprising:

locating a fixed-length multiplex header, at least including multiplex information indicating the internal multiplex structure and an error detecting code for detecting error of the multiplex information, at the head of each of the first and second multiplex frames, and storing, in each of the first and second multiplex frames, an ARQ header for each of the first and second video frames immediately after the multiplex header or at the end of each of the first and second multiplex frames; and when an error is detected in the multiplex header and the internal multiplex structure is not known, reading the video frame including the ARQ header and performing retransmission control of the video frame including the ARQ header.

32. The multiplex transmission method according to claim 29, further comprising:

locating a fixed-length multiplex header, at least including multiplex information indicating the internal multiplex structure and an error detecting code for detecting error of the multiplex information, at the head and at the end of each of the first and second multiplex frames;

in each of the first and second multiplex frames, storing an ARQ header for each of the first and second video frames immediately after the multiplex header located at the head of each of the first and second multiplex frames or immediately before the multiplex header located at the end of each of the first and second multiplex frames; and when an error is detected in the multiplex header and the internal multiplex structure is not known, reading the video frame including the ARQ header and performing retransmission control of the video frame including the ARQ header.

33. A method for multiplexing and transmitting variable-length data and fixed-length data in multiplex frames, wherein the variable-length data is data on which retransmission has been employed and to which error correction by retransmission control has been applied, and the fixed-length data is data on which retransmission has not been employed and to which error correction by retransmission control has not been applied, said method comprising:

forming multiplex frames such that each multiplex frame has a fixed length, and forming a variable-length data link frame in each multiplex frame such that the data link frame has a frame length based on the length of the fixed-length data, and storing the variable-length data in the data link frame;

transmitting the multiplex frames in a transmission stream of the multiplex frames; and before said transmitting, storing each data link frame such that each data link frame is completed in one multiplex frame so that the data link frames can be transmitted at a timing kept in synchronization with the transmission stream of the multiplex frames.

34. A computer program embodied on a computer readable medium operable to instruct a computer to multiplex and transmit variable-length data and fixed-length data in multiplex frames, wherein the variable-length data is data on which retransmission has been employed and to which error correction by retransmission control has been applied, and the fixed-length data is data on which retransmission has not been employed and to which error correction by retransmission control has not been applied, said computer program comprising:

multiplexing-program-code on the medium operable to instruct the computer to form multiplex frames such that each multiplex frame has a fixed length, and to form a variable-length data link frame in each multiplex frame such that the data link frame has a frame length based on the length of the fixed-length data, and to store the variable-length data in the data link frame;

transmission-program-code on the medium operable to instruct the computer to transmit the multiplex frames in a transmission stream of the multiplex frames; and storage-program-code on the medium operable to instruct the computer, before operation of said transmission-program-code, to store each data link frame such that each data link frame is completed in one multiplex frame so that the data link frames can be transmitted at a timing kept in synchronization, for each multiplex frame, with the transmission stream of the multiplex frames.

35. The computer program embodied on a computer readable medium according to claim 34, further comprising:
  repeat-transmission-program-code on the medium operable to instruct the computer to repeatedly transmit a basic multiplex frame stream when fixed-length data not employing retransmission is to be multiplexed, wherein the basic multiplex stream includes at least one first multiplex frame in which the fixed-length data not employing retransmission is multiplexed and at least one second multiplex frame in which the fixed-length data not employing retransmission is not multiplexed.

36. A computer program embodied on a computer readable medium, said computer program being operable to absorb audio jitter in received multiplex frames when a low-bitrate-coded N-byte audio frame generated at a rate of one frame per an F-byte transmission time is stored and multiplexed in an M-byte fixed-length multiplex frame and when at most J-byte audio jitter is generated among the audio fields of the multiplex frames because F/M is not an integer, where N, F, M, and J are positive integers, N<F, and M<F,
  wherein said computer program comprises:
    first program code operable to instruct the computer to identify a reference audio frame separated from the next audio frame at a minimum interval among the audio frames on a stream of the transmitted multiplex frame, and
    second program code operable to instruct the computer to output the following audio frames at the rate of one frame per the F-byte transmission time using the timing at which the reference audio frame is outputted as a reference,
    wherein different multiplex information are defined for n multiplex frames containing multiplexed audio frames in a basic multiplex frame stream formed of m multiplex frames, where n and m are integers and n·F=m·M, and
    the reference audio frame is identified on the basis of the multiplex information at the first program code operation.

37. A computer program embodied on a computer readable medium, said computer program being operable to absorb audio jitter in transmitted multiplex frames when a low-bitrate-coded N-byte audio frame generated at a rate of one frame per an F-byte transmission time is stored and multiplexed in an M-byte fixed-length multiplex frame and when at most J-byte audio jitter is generated among the audio fields of the multiplex frames because F/M is not an integer, where N, F, M, and J are positive integers, N<F, and M<F,
  wherein when the time from the start of a coding operation of an audio coder for coding audio data to the start of output of the first audio frame from the audio coder is taken as T, and the time required from the start of output of the first audio frame from said audio coder to the start of output of the multiplex frame containing said first audio frame is taken as $\alpha$,
  using as a reference the timing of the start of output of the multiplex frame storing a reference audio frame separated from the next audio frame at a minimum interval in the audio frames on the transmitted multiplex frame stream, the coding operation of said audio coder is started preceding the reference timing at least for the total time of T+J+$\alpha$,
  wherein different multiplex information are defined for n multiplex frames containing multiplexed audio frames in a basic multiplex frame stream formed of m multiplex frames, where n and m are integers and n·F=m·M, and
  said reference audio frame is identified on the basis of said multiplex information by said computer program.

38. A computer program embodied on a computer readable medium, said computer program for use with a transmit computer and a receive computer and being operable to instruct the transmit computer to store in multiplex frames, multiplex and transmit a first data frame provided with a frame number and an error detecting code and second to kth data frames, where k is an integer of 2 or larger,
  wherein the multiplex frame is further provided with multiplex information indicating the structure of multiplexing of the first data frame and the second to kth data frames, and wherein said computer program comprises:
    transmitting side program code operable to instruct the transmit computer to locate the frame number of the first data frame always in a fixed position in the multiplex frame; and
    receiving side program code operable to instruct the receive computer to read the frame number of the first data frame from the fixed position in the multiplex frame and transmit a retransmission request for the read frame number to the transmit computer when detecting presence of an error in the multiplex information in the multiplex frame received.

* * * * *